Figure 2:
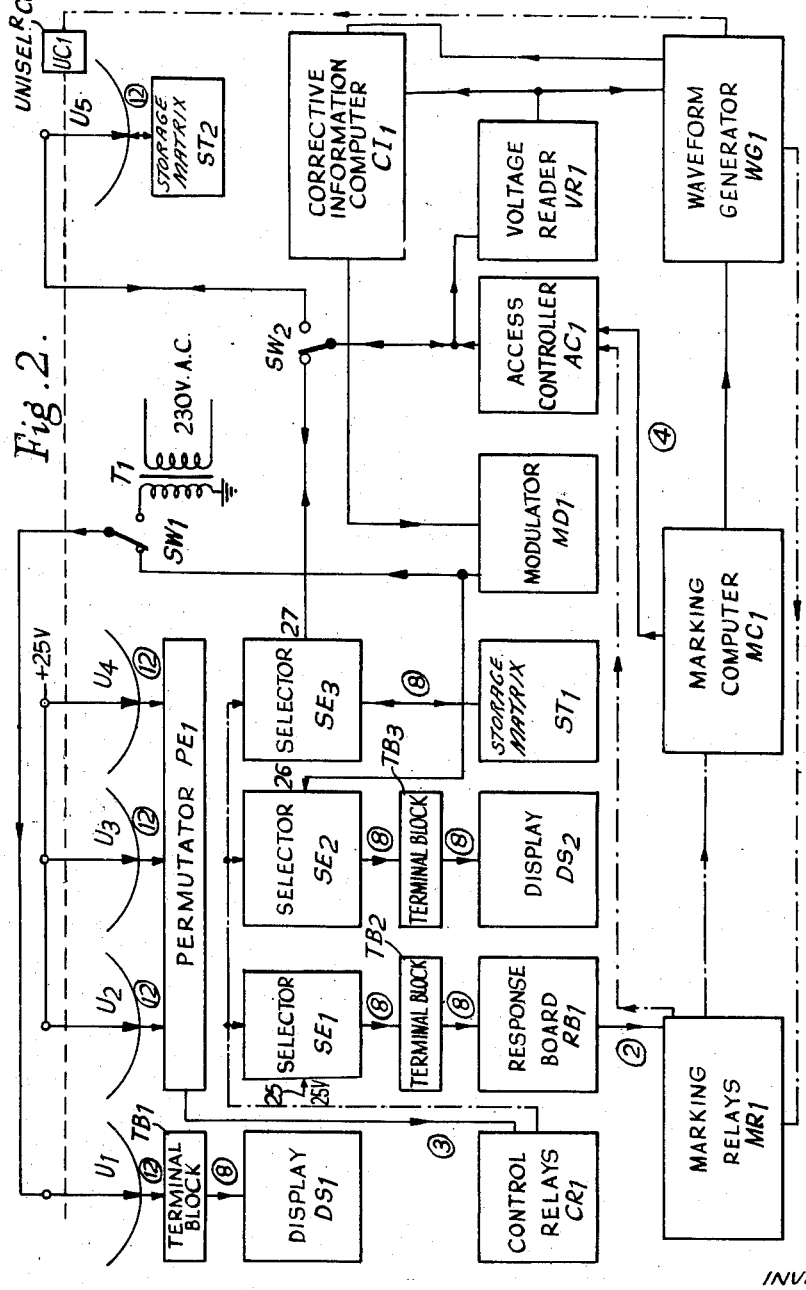

Fig. 1.
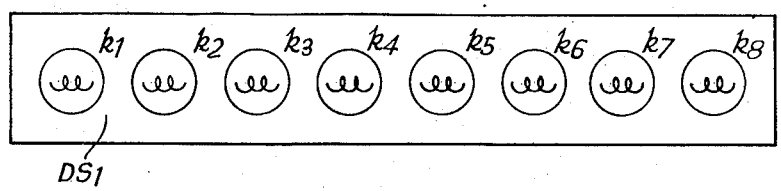
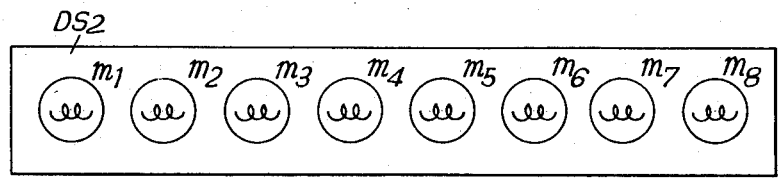
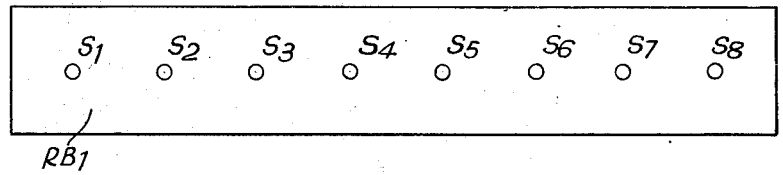
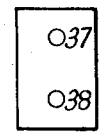

May 16, 1961 A. G. S. PASK 2,984,017
APPARATUS FOR ASSISTING AN OPERATOR IN PERFORMING A SKILL
Filed Aug. 30, 1957 30 Sheets-Sheet 6

INVENTOR
Andrew G. S. Pask
BY
Ralph B. Stewart
ATTORNEY

May 16, 1961 A. G. S. PASK 2,984,017
APPARATUS FOR ASSISTING AN OPERATOR IN PERFORMING A SKILL
Filed Aug. 30, 1957 30 Sheets-Sheet 7

INVENTOR
Andrew G. S. Pask
BY
Ralph B. Stewart
ATTORNEY

Fig. 11.

Fig. 12.

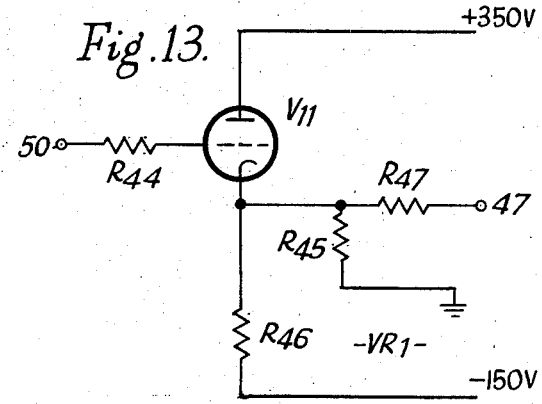
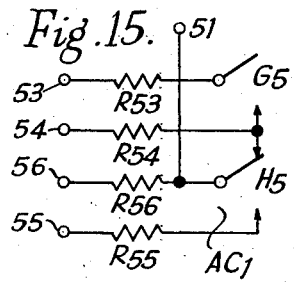
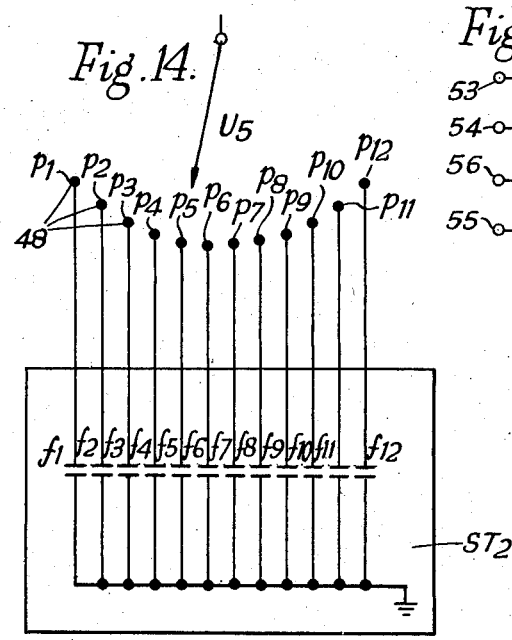

May 16, 1961 A. G. S. PASK 2,984,017
APPARATUS FOR ASSISTING AN OPERATOR IN PERFORMING A SKILL
Filed Aug. 30, 1957 30 Sheets-Sheet 15

INVENTOR
Andrew G. S. Pask
BY
Ralph B. Stewart
ATTORNEY

May 16, 1961     A. G. S. PASK     2,984,017
APPARATUS FOR ASSISTING AN OPERATOR IN PERFORMING A SKILL
Filed Aug. 30, 1957     30 Sheets-Sheet 17

INVENTOR
Andrew G. S. Pask
BY
Ralph B. Stewart
ATTORNEY

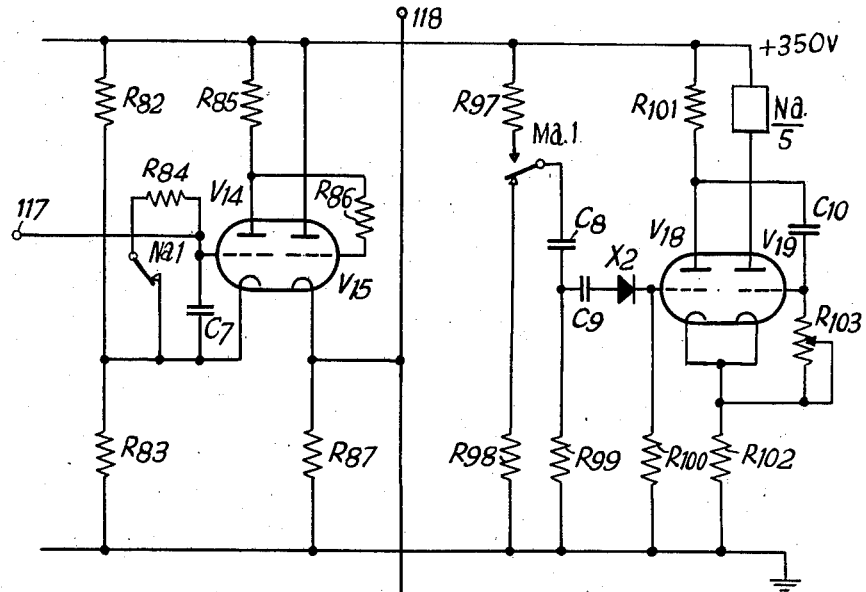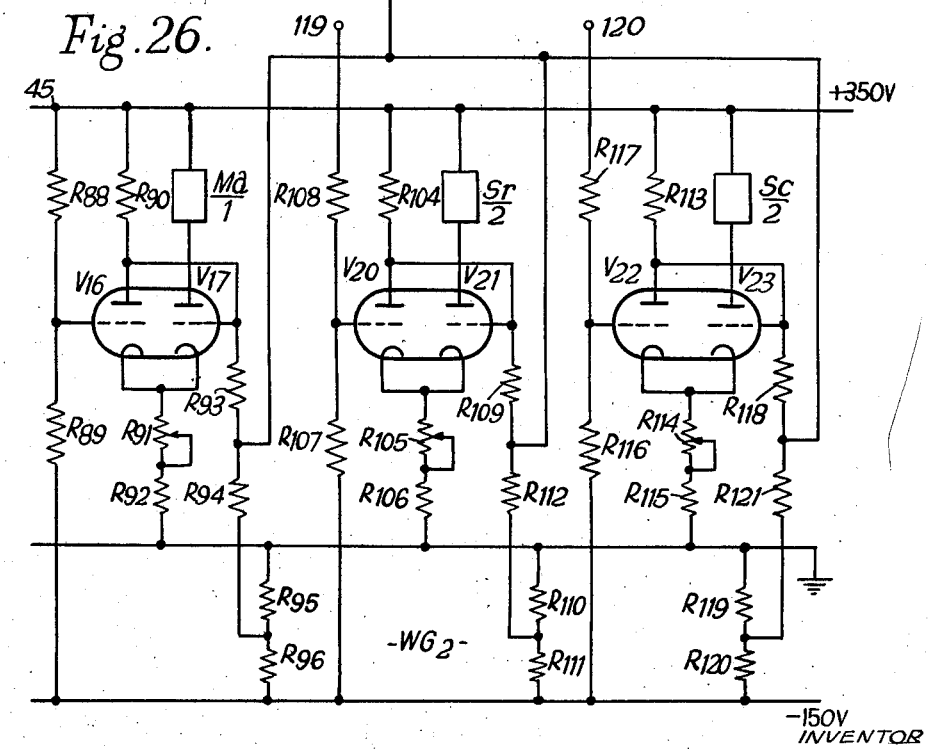
Fig. 26.

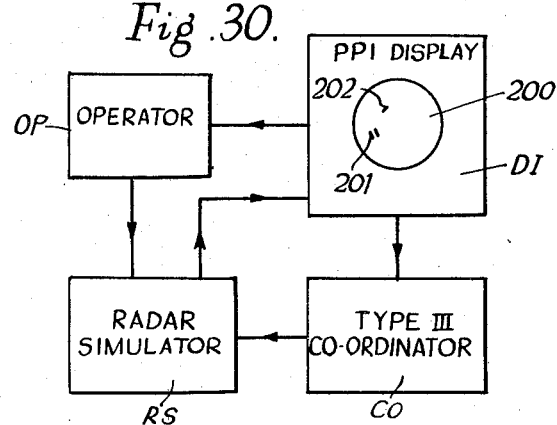
Fig. 30.
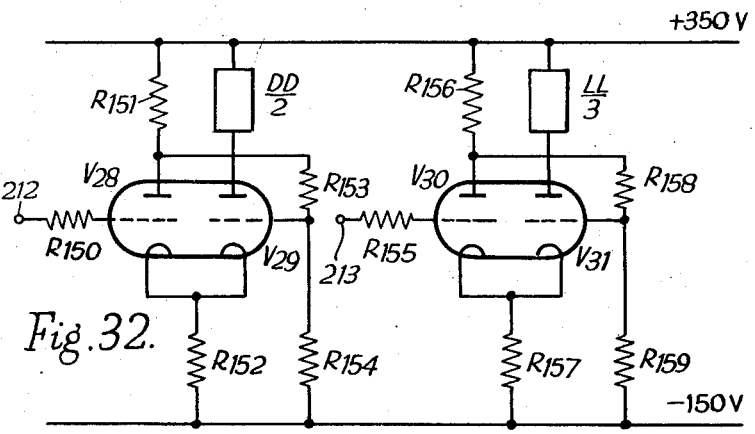
Fig. 32.
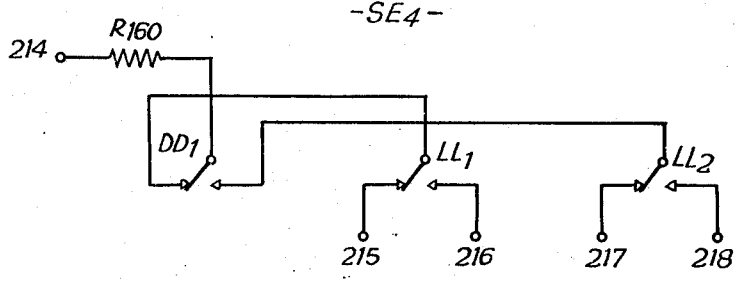

May 16, 1961    A. G. S. PASK    2,984,017
APPARATUS FOR ASSISTING AN OPERATOR IN PERFORMING A SKILL
Filed Aug. 30, 1957    30 Sheets-Sheet 29

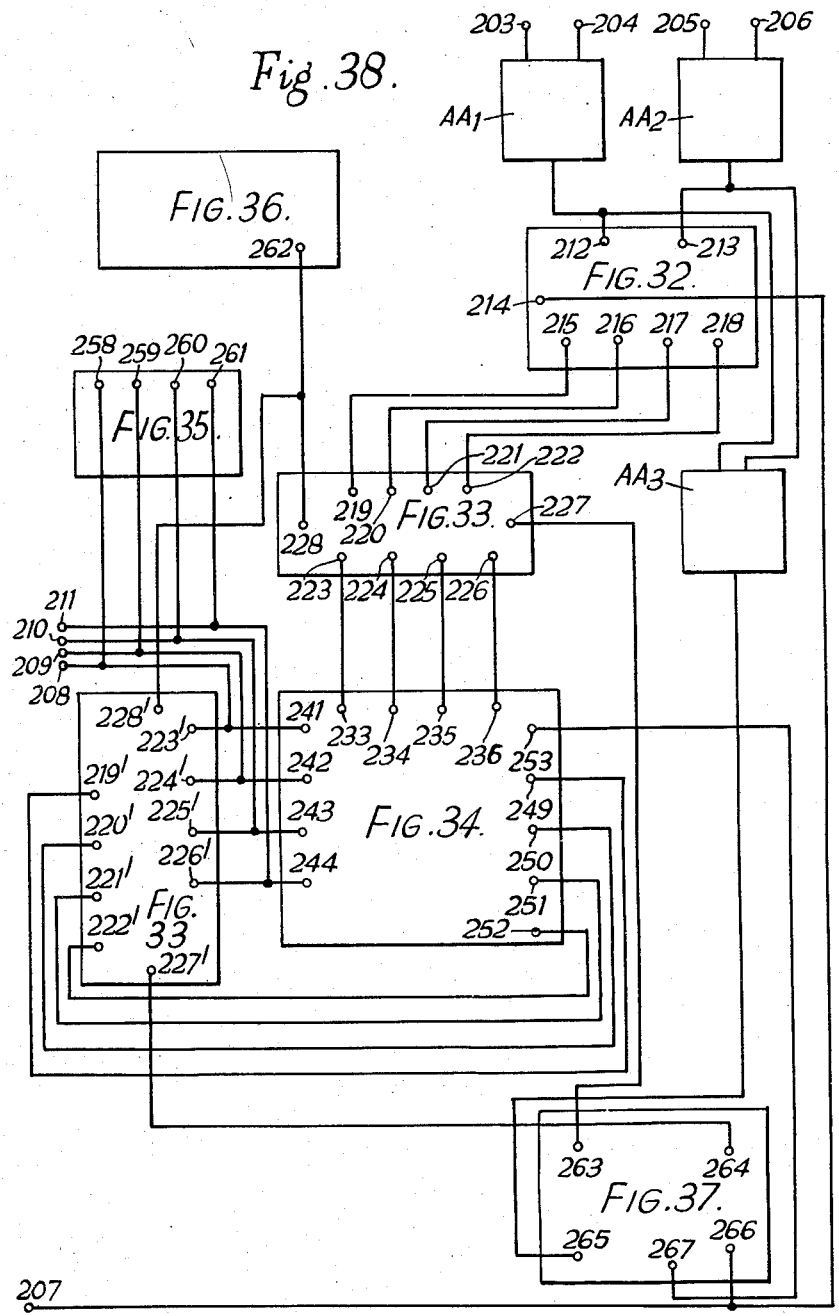

United States Patent Office 2,984,017
Patented May 16, 1961

2,984,017
APPARATUS FOR ASSISTING AN OPERATOR IN PERFORMING A SKILL

Andrew G. S. Pask, London, England, assignor to The Solartron Electronic Group Limited, Thames Ditton, Surrey, England, a British company Filed Aug. 30, 1957, Ser. No. 681,267

42 Claims. (Cl. 35—8)

The present invention relates to apparatus for assisting an operator in performing a skill and is concerned particularly but not exclusively with apparatus for teaching an operator to perform a skill.

In this specification a skill is intended to mean acts an operator is required to perform in response to data supplied to him. Thus the operator may be supplied with data visually and be required to perform manual operations, such as pressing buttons or turning knobs, in response thereto. A telephone operator who has to insert a plug in a given jack whenever a certain flap falls down is performing a fairly simple skill. A plant control engineer who observes a set of dials and manipulates control switches, valves, etc. in response to the indications of the dials performs a more complicated and difficult skill.

The examples given above illustrate two different types of skills. The telephone operator responds to stimuli which occur at spaced intervals in time and each time a response is made it is either right or wrong: that is the right jack is or is not selected. Thus the degree of success of the telephone operator may be largely measured by observing what proportion of his responses are correct. In connection with this same type of skill another important quantity which may be measured is the average time taken for the operator to respond to a stimulus, and this is a particularly important measure of success when the rate at which a skill is performed is limited not by the rate at which stimuli occur, but by the rate at which the operator can deal with stimuli.

The second of the two types of skill referred to is exemplified by the plant control engineer who is supplied continuously with data. The times at which any responses are to be made are determined by the judgment of the engineer. Some of his responses are capable of being judged "wrong," as it may be known, for instance, that they will definitely lead to an undesired result, for example to an explosion. However, many responses cannot be said to be "right" or "wrong," and the engineer's degree of success can only be judged by measuring the efficiency with which he operates the plant.

Having discussed these examples of skills, certain factors which make an operator inefficient in performing a skill, or which render a training routine inefficient, will be considered.

If the operator is receiving data at too slow a rate, he is likely to become bored and attend to other irrelevant data.

If the data given indicates too precisely what responses the operator is required to make, the skill becomes too easy to perform and the operator again tends to become bored.

If the data given is too complicated or is given at too great a rate, the operator is unable to deal with it. He is then liable to become discouraged and lose interest in performing or learning the skill.

Ideally, for an operator to perform a skill efficiently, the data presented to him should always be of sufficient complexity to maintain his interest and maintain a competitive situation, but not so complex as to discourage the operator. Similarly these conditions should obtain at each stage of a learning process if it is to be efficient. A tutor teaching one pupil seeks to maintain just these conditions.

Normally, however, systems which require data to be transmitted to an operator are inefficient, often because attention cannot be given to the individual. Inefficiency must then arise because individuals vary so much from one to another and vary so much from time to time.

In order to overcome such inefficiency the data needs to be "coded" in such a manner that it is optimally matched into the operator, that is, the data actually supplied to the operator has to be made such that it is adapted to the capabilities of the operator at all times. In the case of performance of a skill, as distinct from learning a skill, the data to be dealt with being externally determined without reference to the operator, what has to be "coded" is existing data. In the case of teaching a skill, the "coding" needs to be more far-reaching, and does not merely have to modify the way in which the data is presented, but also has to modify what data is presented.

In either case the aim must be to match the data into the operator continuously, even though his characteristics are always varying.

The present invention has for one of its obects to provide apparatus, which effects such a matching, and therefore enables an operator to perform a skill efficiently. In this way not only may an operator learn a skill efficiently but also how a skill may be performed in a more efficient manner may be determined.

The invention is based upon the realization that any apparatus capable of effecting such a matching must comprise a device having characteristics like those of an operator, insofar as an operator is non-stationary and trainable. The operator is here called non-stationary because his characteristics cannot be represented as a set of transfer functions.

Accordingly reference will hereinafter be made to "trainable assemblages," to indicate assemblages which can be so "trained" or modified by performance characteristics of the operator that, with reference to the skill in question, they come to have characteristics related to those of the operator.

According to the present invention there is provided apparatus for assisting an operator in performing a skill, comprising a marking device adapted to be supplied with input signals representative of the responses of an operator to data supplied to him, and to generate output signals representative of the operator's degree of success in responding to the data, in at least four channels, each corresponding to a different category, each category being determined by one or more characteristics of the skill, a trainable assemblage having its input coupled to the marking device in such a manner as to have its state determined by the output signals and to generate, in dependance upon such state, from time to time or continuously, control signals suitable to control one or more parameters of the data-supplying means in such a way as to tend to increase the said degree of success to an optimum value, and to maintain the degree of success at this optimum value.

The word "marking" has been chosen to characterize the device adapted to generate output signals representative of the operator's degree of success since the device acts in a manner analogous to an instructor who marks or assesses the performance of a pupil.

The expression "trainable assemblage" as used herein is defined as an assemblage including at least four storing means storing quantities determined by signals applied to the input of the assemblage over a period of time, and whose state at any instant can be represented by a vector whose components are the quantities held at that instant by the storing means respectively. The storing means are conveniently capacitors, as hereinafter described, but may take other forms.

The assemblage must comprise at least four storing means in order to make it complicated enough to assume states which have characteristics related to those of the operator. Thus there will be some pattern in the state of the assemblage related to some pattern in the responses of the operator. It is in order to enable such a related pattern to exist in the assemblage that the output signals representative of the operator's degree of success must be provided in a plurality of channels each corresponding to a category determined by one or more characteristics of the skill.

Thus in skills wherein the data supplied to the operator consists of discrete indications selected from a finite number of such indications and the operator is required to make corresponding discrete responses selected from a finite number of responses, the categories may correspond to the responses, respectively. The indications and responses from which indications and responses are selected will be called populations of indications and responses, respectively.

In skills such as those described in the preceding paragraph wherein each response may be marked in more than one marking category, the categories to which the storing means respond can be further subdivided, the total number of categories being the number of responses of the population of responses multiplied by the number of marking categories employed. For example, there will hereinafter be described an embodiment of the invention (referred to as a Type II coordinator) having a population of twelve discrete indications and a population of twelve corresponding responses. Each response, however, requires two switches to be pressed and the operator may make a correct of an incorrect response in two marking categories. Accordingly the marking device has twenty-four output channels, and the assemblage has twenty-four storing means, which as will be described are twenty-four capacitors of two storage matrices.

In skills, such as that of chemical plant control, where there is no finite population of indications or responses, but, where, rather, the operator determines a strategy in response to data which presents a picture of a situation, the divisions between categories have to be determined more arbitrarily. Very often some categories can be determined by imposing marking categories in the apparatus. For instance in an embodiment to be described hereinafter under the name of a Type III coordinator, four marking categories are imposed in dependence upon the spatial relationships between two spots of light on a cathode ray tube screen (one spot representing a target aircraft and the other a pursuing aircraft). Furthermore four "strategy categories" are imposed in this embodiment, in dependence on four strategies that the spot of light representing the escaping aircraft can adopt. This enables a total of four times four, namely sixteen, categories to be defined and the trainable assemblage in this embodiment comprises sixteen capacitors.

Having discussed the trainable assemblage and the types of categories with which its storing means may correspond, the nature of the input signals to the marking device and the nature of the marking device will be considered.

In apparatus for assisting an operator to perform a skill wherein the operator is required to make a succession of discrete responses the input signals may be pulses, which may, for example, be present only when a response is correct. Alternatively pulses may be present in one circuit when the operator makes a correct response and present in another circuit when the operator makes an incorrect response. The marking computer may then comprise an integrating device which computes a marking variable measuring the average number of correct responses in unit time. Furthermore, as described hereinafter, for example, in connection with the embodiment of the invention under the name of the Type I coordinator, this variable may be increased by correct responses and decreased by incorrect responses and may furthermore be "compensated," that is the amount by which it is increased by a correct response may be made dependent on how long before a limit time the response is made. Thus a variable representative of the operator's degree of success over a period of time is derived.

In cases where the operator determines a strategy, the input signals to the marking device may include a signal representing, for instance, in the case of a "pursuit" skill in which the operator tries to bring one pointer or spot of light into coincidence with another pointer or spot of light, the deviation between the two pointers or spots of light. In this case the marking computer may provide a compensated marking variable by subtracting from this signal a signal representing the expected deviation, computed for instance from the state of the trainable assemblage. In the case of chemical plant control, a compensated marking variable may be computed by subtracting a signal representing an expected rate of production from a signal representing the actual rate of production.

The input signals to the marking device need not be of the nature exemplified above, but may, for example, be derived by measuring a physiological or a psychological variable of the operator, as will be hereinafter described.

Some examples of characteristics of the data supplied to the operator which may be varied will now be considered, pointing out how they may be varied in such a manner as to increase the operator's degree of success to an optimum value.

For skills wherein the data consists of discrete indications and where, accordingly, each indication may be regarded as a selection from a finite number of possible indications, various characteristics may be varied. Fundamentally the rate at which the indications are presented may be increased as the operator increases his degree of success, but this is not sufficient by itself to achieve the desired results. Such an increase in rate could be achieved without a trainable assemblage, but it has been found that this does not lead to satisfactory results. The apparatus becomes "oscillatory," getting alternately too fast and too slow for the operator. In apparatus concerned with such skills it is for this reason that the trainable assemblage is required. The trainable assemblage is able to vary some characteristic in a "patterned" manner, that is to different degrees in the different categories.

Thus superimposed upon the average increase in the rate of presentation of the indications there may be a "patterned" increase, the operator being required to respond more quickly to indications in a category in which the operator has achieved a relatively high degree of success, than to indications in categories in which the operator has achieved a relatively low degree of success.

It will be appreciated that such an increase in rate may be described, alternatively, in terms of the determination of the positions in time of limit times before which responses to the indications must be made.

Another characteristic which may be varied is the clarity with which the indications are made. Thus the discrete nature of the indications may be blurred by displaying all the indications all the time, accentuating only the relevant indication. This may be described by saying that "ambiguity" is introduced in the indications. The ambiguity is of course "patterned." Also, when the indications occur in a repeated sequence in a training routine, the appearance of the indication, or the time at which it becomes apparent which indication is the relevant one when ambiguity is being introduced, may be delayed, in a "patterned" manner, so that the operator has to remember the sequence in order to achieve a high degree of success.

In skills wherein each discrete indication requires a number of discrete responses, the number of responses required per indication may be increased as the operator's degree of success increases. For instance, each indication may consist of flashing up a sequence of symbols, each of which requires a corresponding key or switch to be pressed, and the length of the sequence of symbols may be progressively increased. This procedure would be appropriate in teaching a skill such as typing.

Although the procedures outlined above are adequate for making the data presented to the operator more and more difficult to deal with, they are not so well adapted to help the operator in stages in a learning process where he needs help. In the early stages of learning a skill an operator does not usually merely require the apparatus to be not too competitive, but he requires the apparatus to be actively co-operative if he is to learn the skill efficiently.

Thus "corrective information" may be added to the data in a "patterned" manner, the corrective information indicating to the operator directly which response is required. In a skill wherein the responses are made by pressing switches or keys, the corrective information may be provided by lights adjacent the switches or keys which light up when the switch or key to which they are adjacent is to be pressed. Corrective information may then be withdrawn by decreasing the intensity of these lights and causing them to light up progressively later and later, that is nearer to the limit time.

In other embodiments of the invention the operator may be provided with "anticipatory information," such embodiments being particularly useful for purposes of mental testing. The use of apparatus according to the invention for purposes of mental testing will be described hereinafter. Anticipatory information may be in the form of an indication to the operator that he is shortly to be provided with data to which he is to make a response. The anticipatory information may then be provided, for example, by means adapted to flash a warning light a short time before the data is caused to appear. Furthermore the means may be adapted to decrease the interval between the flashing of the warning light and the appearance of the data as the operator's degree of success increases.

When the data is supplied visually, anticipatory information may also be in the form of a short preview of the data to be formally supplied at a later time. The data is formally supplied at the instant of time from which the operator's response time is measured. For instance, in an embodiment of the invention wherein the data is formally supplied by illuminating a line of symbols, each of which has to be recognised by the operator and responded to appropriately, the line of symbols may be briefly illuminated a short time before they are formally illuminated, and again the length of the interval between the brief illumination and the formal illumination may be decreased as the operator's degree of success increases.

In apparatus teaching a skill wherein the operator determines a strategy, the apparatus in effect determines a strategy with which it plays against the operator. Since this strategy may be made more or less competitive or co-operative, the need for the separate provision of corrective information is decreased.

Although so far the concept of selection from a population of possible contingencies has only been used in discussing the teaching of skills wherein discrete indications are selected from a finite number of indications, the concept may in fact be universally applied. When the apparatus determines a strategy, that strategy will frequently be one of an infinite number of possible strategies. The apparatus may thus be said to select from an infinite population of possible contingencies. Likewise the operator's responses may always be regarded as a selection from a population, finite or infinite, of possible responses.

In this terminology the function of the apparatus may be described as follows. The operator is provided visually, by touch, or by other sensory paths, with data or information from a "display." In response to this information the operator performs selective operations on a population or set of responses and appropriate signals are fed to a marking device which also, in general, receives signals from the trainable assemblage and provides output signals to the assemblage. The trainable assemblage may also affect the said appropriate signals directly to effect a scaling procedure whereby the computation of a compensated marking variable is facilitated. The output signals alter the state of the trainable assemblage by varying the quantities held by its storing means. Control signals derived from the assemblage are used to effect selective operations on a population or set of possible contingencies and thereby the data "displayed" to the operator by the "display" is largely determined. However the actual representation of this data is coded, again under the control of the trainable assemblage, in order to present the data in a manner appropriate to the operator.

A scaling procedure, mentioned above, may for instance be effected, in apparatus wherein the operator makes responses by turning a knob, by providing a servo-mechanism which controls a gear-ratio in a drive between the knob and the device which the knob actuates, thereby varying the sensitivity of the actuation. The servo-mechanism is controlled by the apparatus and the sensitivity of the actuation may be increased as the operator's degree of success increases.

It will be apparent from the foregoing that embodiments of the invention may take a very wide variety of forms. Accordingly three embodiments of the invention will be described in detail, and as indicated previously these will be called a Type I coordinator, a Type II coordinator, and a Type III coordinator.

The three types are by no means representative of all the different forms the invention may take, but they do illustrate some important distinctions between different forms of apparatus according to the invention.

One important division of types is between those, including Type I and Type II coordinators, in which the coordinator is adapted to teach a predetermined routine and adapts the rate and manner of presentation of the routine, without varying the basic routine itself, and those, including Type III coordinators in which the coordinator is adapted to teach a basic routine within which, however, it adopts a strategy, that is it "plays against the operator," adapting its strategy to suit the skill of the operator. This division of types is determined by the nature of the coordinator.

Another important division is between those types, including Type I coordinators, in which the responses which the operator is required to make are of the same nature as the instructions given to the operator, and those types, including Type II and Type III coordinators, in which the responses are of a different nature from that of the instructions.

Thus the properties of the three types of coordinator will now be summarized and briefly exemplified by reference to the embodiments to be described later.

Type I coordinators: (a) Operate in a fixed training routine, varying the rate and manner of presentation of the routine.

(b) Responses are of the same nature as the instructions given.

Thus in the embodiment to be described instructions are given by a plurality of lamps which light up in a fixed sequence, the operator being required to press one corresponding switch for each lamp when it lights up. Both the sequence in which the lamps light up and the correspondence between the lamps and the switches is made of a random nature, so that to perform the skill the operator has to learn the correspondence and the sequence.

Type II coordinators: (a) Operate in a fixed training routine, varying the rate and manner of presentation of the routine.

(b) Responses are of a different nature from that of the instructions given.

In the embodiment to be described instructions are given by a plurality of lamps which light up in a fixed sequence, the operator being required to press two switches of two groups of switches respectively for each lamp when it lights up.

Type III coordinators: (a) Operate in a basic routine within which they adopt a strategy.

(b) Responses are of a different nature from that of instructions given.

In the embodiment to be described instructions are given by the position of two spots of light on a cathode ray tube, the operator being required to adjust control knobs to bring one spot of light (representing a pursuing aircraft) into coincidence with the other (representing a target aircraft). The coordinator adopts an "escape strategy" which makes the target aircraft sufficiently elusive to maintain the operator's interest, but not so elusive that the operator feels he has no chance of ever catching the aircraft.

This embodiment of a Type III coordinator has also been chosen because it is concerned with continuous variables, the operator achieving success as he gets the pursuing aircraft nearer the escaping aircraft, whilst the other embodiments are concerned with discrete variables, the operator achieving success as he makes more and more correct responses more and more quickly.

In modifications of both the Type I and the Type II coordinator (of which modifications no detailed embodiments are described), the said fixed training routine is made one of a plurality of routines, the coordinator being adapted to present different routines in succession, that routine in which the operator is least successful being presented most frequently.

It will be appreciated that whilst, for simplicity of description, embodiments of Type I and Type II coordinators have been described which teach arbitrary skills of no practical use, other embodiments may teach an operator to use a typewriter, a desk computing machine or a punched card keyboard for example.

Figure 3:
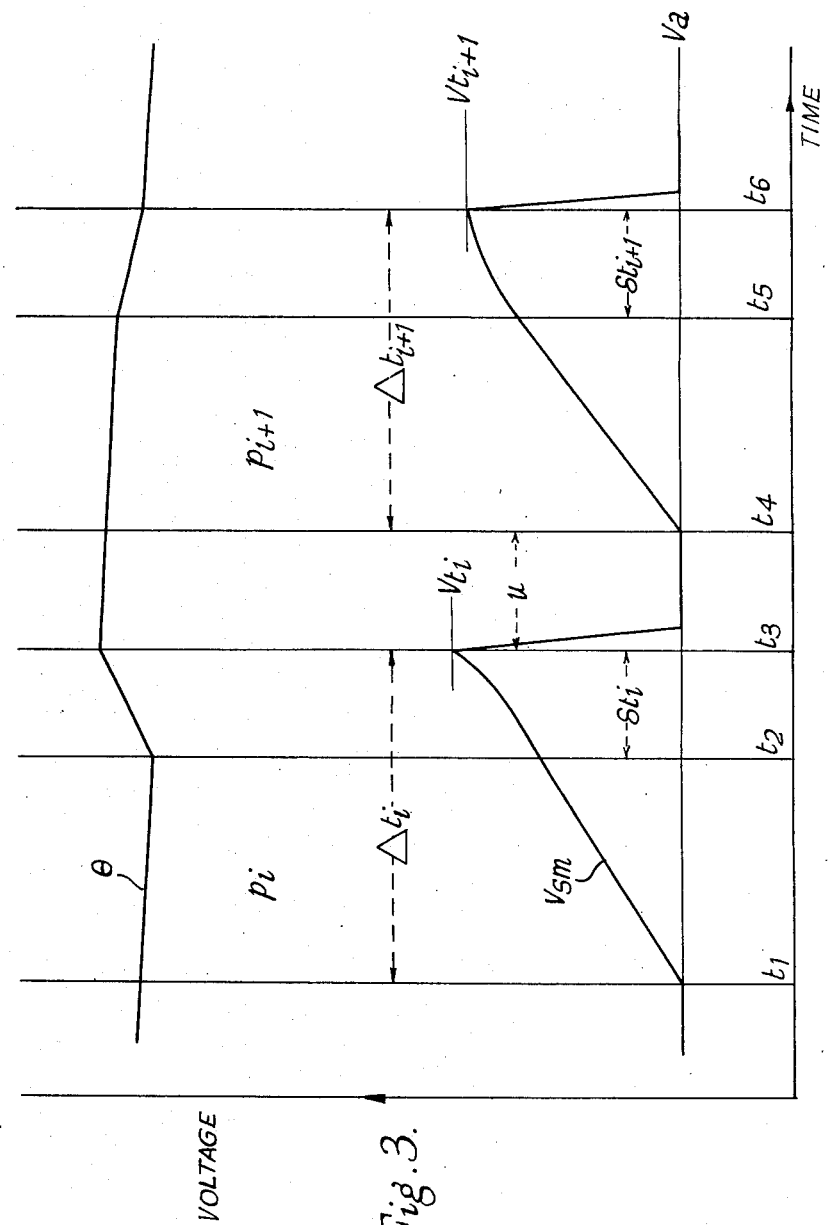
Figure 4:
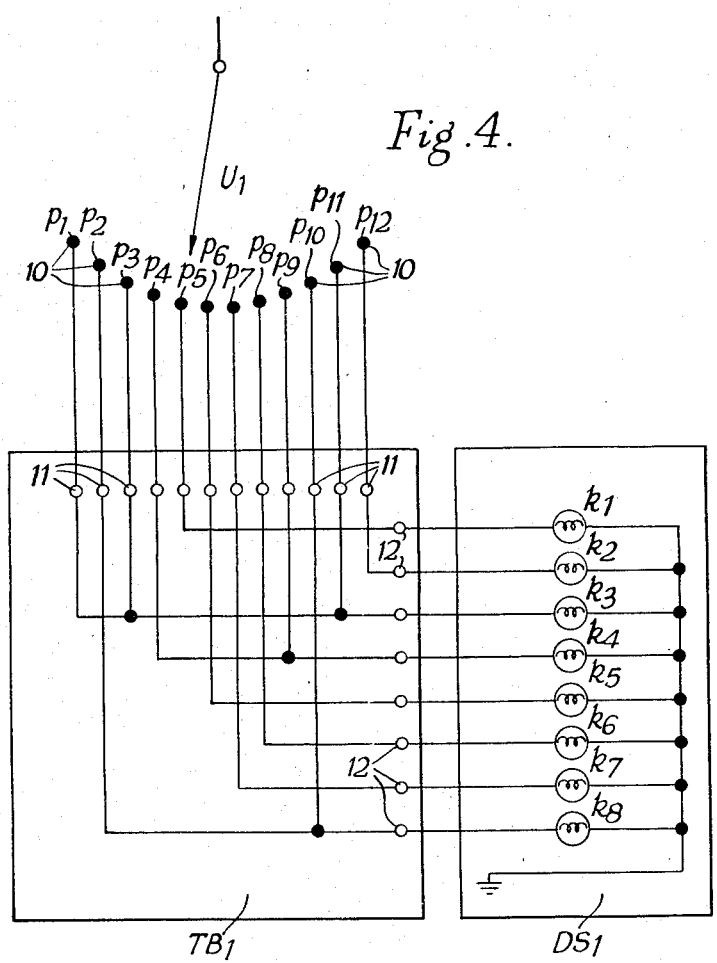
Figure 5:
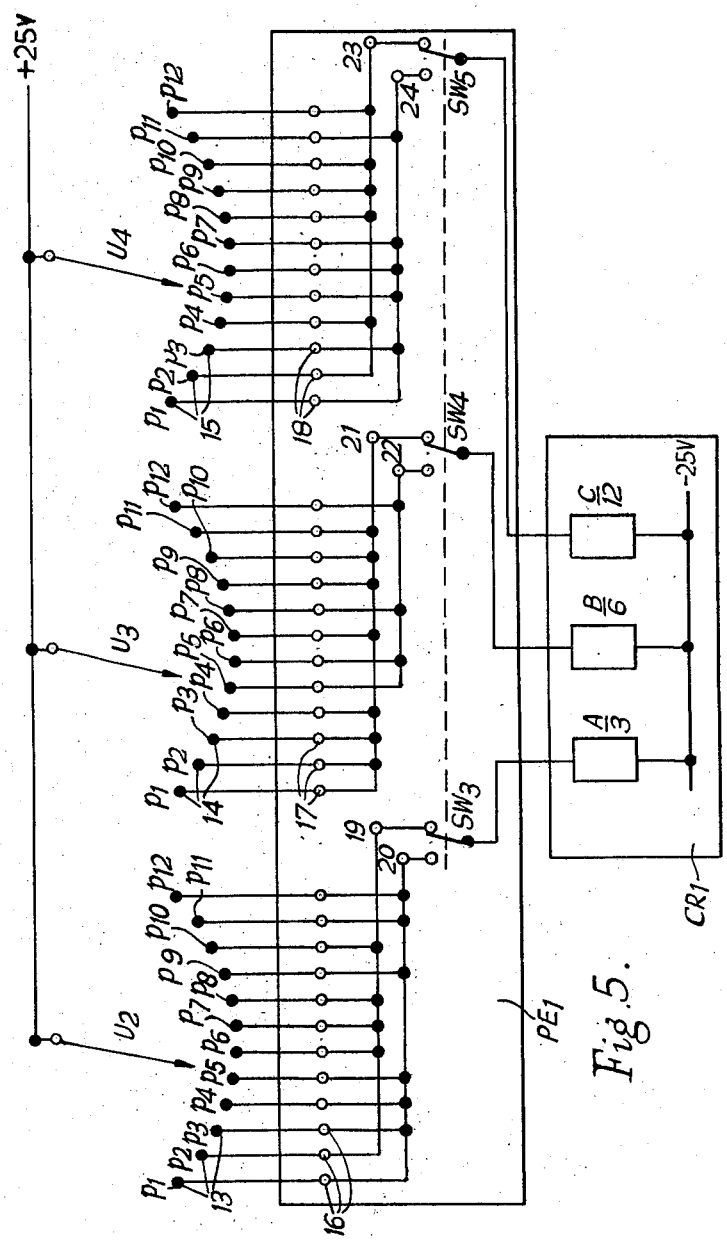
Figure 6:
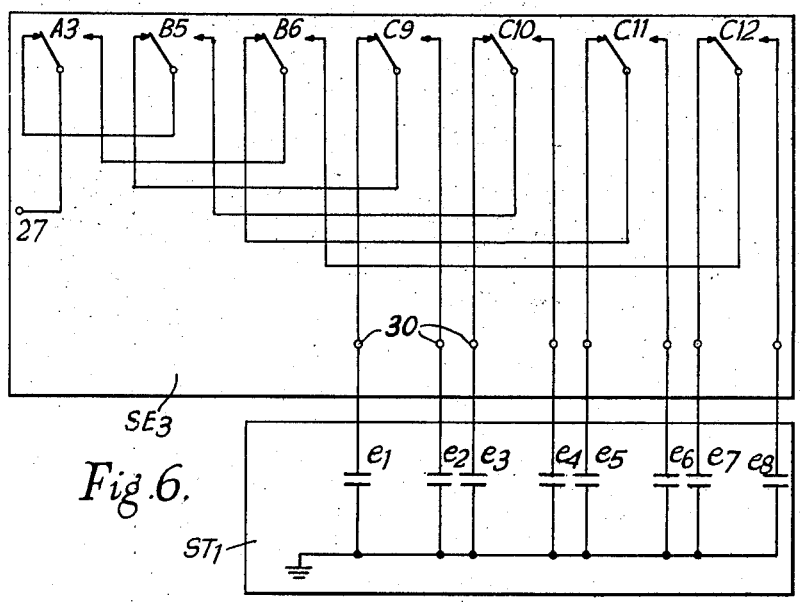
Figure 7:
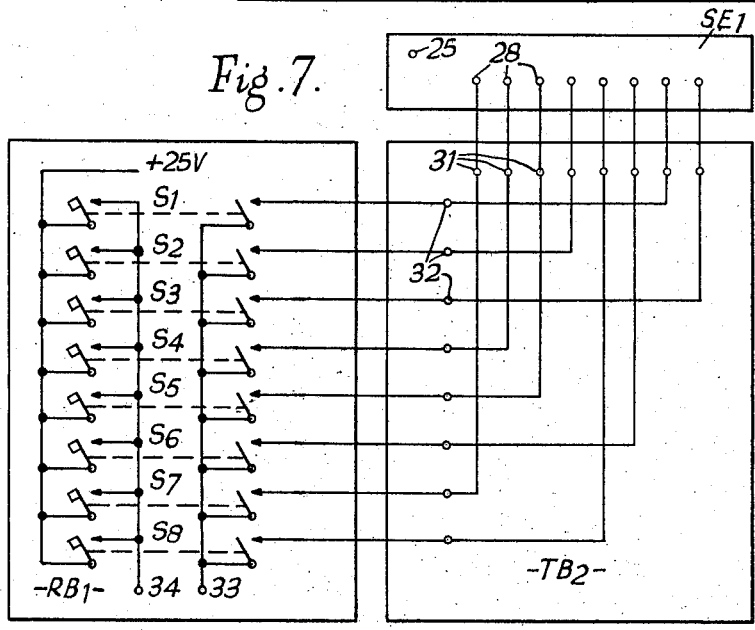
Figure 9:
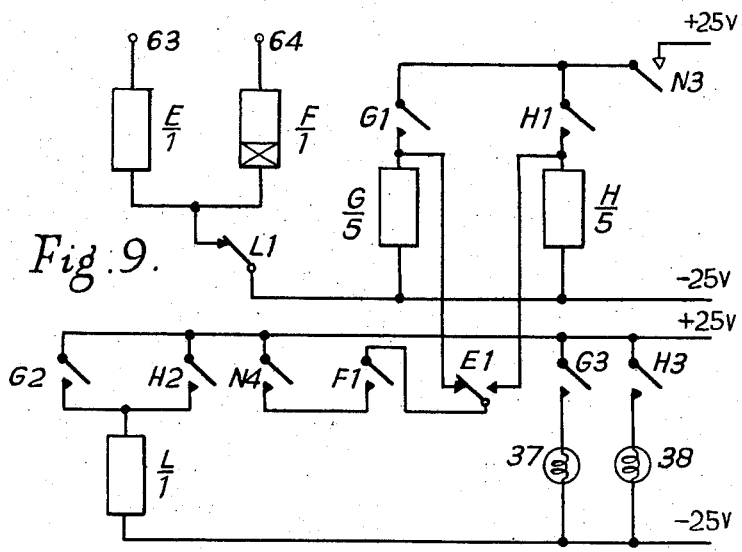
Figure 8:
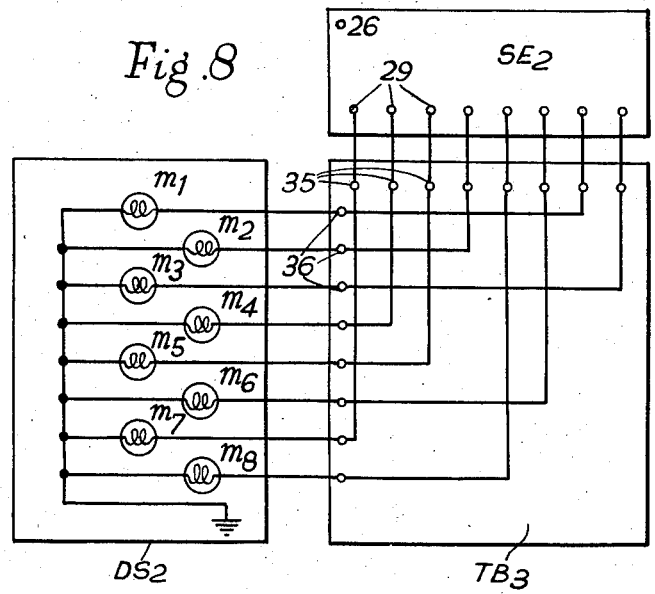
Figure 10:
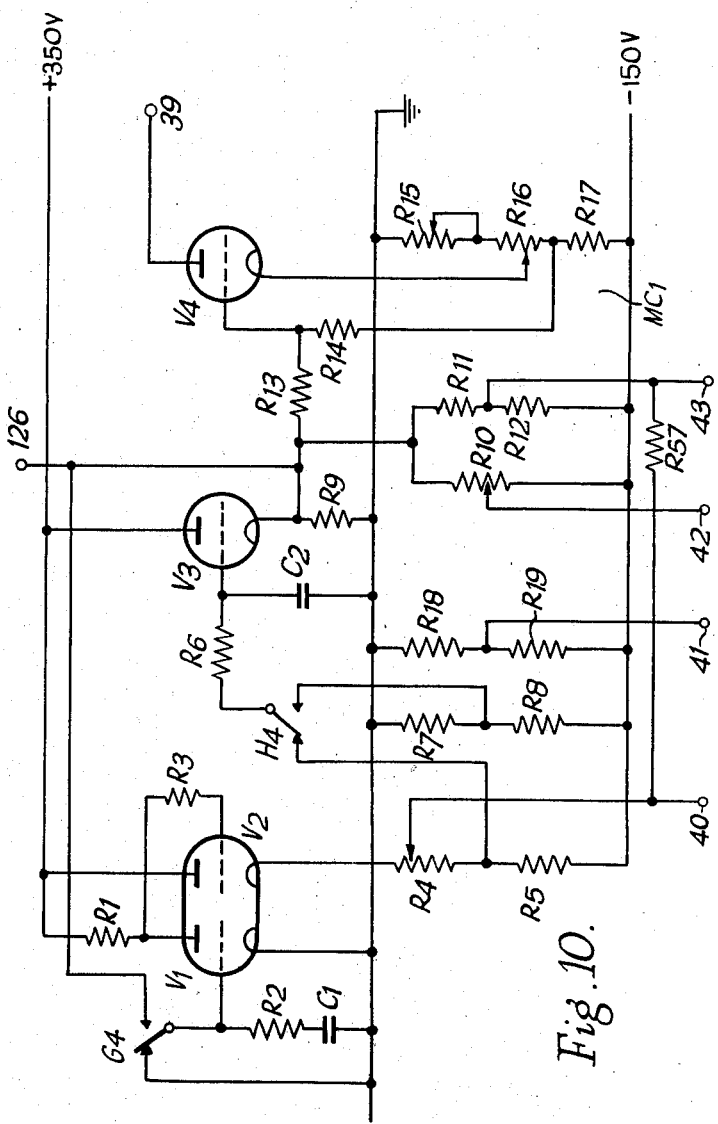
Figure 16:
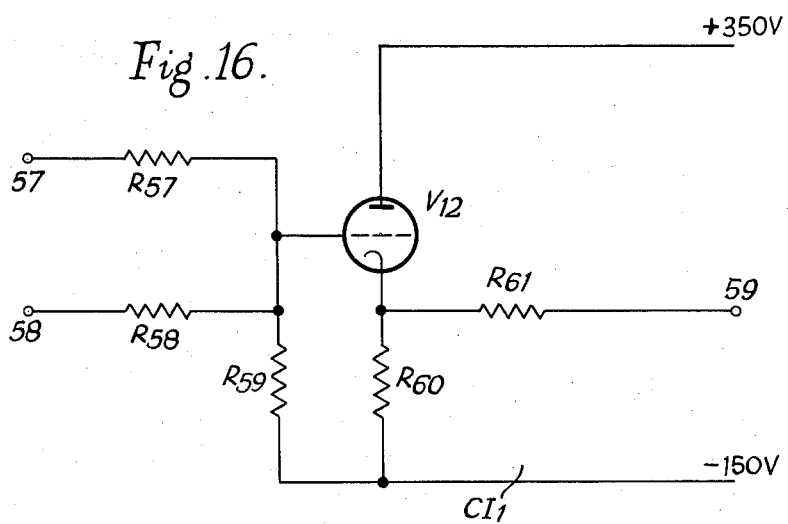
Figure 17:
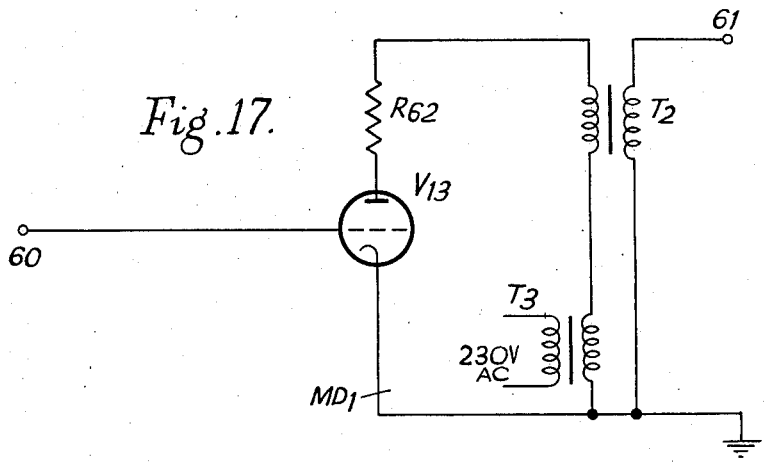
Figure 18:
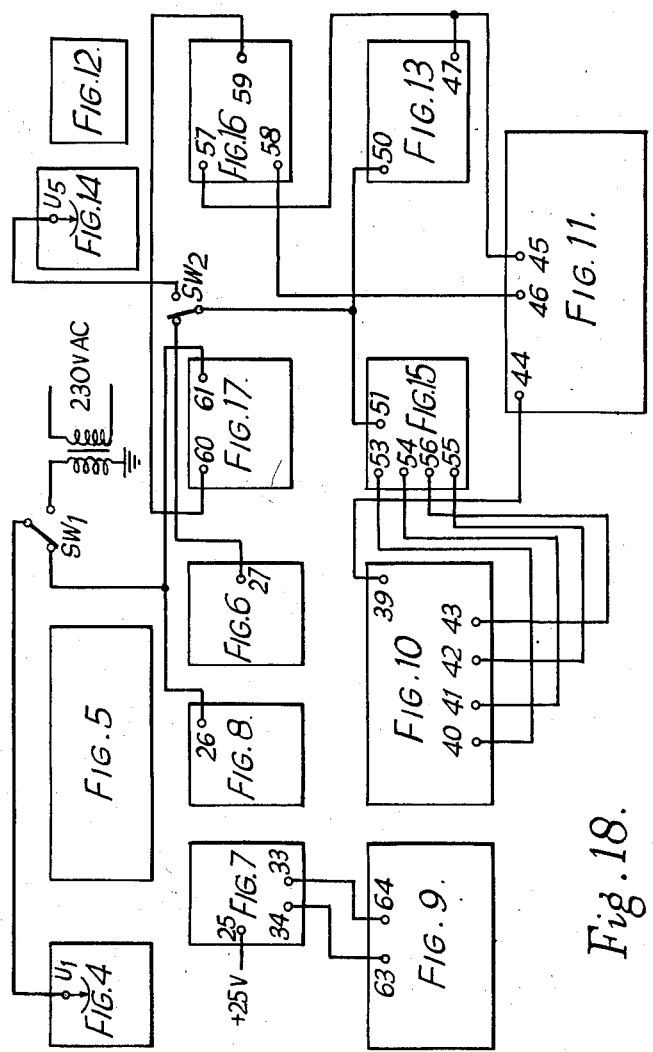
Figure 19:
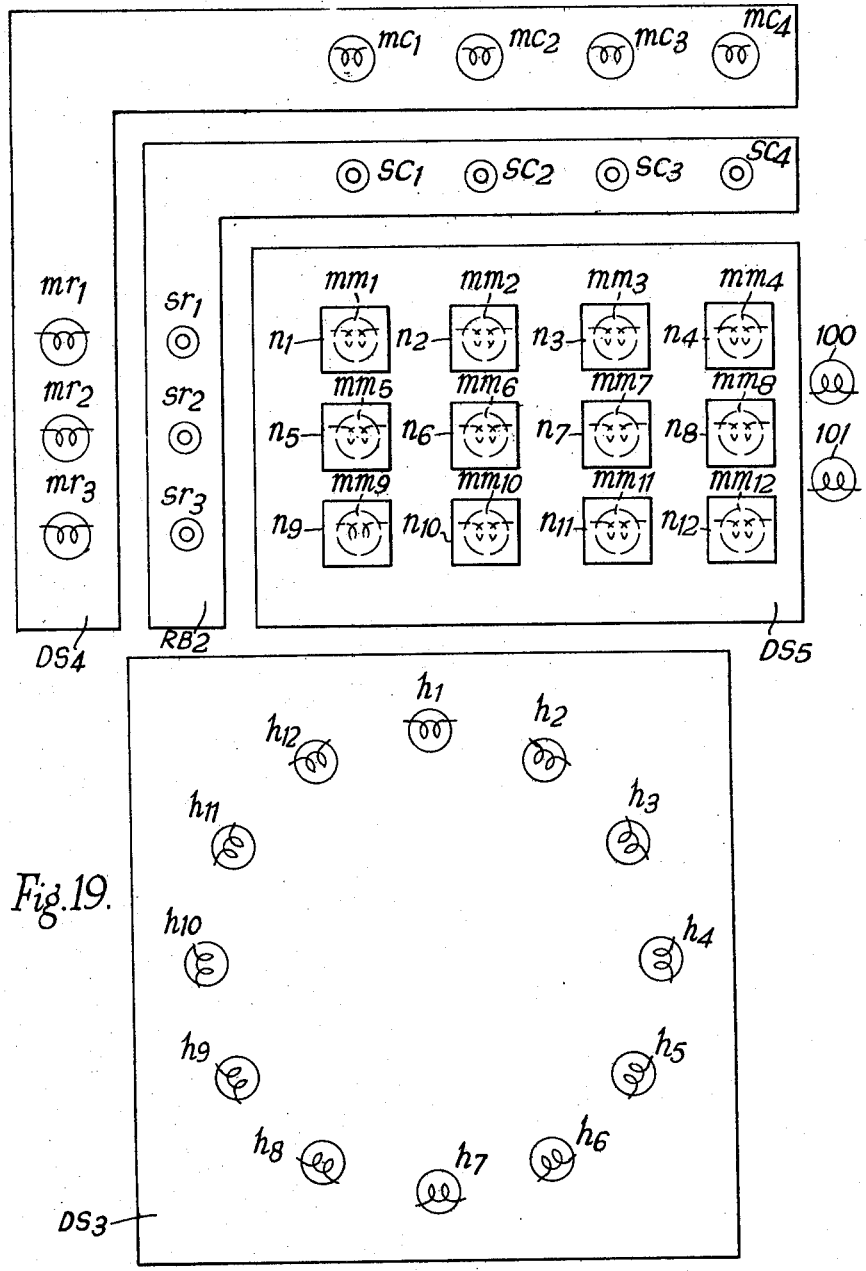
Figure 20:
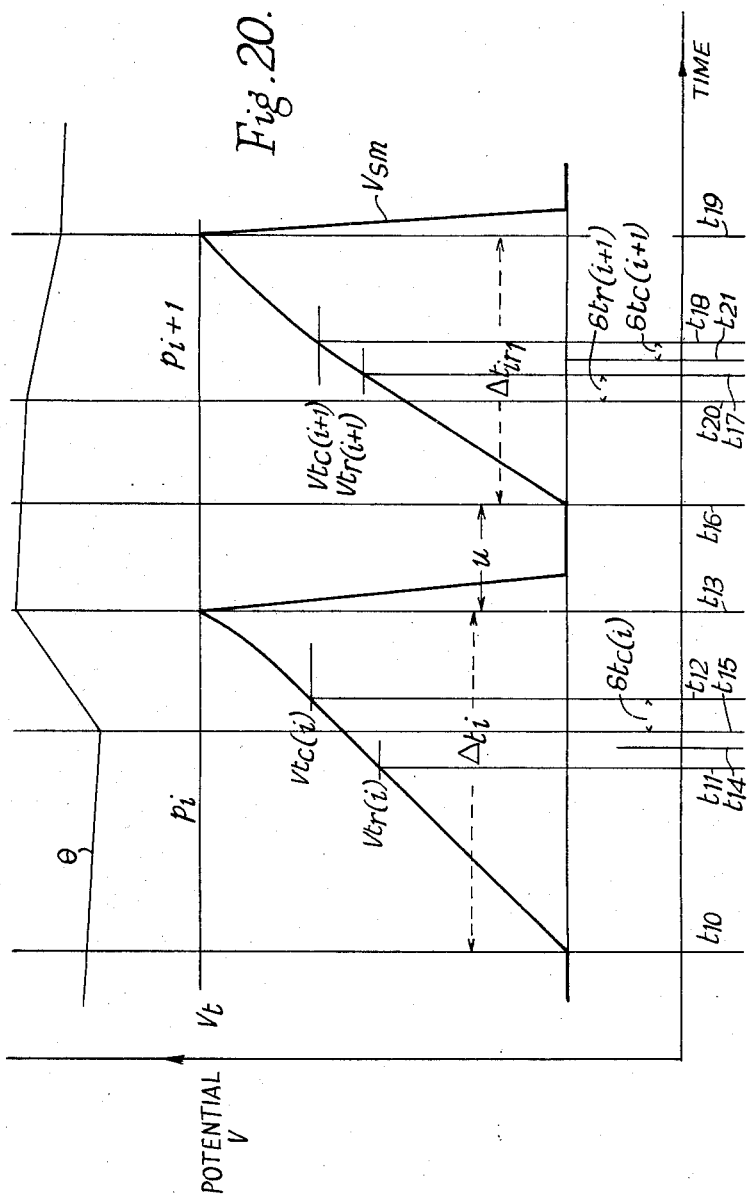
Figure 21:
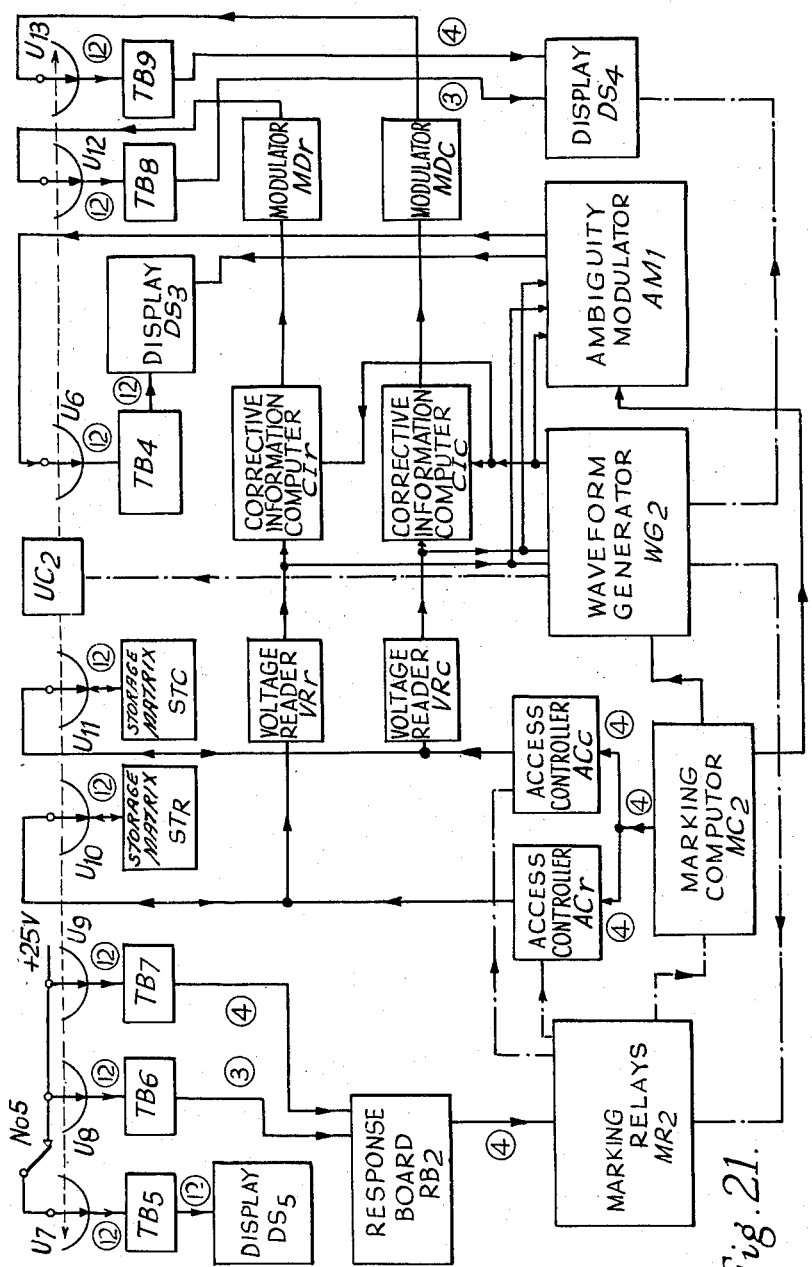
Figure 22:
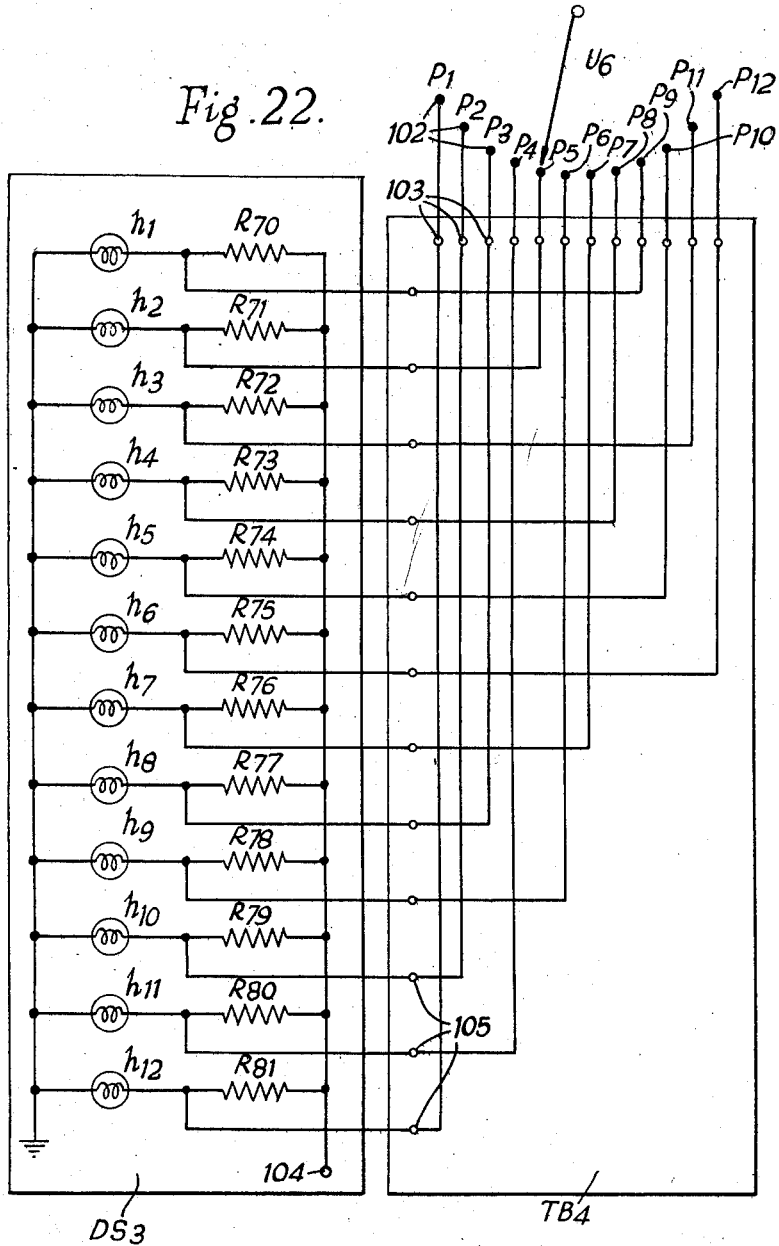
Figure 23:
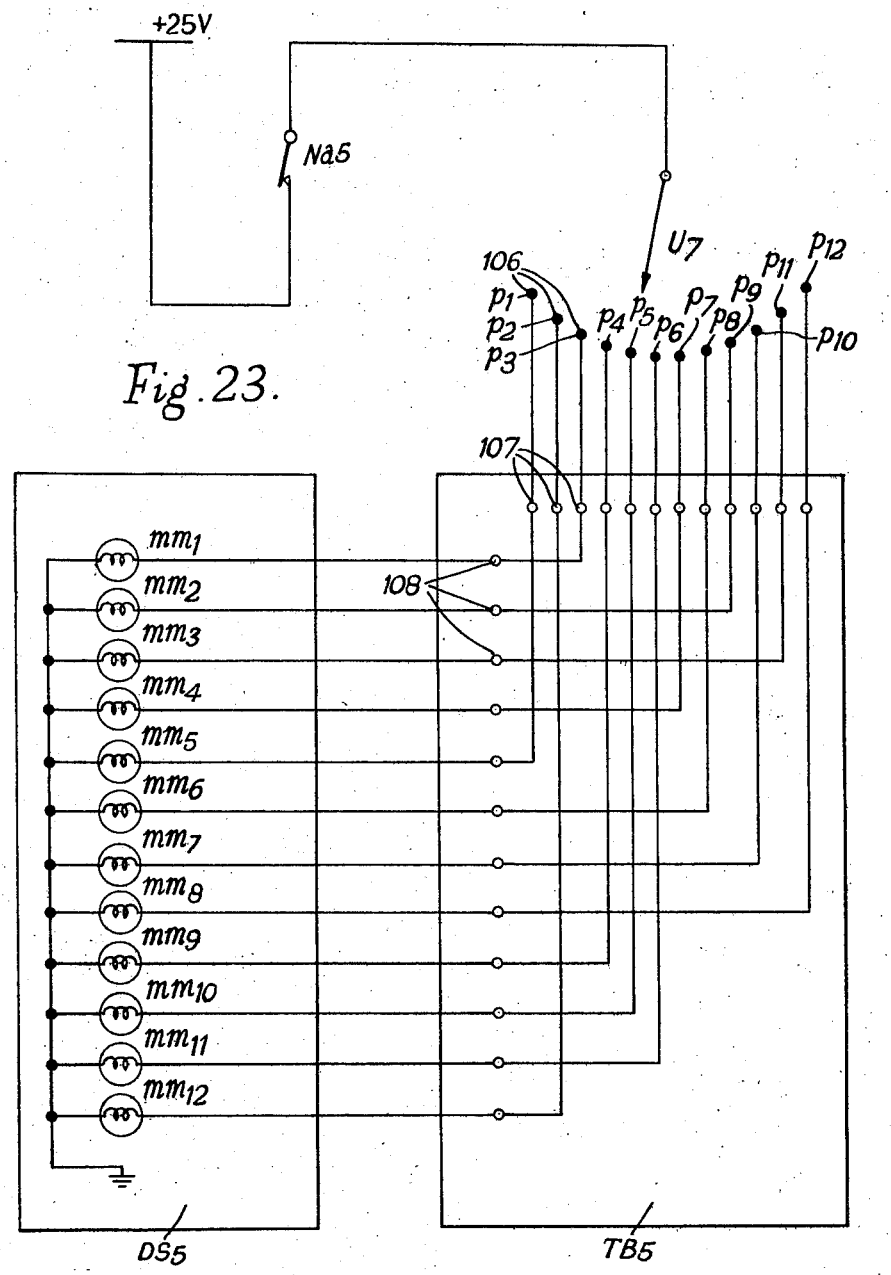
Figure 24:
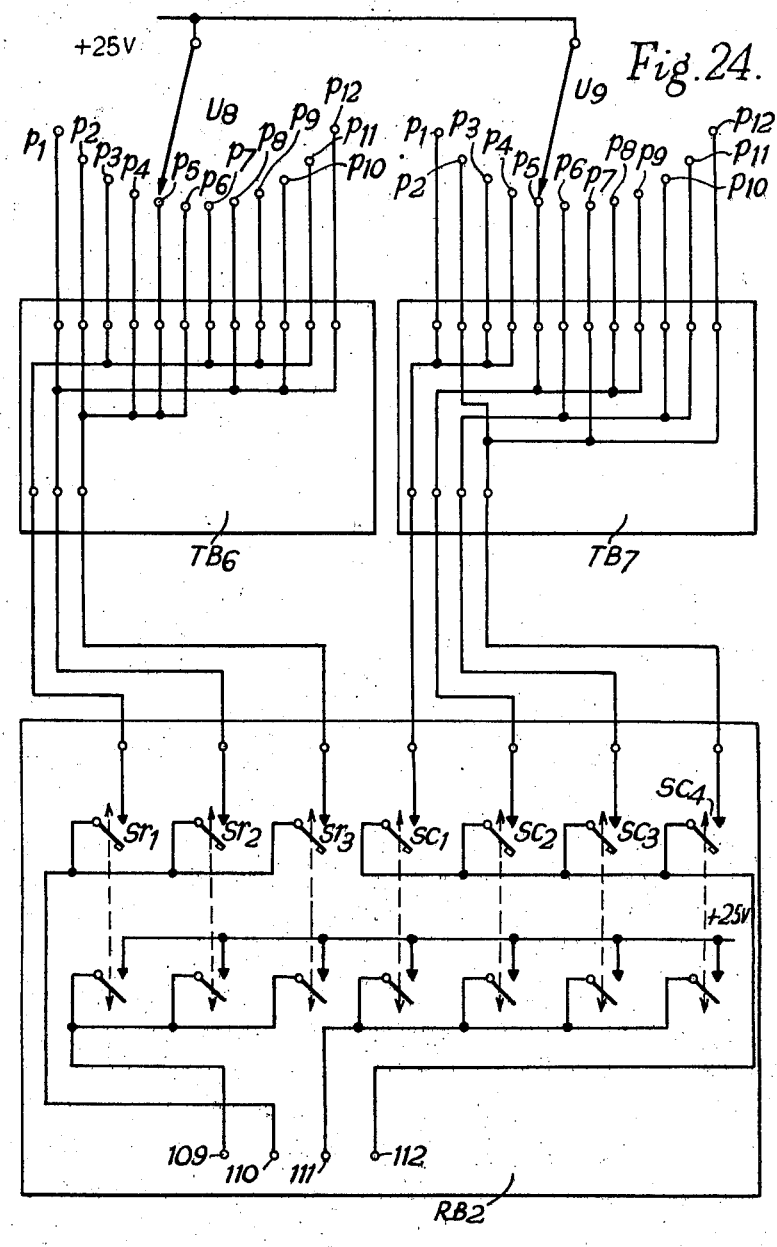
Figure 25:
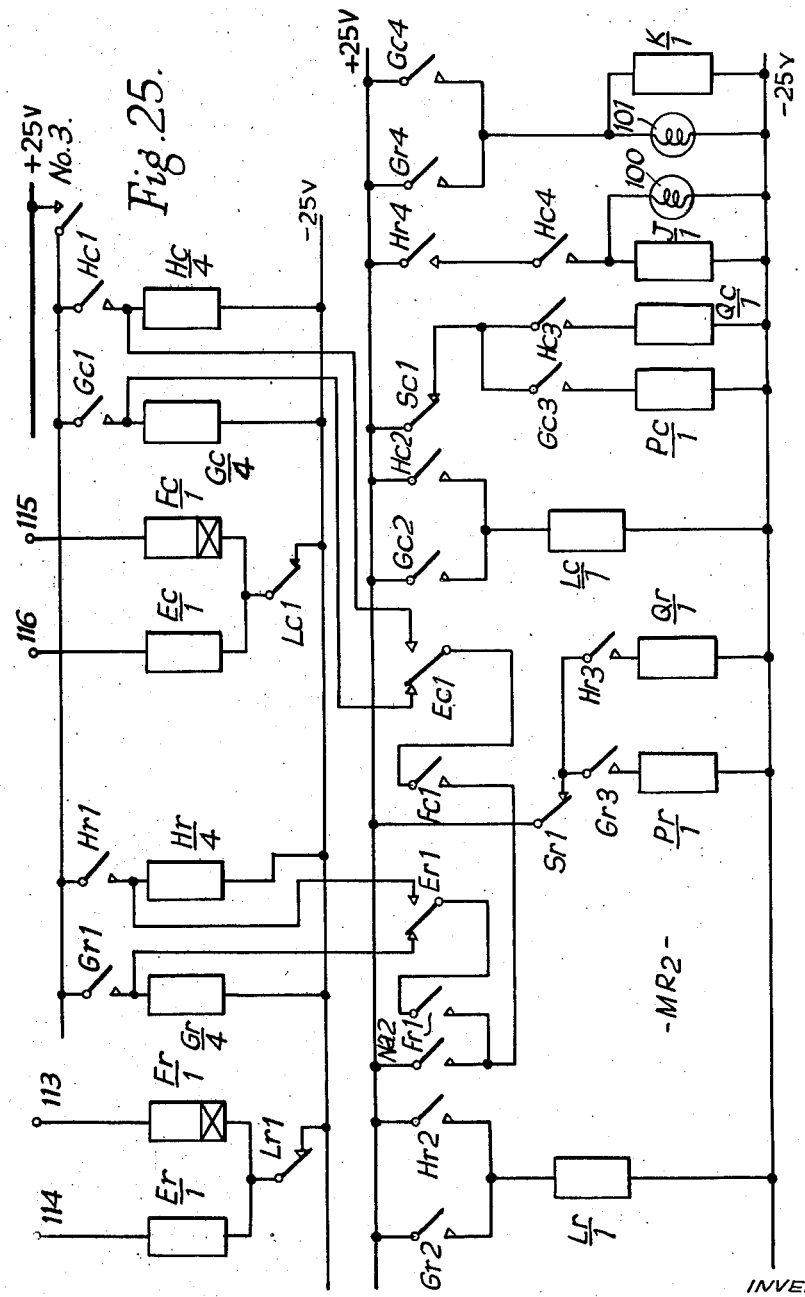
Figure 27:
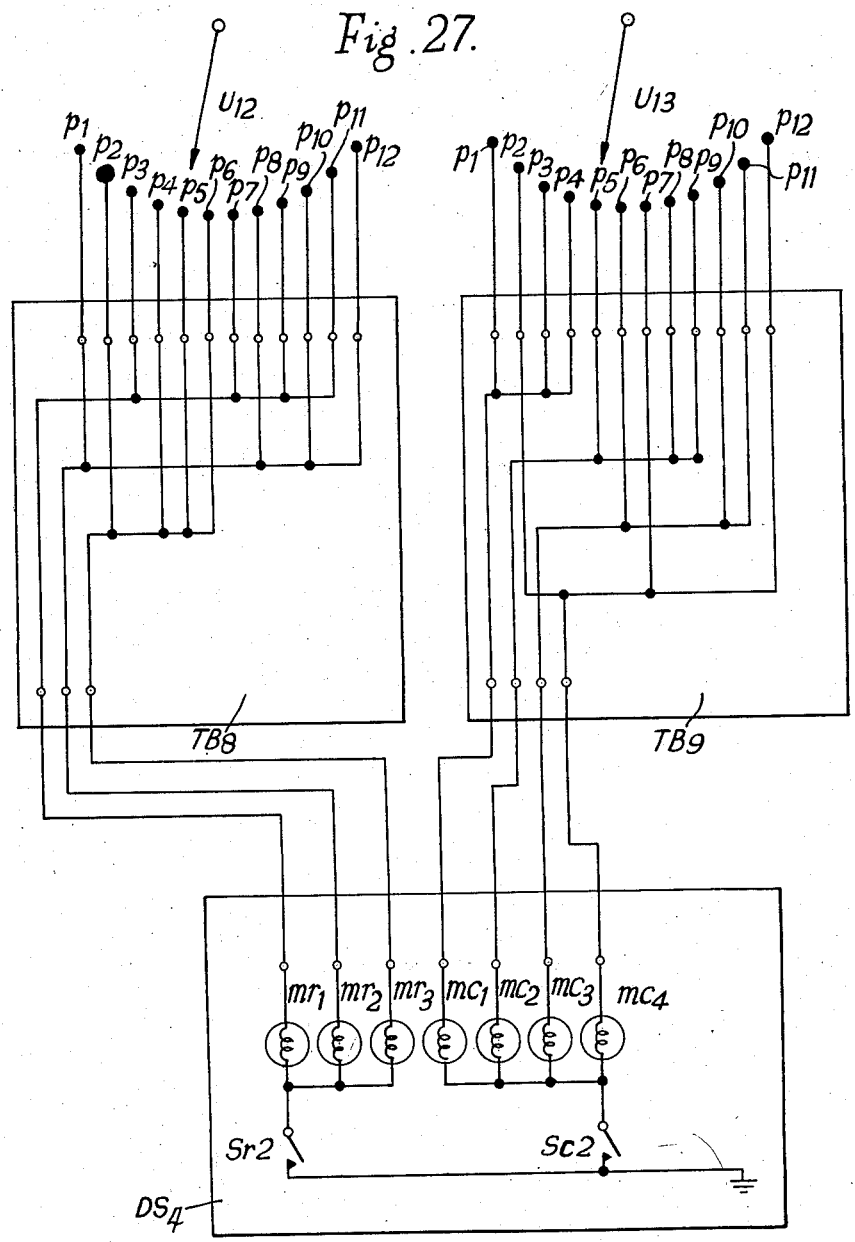
Figure 28:
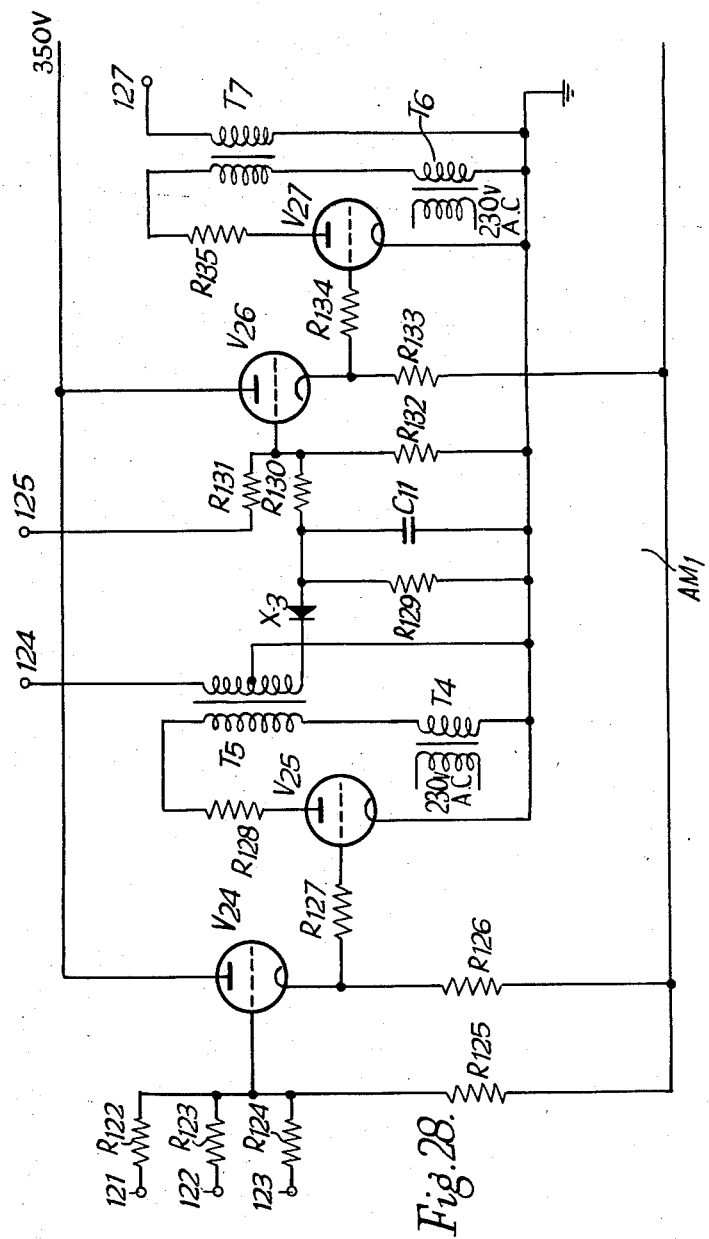
Figure 29:
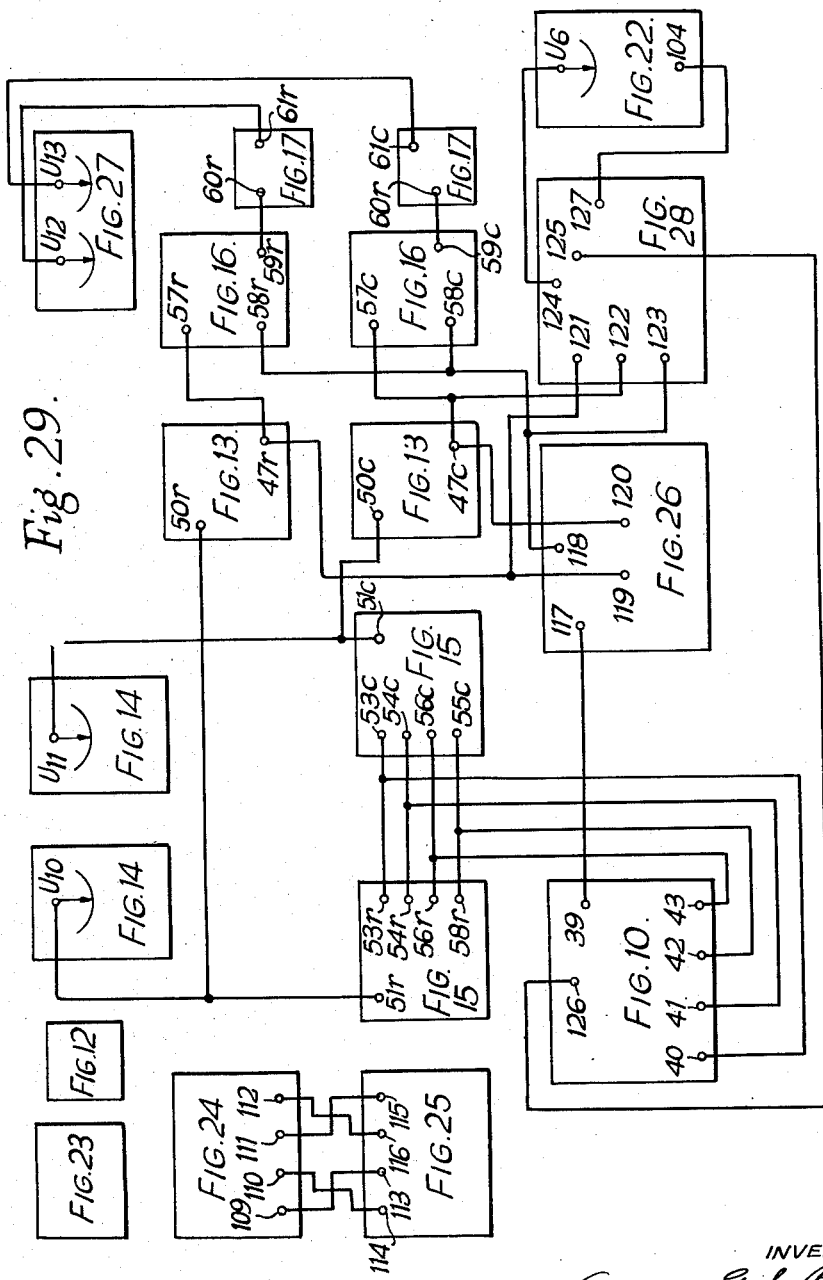
Figure 31:
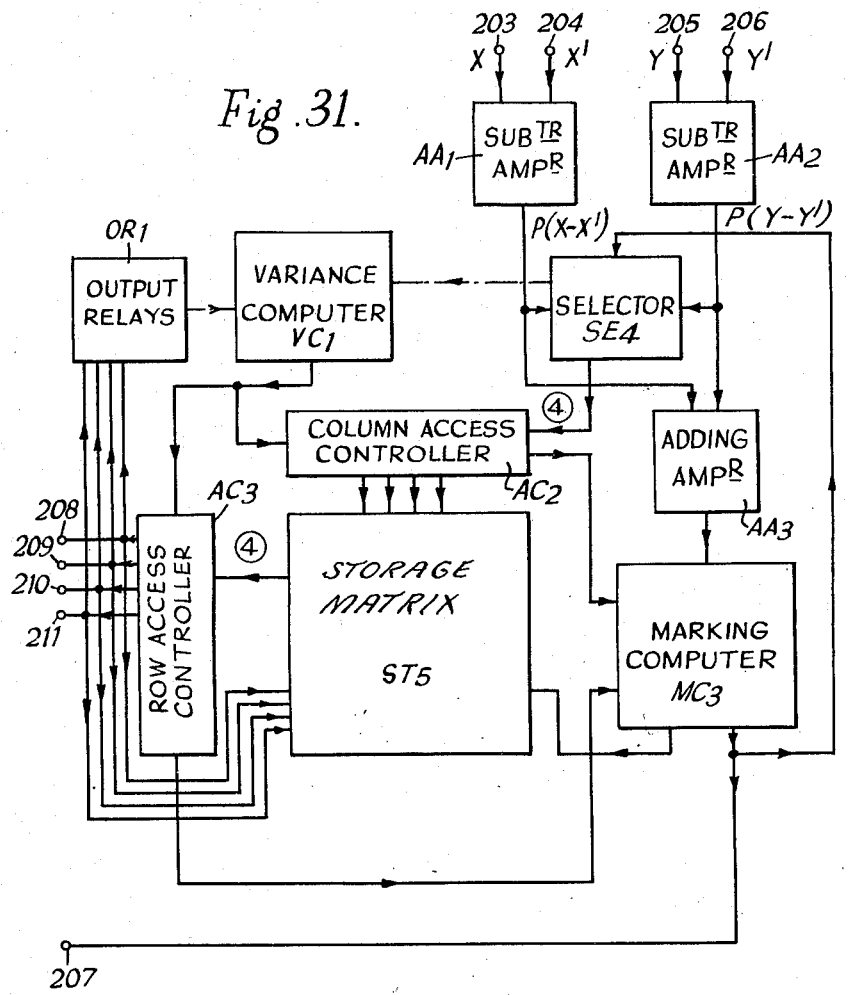
Figure 33:
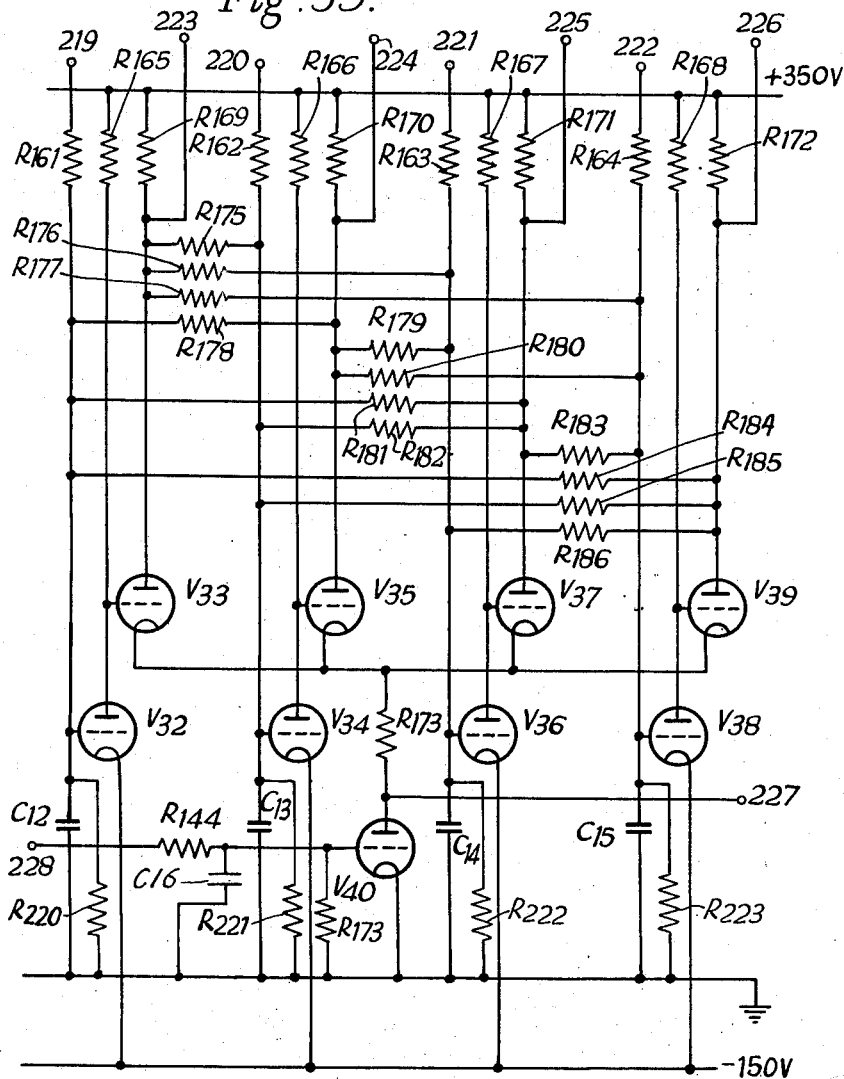
Figure 34:
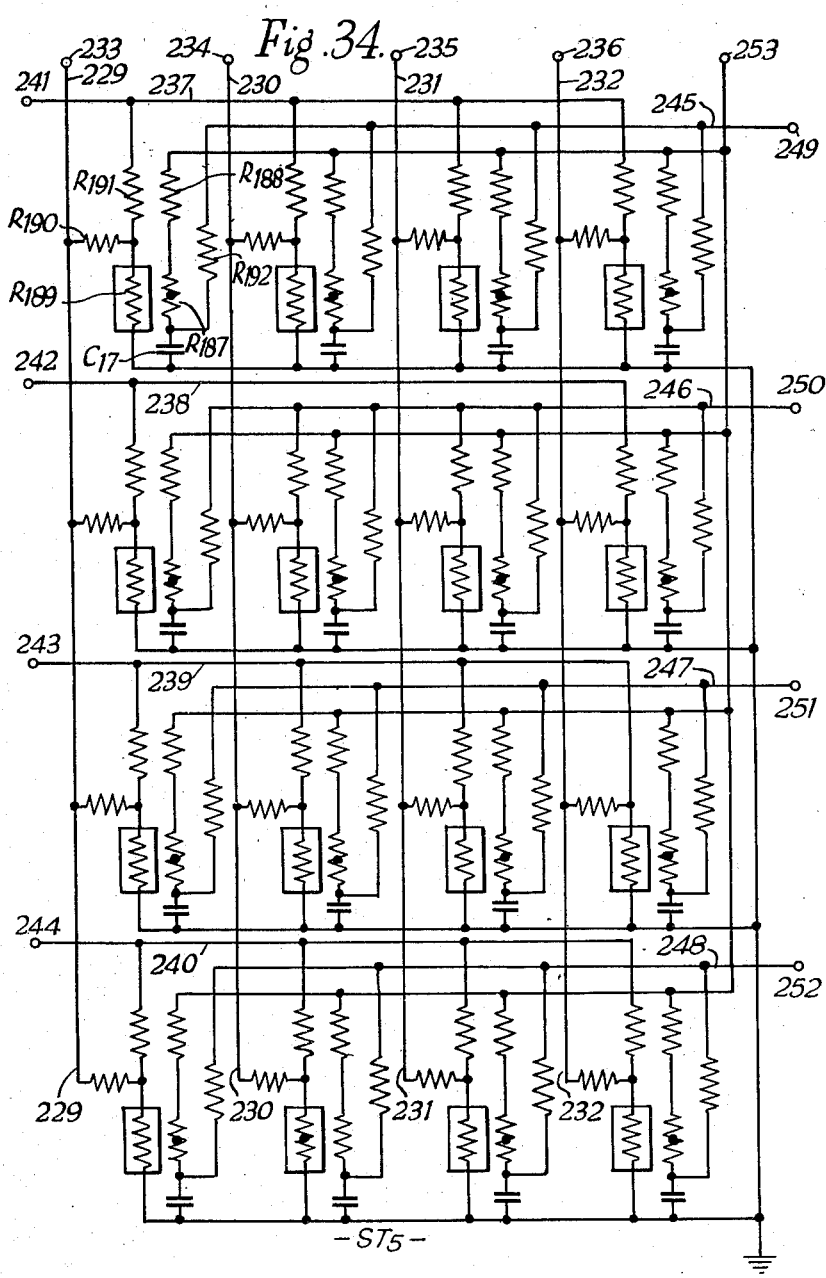
Figure 36:
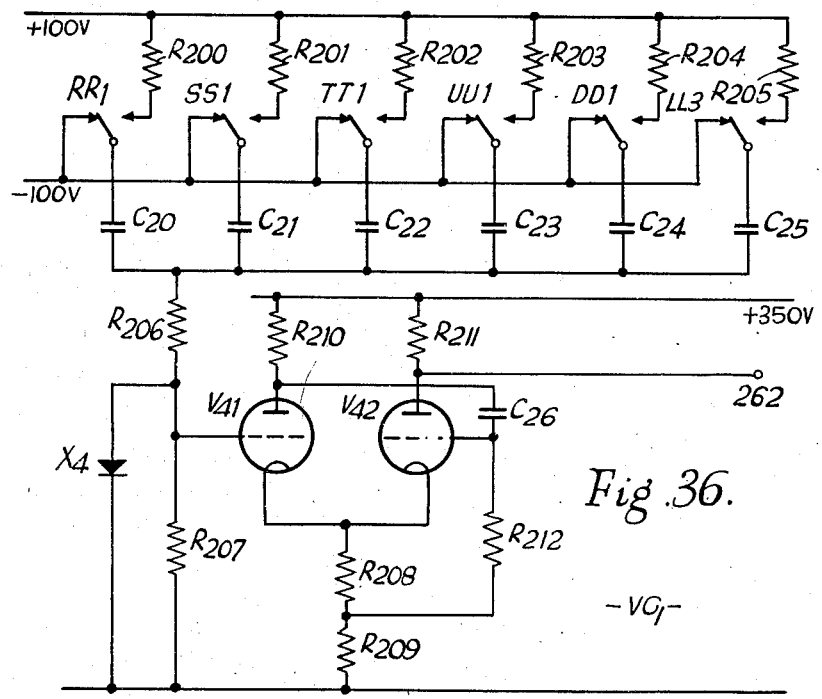
Figure 35:
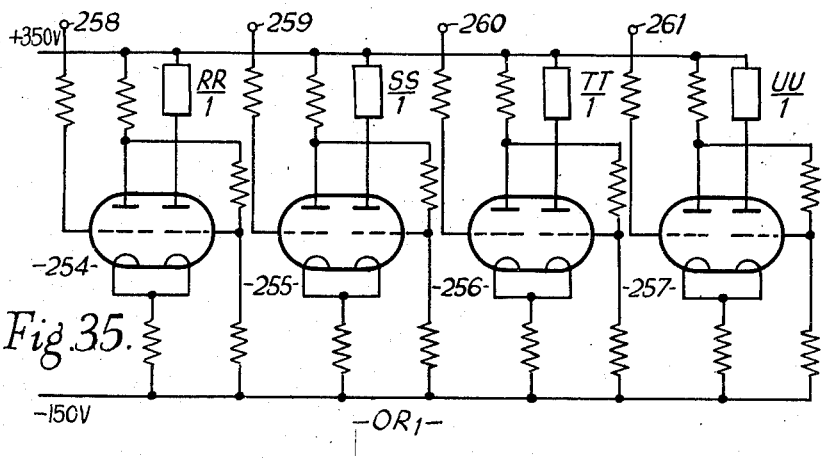
Figure 37:
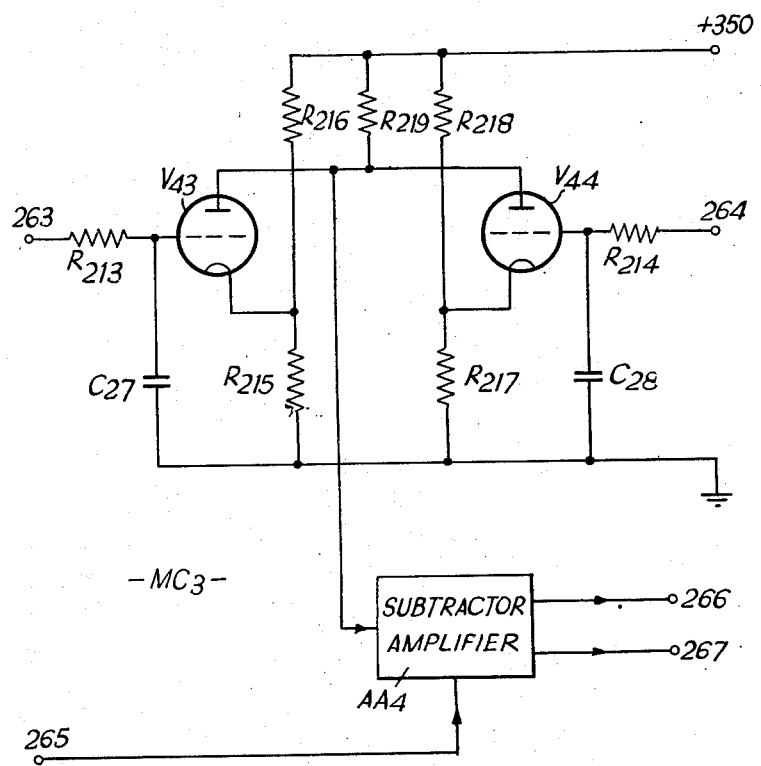

The invention will now be described by way of example with reference to the accompanying drawings, in which:

Fig. 1 is a diagrammatic representation of the exterior of the Type I coordinator, hereinbefore referred to, Fig. 2 is a block circuit diagram of the Type I coordinator, Fig. 3 is a diagram of two voltage waveforms illustrating the operation of the Type I coordinator, Fig. 4 is a circuit diagram of a uniselector bank $U_1$, a terminal block $TB_1$ and a display $DS_1$ shown in block form in Fig. 2, Fig. 5 is a circuit diagram of three uniselector banks $U_2$, $U_3$ and $U_4$, a permutator $PE_1$ and a set of control relays $CR_1$ shown in block form in Fig. 2, Fig. 6 is a circuit diagram of a selector $SE_3$ and a storage matrix $ST_1$ shown in block form in Fig. 2, Fig. 7 is a circuit diagram of a terminal block $TB_2$ and a response board $RB_1$ shown in block form in Fig. 2, Fig. 8 is a circuit diagram of a terminal block $TB_3$ and a display $DS_2$ shown in block form in Fig. 2, Fig. 9 is a circuit diagram of a set of marking relays $MR_1$ shown in block form in Fig. 2, Fig. 10 is a circuit diagram of a marking computer $MC_1$ shown in block form in Fig. 2, Fig. 11 is a circuit diagram of a waveform generator $WG_1$ shown in block form in Fig. 2, Fig. 12 is a circuit diagram of a uniselector control $UC_1$ shown in block form in Fig. 2, Fig. 13 is a circuit diagram of a voltage reader $VR_1$ shown in block form in Fig. 2, Fig. 14 is a circuit diagram of a uniselector bank $U_5$ and a storage matrix $ST_2$ shown in block form in Fig. 2, Fig. 15 is a circuit diagram of an access controller $AC_1$ shown in block form in Fig. 2, Fig. 16 is a circuit diagram of a corrective information computer $CI_1$ shown in block form in Fig. 2, Fig. 17 is a circuit diagram of a modulator $MD_1$ shown in block form in Fig. 2, Fig. 18 is a block circuit diagram of the Type I coordinator showing how the circuits shown in Figs. 4 to 17 are connected together, Fig. 19 is a diagrammatic representation of the exterior of the Type II coordinator, hereinbefore referred to, Fig. 20 is a diagram of two voltage waveforms illustrating the operation of the Type II coordinator, Fig. 21 is a block circuit diagram of the Type II coordinator, Fig. 22 is a circuit diagram of a uniselector bank $U_6$, a terminal block $TB_4$ and a display $DS_3$ shown in block form in Fig. 21, Fig. 23 is a circuit diagram of a uniselector bank $U_7$, a terminal block $TB_5$ and a display $DS_4$ shown in block form in Fig. 21, Fig. 24 is a circuit diagram of two uniselector banks $U_8$ and $U_9$, two terminal blocks $TB_6$ and $TB_7$ and a response board $RB_2$ shown in block form in Fig. 21, Fig. 25 is a circuit diagram of a set of marking relays $MR_2$ shown in block form in Fig. 21, Fig. 26 is a circuit diagram of a waveform generator $WG_2$ shown in block form in Fig. 21, Fig. 27 is a circuit diagram of two uniselector banks $U_{12}$ and $U_{13}$, two terminal blocks $TB_8$ and $TB_9$ and a display $DS_5$ shown in block form in Fig. 21, Fig. 28 is a circuit diagram of an ambiguity modulator $AM_1$ shown in block form in Fig. 21, Fig. 29 is a block circuit diagram of the Type II coordinator showing the interconnections of the circuits shown in Figs. 22 to 28, two further circuits, which are in essence the same as those shown in Figs. 10 and 12 respectively and five pairs of circuits, comprising two circuits in essence the same as those shown in each of Figs. 13 to 17 (the reference numerals designating terminals in Figs. 13 to 17 having been provided with either a subscript "r" or a subscript "c" as will hereinafter be explained), Fig. 30 is a block circuit diagram of a radar training apparatus including the Type III coordinator hereinbefore referred to, Fig. 31 is a more detailed block circuit diagram of the Type III coordinator, Fig. 32 is a circuit diagram of a selector $SE_4$ shown in block form in Fig. 31, Fig. 33 is a circuit diagram of an access controller $AC_2$ shown in block form in Fig. 31, Fig. 34 is a circuit diagram of a storage matrix $ST_5$ shown in block form in Fig. 31, Fig. 35 is a circuit diagram of a set of output relays $OR_1$ shown in block form in Fig. 31, Fig. 36 is a circuit diagram of a variance computer $VC_1$ shown in block form in Fig. 31, Fig. 37 is a circuit diagram of a marking computer $MC_3$ shown in block form in Fig. 31, and Fig. 38 is a block circuit diagram of the Type III coordinator showing the interconnections of the circuits shown in Figs. 32 to 37, a circuit constituting a row access controller $AC_3$ shown in block form in Fig. 31 and being in essence the same as that shown in Fig. 33, with, however, the reference numerals designating its terminals primed, and three amplifiers $AA_1$, $AA_2$ and $AA_3$ shown in block form in Fig. 33.

The embodiment of a Type I coordinator will now be described, firstly in broad outline, with reference to Fig. 1, as it appears to an operator whom it is training, then in more detailed functional form with reference to Figs. 2 and 3, and finally in still more detail with reference to Figs. 4 to 18.

The coordinator functions in a cyclic sequence of twelve "positions" in each of which an instruction is given to the operator and in which the operator is required to make a response to that instruction. Each position will be said to start at a certain time, to end at a later time and to be of a certain duration, which duration in general varies from position to position and varies for a given position for successive occurrences of that position. The twelve positions will be numbered consecutively $p_1$ to $p_{12}$ and a general position will be indicated by the symbol $p_i$. Each two consecutive positions are separated from each other by a short fixed "moving-on" interval of duration $u$.

Referring to Fig. 1, the instructions are given to the operator by a "display" $DS_1$ comprising eight lamps arranged in a horizontal row and numbered $k_1$ to $k_8$ from left to right, a general lamp being given the symbol $k_u$.

In each position $p_i$ one of the lamps $k_u$ lights up. In response to this the operator is required to press a switch of a "response board" $RB_1$ having eight press-button switches arranged in a horizontal row and numbered $s_1$ to $s_8$ from left to right, before the end of the position $p_i$.

A routine for the operator to learn is set up by making connections in certain terminal boards to be described hereinafter which determine which lamp lights up in each position $p_i$ and which switch is the correct switch to be pressed for each lamp $k_u$. In describing the coordination it will be assumed, merely by way of example, to be set up in the following manner:

Position in sequence:            Lamp lit up
- $p_1$ -------- $k_3$
- $p_2$ -------- $k_8$
- $p_3$ -------- $k_3$
- $p_4$ -------- $k_4$
- $p_5$ -------- $k_1$
- $p_6$ -------- $k_5$
- $p_7$ -------- $k_7$
- $p_8$ -------- $k_6$
- $p_9$ -------- $k_4$
- $p_{10}$ -------- $k_8$
- $p_{11}$ -------- $k_3$
- $p_{12}$ -------- $k_2$ Lamp lit up:            Switch to be pressed
- $k_1$ -------- $s_7$
- $k_2$ -------- $s_4$
- $k_3$ -------- $s_5$
- $k_4$ -------- $s_2$
- $k_5$ -------- $s_8$
- $k_6$ -------- $s_6$
- $k_7$ -------- $s_1$
- $k_8$ -------- $s_3$ It will thus be seen that, with the particular routine assumed, the following sequence of switches has to be pressed:

$$s_5 \ s_3 \ s_5 \ s_2 \ s_7 \ s_8 \ s_1 \ s_6 \ s_2 \ s_3 \ s_5 \ s_4$$

The function of the coordinator is to teach the operator to make the correct response for each position $p_i$ rapidly and thus the operator may be said to learn firstly which switch of the response board $RB_1$ corresponds to each lamp in the display $DS_1$ and secondly the sequence in which the lamps in the display $DS_1$ light up and accordingly the sequence in which the switches of the response board $RB_1$ have to be pressed.

A lamp 38 indicates to the operator that he has made a correct response and a lamp 37 indicates an incorrect response.

The teaching process is effected firstly by adapting the rate at which the operator is required to make responses to the operator's ability at each stage in the learning process, increasing the rate as he becomes more successful in making correct responses. This is done by decreasing the duration of the positions $p_i$. However it is not done merely by decreasing the average duration of the positions. Superimposed on such an increase in the rate of operation of the machine is a "patterned increase" which may be provided in one of two ways, selected by the setting of a switch.

In one of the two ways the coordinator remains in a position for a relatively short length of time when the operator has had a relatively high degree of success in responding in that position previously. In the other of the two ways the coordinator remains in a position for a relatively short length of time when the operator has had a relatively high degree of success in responding to the lamp which lights up in that position (and maybe in other positions, since some lamps light up in more than one position).

Thus the distinction between the two alternatives is that the coordinator takes account of the previous degree of success in responding, in the first case in a particular position and in the second case to a particular lamp. By "previous degree of success" is meant average success in a number of previous sequences and physically this averaging is effected by adding or taking away charge to or from a capacitor.

The distinction between the two alternatives is not fundamental. The two ways described are convenient ways of determining the categories hereinbefore referred to and hence of achieving the "patterned increase" and in the later stages of a learning process even the detailed operation of a coordinator will be little affected by which way is used.

The learning process is further assisted by a second "display" $DS_2$ having eight lamps in a horizontal row, numbered $m_1$ to $m_8$ from left to right and adjacent the switches $s_1$ to $s_8$ respectively. These light up to indicate to the operator directly which switch should be pressed, the lamp $m_4$ for example lighting up when the switch $s_4$ is to be pressed. The display $DS_2$ gives the operator corrective information.

However these lamps only light up slowly and not until their brilliance reaches a certain level do they assist the operator. In the initial stages of learning they are caused to reach this level fairly quickly and thus to give the operator considerable help. As progress is made they are caused to reach the level more and more slowly, corrective information thus being withdrawn until eventually the level is not reached at all before the end of each position and accordingly the operator is given no corrective information. Moreover this withdrawal of corrective information is "patterned" in the same way that the rate of increase in the rate of operation of the coordinator is "patterned."

Provision is also made whereby the lamps of the display $DS_1$ may be caused to light up in this manner, that is to say quickly during the initial stages of learning, and progressively less quickly as learning proceeds. Use may be made of this provision particularly in the later stages of the learning process when the operator is progressing towards the point where he knows the sequence in which the lamps light up.

Referring to Fig. 2 there is shown a functional block diagram of the Type I coordinator. Electrical connections between units of the coordinator are shown by full lines (some of which represent more than one wire) whereas control of a unit by a relay or relays in another unit is shown by a chain dotted line. A broken line is used in conventional manner to indicate that switches or uniselector arms are mechanically ganged together. A number in a circle against a full line represents the number of wires constituting that connection when the number is other than one.

The twelve positions in which the coordinator operates are controlled by a five-bank uniselector $U_1$, $U_2$, $U_3$, $U_4$, $U_5$ having twelve positions and being stepped on by a "uniselector control" $UC_1$.

The wiper of the first bank $U_1$ is connected through a switch $SW_1$ either to a transformer $T_1$ supplying to the wiper an unmodulated alternating voltage, or to the output of a modulator $MD_1$. The twelve output terminals from the bank $U_1$ are connected through a first terminal block $TB_1$ to the eight lamps of the display $DS_1$. Thus depending on the setting of the switch $SW_1$ the lamps can be caused to light up either steadily or a in a manner depending on the output of the modulator $MD_1$, which output is a fifty cycle alternating current amplitude modulated in a manner to be described later.

A 25 volt supply is connected to the wipers of the three banks $U_2$, $U_3$ and $U_4$ the output terminals of which are connected through a "permutator" $PE_1$, which is a terminal block with provision made for altering the connections within the block by means of switches, to a set of "control relays" $CR_1$. This set of relay controls three "selectors," $SE_1$, $SE_2$ and $SE_3$, each having an input terminal and eight output terminals. For each position of the sequence the input to each selector is connected through to one of the eight output terminals of each selector respectively, the routing through the selectors being controlled by the control relays.

The input to the selector $SE_1$ is a 25 volt supply. The output terminals of this selector are connected through a second terminal block $TB_2$ to the response board $RB_1$ which, as shown in Fig. 1, has eight press-button switches. In each position of the sequence the operator is required to press one of these switches, whereupon an output from the response board registers upon a set of "marking relays" $MR_1$ firstly the fact that a response has been made and secondly whether the response is correct or incorrect, and the marking relays $MR_1$ are set in appropriate states. The output from the response board $RB_1$ registering whether the response is correct or incorrect is dependent on the input to the response board $RB_1$ from the terminal block $TB_2$. The marking relays control the two lights 37 and 38 in Fig. 1 which indicate to the operator whether his response is correct or incorrect.

The state of the marking relays $MR_1$ determines the state of a "marking computer" $MC_1$ which computes a continuously varying marking variable $\theta$, represented by a potential, from its state at any instant. Normally $\theta$ decreases slowly, but when a correct response is made $\theta$ is increased by an amount depending on how long the response is made before the end of the position $p_i$ in which it is made.

Thus referring to the upper part of Fig. 3, $\theta$ is shown for two consecutive positions $p_i$ and $p_{i+1}$. The positions $p_i$ and $p_{i+1}$ begin at times $t_1$ and $t_4$ respectively and end at times $t_3$ and $t_6$ respectively. A correct response is assumed to be made in the position $p_i$ at time $t_2$ and an incorrect response is assumed to be made in the position $p_{i+1}$ at time $t_5$. The interval $t_3-t_2$ is of duration $\delta t_i$ and the interval $t_6-t_5$ is of duration $\delta t_{i+1}$. At times other than those in the last two said intervals, $\theta$ is decreasing at a slow steady rate. In the interval $t_3-t_2$ following the correct response at time $t_2$, $\theta$ is caused to increase at a relative rapid rate and in the interval $t_6-t_5$ following the incorrect response at time $t_5$, $\theta$ is caused to decrease at a relatively rapid rate.

One output from the marking computer $MC_1$ (Fig. 2) is fed to a "waveform generator" $WG_1$ which generates a waveform $V_{sm}$ shown in the lower part of Fig. 3. At the beginning of the position $p_i$ the potential $V_{sm}$ starts to rise from a constant level $V_a$ at a rate $dV_{sm}/dt=(a+b\theta)$ where $a$ and $b$ are constants. The position $p_i$ ends when the potential $V_{sm}$ reaches a variable trigger level $Vt_i$. The variations in the slope of the waveform $V_{sm}$ show the increase and decrease of the slope when $\theta$ increases and decreases by relatively large amounts respectively.

The trigger level $Vt_i$ is determined by a "voltage reader" $VR_1$ (Fig. 2) connected through a single-pole two-way switch $SW_2$ to a matrix of storing means or storage matrix $ST_1$ when the duration of the position $p_i$ is required to depend on the previous degree of success in responding to the lamp of the display $DS_1$ which lights up in that position and to a matrix of storing means or storage matrix $ST_2$ when the duration of the position $p_i$ is required to depend on the previous degree of success in responding in that position. The storage matrices $ST_1$ and $ST_2$ constitute alternative non-stationary trainable assemblages in which the storing means are capacitors. In the case of $ST_1$ there are eight capacitors corresponding to the eight different category channels from the selector $SE_3$. In the case of $ST_2$ there are twelve capacitors corresponding to the twelve different category channels from the uniselector bank $U_5$.

The waveform generator $WG_1$ also controls through the uniselector control $UC_1$ the moving-on interval $u$, at the end of which the uniselector control $UC_1$ moves the uniselector on to the next position. During the moving-on interval the marking relays $MR_1$ are prevented from functioning.

The input to the voltage reader $VR_1$ at each position of the sequence is determined by the charge on a capacitor of either the first storage matrix $ST_1$ or the second storage matrix $ST_2$. The storage matrix $ST_1$ has eight capacitors connected to the eight output terminals of the selector $SE_3$ respectively the input terminal of which is connected to one fixed contact of the switch $SW_2$. The storage matrix $ST_2$ has twelve capacitors connected to the twelve output terminals of the uniselector bank $U_5$ respectively. The wiper of the bank $U_5$ is connected to the other fixed contact of the switch $SW_2$. The movable contact of the switch $SW_2$ is connected to the input to the voltage reader $VR_1$ and through an "access controller" $AC_1$, the state of which is dependent on the state of the marking relays $MR_1$, to an output from the marking computer $MC_1$.

The eight capacitors or storing means of the storage matrix $ST_1$ are in one-to-one correspondence with the eight lamps in the display $DS_1$ and thus with the switches of the response board $RB_1$. For convenience the capacitors will be numbered $e_1$ to $e_8$ where the capacitor $e_1$ corresponds to the lamp $k_1$, the capacitor $e_2$ to the lamp $k_2$ and in general the capacitor $e_u$ corresponds to the lamp $k_u$. The charge held by each capacitor of the storage matrix $ST_1$ is, as will be hereinafter described, arranged to be representative of the degree of success achieved by the operator in responding to the associated lamp, averaged over a number of sequences.

Assuming that the coordinator is set up as previously described, in the position $p_1$ the input to the voltage reader $VR_1$ when the storage matrix $ST_1$ is in use, that is when the switch $SW_2$ is in the position shown in Fig. 2, is determined by the capacitor $e_3$; in the position $p_2$ the input is determined by the capacitor $e_8$ and so on.

When a capacitor $e_u$ holds a charge representing a high previous degree of success the trigger level $Vt_i$ for the corresponding position $p_i$ is low and when the capacitor $e_u$ holds a charge representing a low degree of success the trigger level $Vt_i$ is high.

The twelve capacitors of the storage matrix $ST_2$ are in one-to-one correspondence with the twelve positions $p_1$ to $p_{12}$ and will be numbered $f_1$ to $f_{12}$, where the capacitor $f_1$ corresponds to the position $p_1$, the capacitor $f_2$ to the position $p_2$ and so on. The charge held by each capacitor of the storage matrix $ST_2$ is, as will hereinafter be described, arranged to be representative of the degree of success achieved by the operator in the corresponding position in the sequence, averaged over a number of sequences.

When the storage matrix $ST_2$ is in use, that is when the switch $SW_2$ is in the other position from that shown in Fig. 2, and a capacitor $f_i$ holds a charge representing a high degree of success the trigger level $Vt_i$ for the position $p_i$ is low and when the capacitor $f_i$ holds a charge representing a low degree of success the trigger level $Vt_1$ is high.

Thus referring again to Fig. 3, the duration $\Delta t_1$ of the position $p_1$ depends both on the rate at which $V_{sm}$ is increasing, which in turn depends on $\theta$, and the height of the level $Vt_1$. If $\theta$ is large, and, if, for the position $p_1$, $Vt_1$ is low, then $\Delta t_1$ is short. When the storage matrix $ST_2$ is in use level $Vt_1$ is determined by the previous degree of success in the position $p_1$. When the storage matrix $ST_1$ is in use the level $Vt_1$ is determined by the previous degree of success in responding to the lamp corresponding to the position $p_1$. Thus when the coordinator is set up as described above, in the position $p_2$ the level $Vt_2$ is determined by the previous degree of success in responding to the lamp $k_8$, that is the previous degree of success in positions $p_2$ and $p_{10}$.

The output from the voltage reader $VR_1$ is also fed to an input terminal of a "corrective information computer" $CI_1$ which also receives an input from the waveform generator $WG_1$ and provides the input to the modulator $MD_1$. The output of the modulator $MD_1$ is fed through the selector $SE_2$ and through a terminal block $TB_3$ to the second display $DS_2$.

The corrective information computer $CI_1$ adds a voltage proportional to the output from the voltage reader $VR_1$ to the rising waveform $V_{sm}$ and in the modulator $MD_1$ the fifty-cycle output is amplitude modulated in response to these added voltages. The connections of the terminal block $TB_3$ are so made that in any position $p_1$ the modulator $MD_1$ is connected to the lamp of the display $DS_2$ corresponding spatially with the switch on the response board $RB_1$ which has to be pressed to provide a correct response in that position.

The output from the corrective information computer $CI_1$ is a potential proportional to $V_{sm}$ (Fig. 3) superimposed on a step of height determined by the output of the voltage reader $VR_1$, and proportional to the level $Vt_1$ (Fig. 3). The output of the modulator $MD_1$ is an alternating current amplitude modulated in the same way and thus the lamp in the display $DS_2$ to which the modulator $MD_1$ is connected will increase in brightness during the period $\Delta t_1$. The minimum level of brightness at which the lamp actually supplies the operator with corrective information is determined by physiological and psychological factors and the corresponding level of output from the modulator will be called the level $B_c$.

Thus when the operator has achieved a very low previous degree of success in a position $p_1$ (and $Vt_1$ is thus very high) the amplitude of the output from the modulator $MD_1$ starts at a relatively high value, namely the height of the step derived from the voltage reader $VR_1$, which step is proportional to $Vt_1$ and increases therefrom. Thus the level $B_c$ is reached as soon as the period $\Delta t_1$ starts, or very soon afterwards, and the operator rapidly receives some corrective information. If he delays his response the lamp increases in brightness until he receives a large amount of corrective information.

Conversely when the operator has achieved a high previous degree of success in a position $p_1$ (and $Vt_1$ is thus low) the output from the modulator $MD_1$ starts at a relatively low value and increases therefrom. The level $B_c$ is only reached late in the period $\Delta t_1$ and in the ultimate is not reached at all, the operator then receiving no corrective information.

The output from the modulator in the position $p_1$ of course depends on the previous degree of success in responding to the lamp of the display $DS_1$ corresponding to the position $p_1$ when the store $ST_1$ is connected to the voltage reader $VR_1$ and on the previous degree of success in the position $p_1$ when the store $ST_2$ is connected to the voltage reader $VR_1$.

Thus at the beginning of the process of learning a skill, the value of $\theta$ is low, the trigger levels $Vt_1$ are in general high and the output from the modulator $MD_1$ in general reaches the level $B_c$ quickly in each position $p_1$ of the sequence.

As progress is made in learning the skill, $\theta$ increases and thus the average rate at which responses are required to be made increases. Furthermore the trigger levels $Vt_1$ decrease and the amplitude of the output from the modulator $MD_1$ decreases but these decreases are different for the different positions $p_1$. Thus the coordinator adapts itself to the "pattern of learning" of the operator and in positions $p_1$ where he achieves a high relative degree of success gives him a relatively short period of time in which to make a response and a relatively small amount of corrective information.

The coordinator will continue to vary the variable $\theta$, the trigger levels $Vt_1$ and the amount of corrective information supplied to the operator until a stable state is reached where $\theta$ is high and constant (that is the slow coninuous decrease of $\theta$ is just offset by the increase afforded by his correct responses), all the trigger levels are low and of the same height, and no corrective information is supplied to the operator.

Furthermore when the switch $SW_1$ is so set that the input to the lamps of the display $DS_1$ is from the modulator $MD_1$ the information given by the display $DS_1$, which information, once the correspondence between lamps of the display $DS_1$ to switches on the response board $RB_1$ has been learned, may be regarded merely as telling the operator whereabouts he is in the sequence, decreases as the skill is learned. That is the lamps of the display $DS_1$ only light up slowly to reach a level of brightness which gives information to the operator after the beginning of a position $p_1$. If this information is decreased to zero a further lamp (not shown) is provided which lights up when the coordinator is in the position $p_1$ and indicates the start of the sequence.

The units of the coordinator will now be described in more detail, and in this detailed description the connections of the terminal blocks $TB_1$, $TB_2$, $TB_3$ and of the permutator $PE_1$ will be shown arranged to set up the coordinator as in the example described above.

In Fig. 4 the twelve output terminals 10 of the uniselector bank $U_1$ are numbered $p_1$ to $p_{12}$ in correspondence with the positions of the sequence. The output terminals 10 are connected to twelve input terminals 11, respectively, of the terminal block $TB_1$ which input terminals are connected to eight output terminals 12 of the block $TB_1$. The terminals 12 are connected to one terminal of the eight lamps $k_1$ to $k_8$, respectively, of the display $DS_1$, the other terminal of each lamp being connected to earth.

In Fig. 5 is twelve output terminals 13, 14, 15 of the uniselector banks $U_2$, $U_3$, $U_4$ respectively are in each case numbered $p_1$ to $p_{12}$. The output terminals 13, 14, 15 are connected in one-to-one correspondence with three sets each of twelve terminals 16, 17, 18 in the permutator $PE_1$ respectively. The terminals 16 are connected to two terminals 19, 20, the terminals 17 to two terminals 21, 22 and the terminals 18 to two terminals 23, 24, the connections shown being such that the capacitors of the storage matrix $ST_1$ number $e_1$ to $e_8$ from left to right in Fig. 6. The terminals 19, 21 and 23 are connected through three ganged switches $SW_3$, $SW_4$ and $SW_5$ respectively to the windings of three relays A, B and C respectively (forming the control relays $CR_1$ of Fig. 2), the other ends of which windings are connected to a $-25$ volt line.

The switches $SW_3$, $SW_4$ and $SW_5$ can be changed over to connect the terminals 20, 22 and 24 to the relays A, B and C respectively. This enables a ready alteration to be made in the sequence in which the selectors $SE_1$, $SE_2$ and $SE_3$ are set and thus to alter the sequence of switches on the response board $RB_1$ corresponding to the sequence of lamps lit up through the uniselector bank $U_1$. When the switches $SW_3$, $SW_4$ and $SW_5$ are in the other position from that shown, the coordinator is of course no longer set up as in the example described above.

The three selectors $SE_1$ are themselves identical and in Fig. 6 the selector $SE_3$ is shown connected to the storage matrix $ST_1$. The selector $SE_3$ has an input terminal 27 connected to the switch $SW_2$ and eight output terminals 30 connected to one terminal of the eight capacitors $e_1$ to $e_8$ respectively, the other terminals of the capacitors being connected to earth. In dependence on the setting of the relays A, B and C the input terminal 27 is connected to one only of the capacitors $e_1$ to $e_8$ through sets of relay contacts A3, B5, B6, C9, C10, C11 and C12 arranged as shown. Thus when the uniselector arms are in the position shown in Fig. 5, that is the position $p_5$, and the switches $SW_3$, $SW_4$ and $SW_5$ are in the setting shown in Fig. 5, the relays A, B and C are all de-energised. The terminal 27 is then connected to capacitor $e_1$ corresponding to the lamp $k_1$ which is on in position $p_5$ (Fig. 4).

When the uniselector arms are in the next poistion $p_6$ the lamp $k_5$ is on as will be seen from Fig. 4 and the relay A is energized and the relays B and C are de-energized (Fig. 5). Thus, as will be seen from Fig. 6, the capacitor $e_5$ is connected to the terminal 27.

The selector $SE_1$ has an input terminal 25 (Fig. 2) connected to a +25 volt line, eight output terminals 28 connected to eight input terminals 31 of the terminal block $TB_2$ (Fig. 7) and sets of relay contacts A1, B1, B2, C1, C2, C3, C4 (not shown, as the selector $SE_1$ is constructionally the same as the selector $SE_3$) corresponding to the sets of relay contacts A3, B5, B6, C9, C10, C11 and C12 (Fig. 6).

Referring to Fig. 8, the selector $SE_2$ has an input terminal 26 connected to the output of the modulator $MD_1$ (Fig. 16), eight output terminals 29 connected to eight input terminals 35 of the terminal block $TB_3$ and sets of relay contacts A2, B3, B4, C5, C6, C7 and C8 (not shown, as the selector $SE_2$ is constructionally the same as the selector $SE_3$) corresponding to the sets of relay contacts A3, B5, B6, C9, C10, C11 and C12 (Fig. 6).

Thus referring to Fig. 7 the output terminals 28 of the selector $SE_1$ are shown connected to the input terminals 31 of the terminal block $TB_2$ which has eight output terminals 32 connected respectively to one set of fixed contacts of eight two-pole, one-way press-button switches, namely the switches $s_1$ to $s_8$. The connections in the permutator $PE_1$ and the terminal board $TB_2$ are such that when the lamp $k_1$ is lit up the 25-volt line is connected through the input terminal 25 (Fig. 2) of the selector $SE_1$ to the fixed contact of the switch $s_7$, when the lamp $k_2$ is lit up the connection is to the fixed contact of the switch $s_4$ and so on.

The set of movable contacts associated with the said one set of fixed contacts of the switches $s_1$ to $s_8$ are connected together to an output terminal 33. The other set of movable contacts of the switches $s_1$ to $s_8$ is connected to a +25 volt line and the other set of fixed contacts of the switches is connected to an output terminal 34. Thus the terminals 33 and 34 are dead when no switch is pressed. When any switch is pressed the terminal 34 is at a potential of +25 volts and when a correct switch only is pressed the terminal 33 is at a potential of +25 volts.

In Fig. 8 the output terminals 29 of the selector $SE_2$ are shown connected to the input terminals 35 of the terminal block $TB_3$, which has eight output terminals 36 connected to one terminal each of the eight lamps $m_1$ to $m_8$ constituting the display $DS_2$. The other terminal of each of the lamps is connected to earth. The connections in the block $TB_3$ are the same as those in the block $TB_2$. Thus when the switch $s_1$ is the correct switch to be pressed the output of the modulator $MD_1$ is connected to the lamp $m_1$, when the switch $s_2$ is the correct switch to be pressed the output of the modulator $MD_1$ is connected to the lamp $m_2$, and so on.

The terminals 33 and 34 (Fig. 7) are connected to two input terminals 63 and 64 respectively of the marking relays shown in Fig. 9, these terminals being connected to one end of the windings of two relays E and F respectively. The other ends of the windings of the relays E and F are connected together to a −25 volt line, through a set of relay contacts L1 of a relay L.

A set of relay contacts N4 of a relay N (Fig. 11) is connected in series with a set of relay contacts F1 and a set of changeover relay contacts E1, between the +25 volt line and one end of the winding of each of two relays G and H, the other ends of the windings of which are connected to a −25 volt line. The said one end of the winding of the relay G is also connected through a set of relay contacts G1 and a set of relay contacts $N_3$ (of the relay N (Fig. 11)) to the +25 volt line and the one end of the winding of the relay H is also connected through a set of relay contacts H1 and the set of relay contacts N3 to the +25 volt line.

For the duration of each interval $\Delta t_1$ (Fig. 3) the relay N (Fig. 11) is energized, as will hereinafter be described, and the sets of relay contacts N3 and N4 are closed. If a switch on the board $RB_1$ is pressed the relay F is energized since the terminal 64 is then at a potential of +25 volts. The set of contacts F1 is closed in consequence and either the relay G or the relay H is energized, depending on whether the switch pressed is correct or not. If the switch pressed is incorrect the set of contacts E1 remains as shown and the relay G is energized and if correct the relay E is energized since the terminal 63 is then at a potential of +25 volts, and the set of contacts E1 changes over so that the relay H is energized. The relay F is a slow-to-make relay in order that the set of relay contacts E1 shall have time to change over before the contact F1 closes if a correct response is made.

The relays G and H are self-holding by the sets of contacts G1 and H1. Thus assuming, as before, that in the position $p_i$ (Fig. 3) a correct response is made at time $t_2$, the relay H is energized and remains energized until the time $t_3$ when the relay N is de-energized and the sets of contacts N3 and N4 are opened. The relay H will thus remain energized during the interval $\delta t_i$.

If (as already assumed) an incorrect response is made in the position $p_{i+1}$ at time $t_5$ the relay G is energized and remains energized until the time $t_6$, that is during the interval $\delta t_{i+1}$.

In order that only one response may be effectively made in any position of the coordinator, the relay L has its winding connected in series with sets of relay contacts G2 and H2 in parallel between the +25 and −25 volt lines. Whilst either of the relays G or H is energized the relay L is energized and the set of contacts L1 is open. No further inputs can then be provided to the relays E and F by pressing any of the switches of the response board $RB_1$.

The lamp 37 and the lamp 38 are connected in series with a set of relay contacts G3 and a set of relay contacts H3, respectively, between the +25 volt line and the −25 volt line. Thus when a correct response is made the lamp 38 lights up and when an incorrect response is made the lamp 37 lights up, indicating to the operator whether his response is correct or incorrect.

Referring now to Fig. 10, the marking computer $MC_1$ comprises a twin triode $V_1$, $V_2$. The triode $V_1$ has its anode connected to a +350 volt line through a load resistor $R_1$ and its cathode connected to earth. The control grid of the triode $V_1$ is connected to earth through a resistor $R_2$ and a capacitor $C_1$ in series and directly to earth through a set of changeover relay contacts G4 when the relay G (Fig. 9) is de-energized. When the relay G is energized the grid is connected to the cathode of a triode $V_3$. The triode $V_2$ acts as a cathode follower, having its anode connected direct to the +350 line, its grid connected through a resistor $R_3$ to the anode of the triode $V_1$ and its cathode connected through two resistors $R_4$ and $R_5$ in series to a −150 volt line.

The grid of the triode $V_3$ is connected through a resistor $R_6$ and a set of changeover relay contacts H4 of the relay H to the junction of the resistors $R_4$ and $R_5$ when the relay H is de-energized and to the junction of two resistors $R_7$ and $R_8$ connected in series between earth and the —150 volt line when the relay H is energized. The grid of the triode $V_3$ is also connected to earth through a capacitor $C_2$. The triode $V_3$ acts as a cathode follower, its anode being connected direct to the +350 volt line and its cathode being connected to earth through a resistor $R_9$ and to the —150 volt line through a resistor $R_{10}$ in parallel with two resistors $R_{11}$ and $R_{12}$ in series.

The variable $\theta$ is represented by the potential on the cathode of the triode $V_3$. With the sets of contacts G4 and H4 in the position shown, that is when no response has been made, the input to the triode $V_1$ is held at earth potential and the junction of the resistors $R_4$ and $R_5$ is at a steady negative potential, say $E_1$. The capacitor $C_2$, assumed to be initially charged as will appear hereinafter, discharges through the resistors $R_6$ and $R_5$ and thus the value of $\theta$ decreases. When a correct response is made the relay H is operated and the capacitor $C_2$ is connected through the resistor $R_6$ to the junction of the resistors $R_7$ and $R_8$, which junction is at a higher steady potential, say $E_2$, than the steady potential $E_1$. Thus the capacitor $C_2$ charges up and $\theta$ increases, relatively quickly when $\theta$ is low and relatively slowly when $\theta$ is high. This increase in $\theta$ occurs for the duration of the interval $\delta t_1$, at the end of which the relay N is energized and the relay H is de-energized.

When an incorrect response is made the relay H remains de-energized and the capacitor $C_2$ is connected through the resistor $R_6$ to the junction of the resistors $R_4$ and $R_5$, but the potential of this point is made lower than $E_1$ by feeding back $\theta$ through the operated contacts G4 to the grid of the triode $V_1$. $\theta$ is represented by a positive potential and thus the triode $V_1$ is caused to conduct more and the triode $V_2$ to conduct less. The extent to which this occurs depends on the value of $\theta$ and an error has a greater effect when $\theta$ is high, that is when the operator has been doing well, than when $\theta$ is low, that is when the operator has been doing badly.

The cathode of the triode $V_3$ is also connected through a resistor $R_{13}$ to the grid of a triode $V_4$. This grid is also connected through a resistor $R_{14}$ to the junction of two resistors $R_{16}$ and $R_{17}$. A variable resistor $R_{15}$ and the resistors $R_{16}$ and $R_{17}$ are connected in series between earth and the —150 volt line. The cathode of the triode $V_4$ is connected to a variable tap on the resistor $R_{16}$ and the anode of the triode $V_4$ is connected to a terminal 39. The triode $V_4$ acts as a variable resistance passing a relatively large current when $\theta$ is high and a relatively low current when $\theta$ is low.

Four terminals 40, 41, 42 and 43 for connection through the access controller $AC_1$ (shown in Fig. 15) to the storage matrix $ST_1$ or the storage matrix $ST_2$ (as indicated in the block diagram in Fig. 2) are connected respectively to a variable tap on the resistor $R_4$, the junction between two resistors $R_{18}$ and $R_{19}$ connected in series between earth and the —150 volt line, a variable tap on the resistor $R_{10}$ and the junction of the resistors $R_{11}$ and $R_{12}$. The terminal 40 is connected to the terminal 43 through a resistor $R_{57}$. A terminal 126 connected to the cathode of the triode $V_3$ is not used in this embodiment, but is used in the Type II coordinator to be described later.

The terminal 39 is connected to an input terminal 44 of the waveform generator $WG_1$ shown in Fig. 11, the terminal 44 being connected to the grid of a triode $V_5$ and through a capacitor $C_3$ to the cathode of the triode $V_5$. The triode $V_5$ also has its grid connected to its cathode through a resistor $R_{20}$ in series with a set of relay contacts N1 which is open when the relay N is energized. The cathode of the triode $V_5$ is connected to the junction of two resistors $R_{21}$ and $R_{22}$ connected in series between the +350 volt line and earth. The anode of the triode $V_5$ is connected to the +350 volt line through a resistor $R_{23}$ and to the grid of a triode $V_6$ through a resistor $R_{24}$. The triode $V_6$ functions as a cathode follower and has its anode connected direct to the +350 volt line and its cathode connected to earth through a resistor $R_{25}$.

The cathode of the triode $V_6$ is connected to an output terminal 46 for connection to the corrective information computer $CI_1$, and through a resistor $R_{26}$ to the grid of a triode $V_8$, which together with a triode $V_7$, resistors $R_{27}$, $R_{29}$ and $R_{30}$ and a relay M connected together as shown constitutes a Schmitt trigger circuit of conventional type. The winding of the relay M constitutes the anode load of the triode $V_8$ and the resistor $R_{29}$ is variable for controlling the backlash of the circuit. The relay M is energized when the waveform $V_{sm}$ (Fig. 3) reaches the trigger level $Vt_1$.

The grid of the triode $V_7$ is connected to the —150 volt line through a resistor $R_{31}$ and to a terminal 45 through a resistor $R_{32}$. The grid of the triode $V_8$ is connected to the junction of two resistors $R_{33}$ and $R_{34}$, connected in series between earth and the —150 volt line, through the resistor $R_{26}$ and a resistor $R_{36}$ in series.

The terminal 45 is connected to a terminal 47 of the voltage reader $VR_1$ (Fig. 13). Thus the instants at which the Schmitt trigger circuit changes over depend upon the potential on the terminal 47 of the voltage reader $VR_1$, and hence on the terminal 45, and upon the potential on the cathode of the triode $V_6$ which latter potential in turn depends on the charge on the capacitor $C_3$. Thus when $\theta$ is high and the triode $V_4$ (Fig. 10) passes a relatively large current the capacitor $C_3$ charges relatively rapidly, driving the grid of the triode $V_5$ in a negative direction and thus causing the potential on the cathode of the triode $V_6$ to rise relatively rapidly.

When the potential on the grid of the triode $V_7$ is above the potential on the grid of the triode $V_8$ the triode $V_7$ is conducting and the triode $V_8$ is non-conducting and conversely. When the triode $V_8$ is conducting the relay M is energized. Thus during each interval $\Delta t_i$ the relay M is de-energized. Each interval $\Delta t_i$ is terminated when the potential on the grid of the triode $V_8$ rises to the potential of the grid of the triode $V_7$ and the relay M is energized.

The relay M operates a set of changeover contacts M1 (Fig. 11) which connects one terminal of a capacitor $C_4$ to the +350 volt line through a resistor $R_{37}$ when the relay M is energized and to earth through a resistor $R_{38}$ when the relay M is de-energized. The other terminal of the capacitor $C_4$ is connected to earth through a resistor $R_{39}$ and to the grid of a triode $V_9$ through a capacitor $C_5$ and a rectifier $X_1$ in series. The grid of the triode $V_9$ is connected to earth through a resistor $R_{40}$. The triode $V_9$ together with a triode $V_{10}$, resistors $R_{41}$, $R_{42}$ and $R_{43}$, a capacitor $C_6$ and the relay N connected together as shown constitute a Kipp relay of conventional type. The winding of the relay N constitutes the anode load of the triode $V_{10}$.

The relay M is de-energized in each interval $\Delta t_i$ and accordingly the capacitor $C_4$ is discharged through the resistors $R_{38}$ and $R_{39}$. When the relay M is energized the capacitor $C_4$ is charged through the resistor $R_{37}$ and a positive pulse is applied to the grid of the triode $V_9$. The triode $V_9$ then conducts and the triode $V_{10}$ is rendered non-conducting for a short interval, which is the interval $u$ in Fig. 3, and is of a duration determined by the constants of the Kipp relay. The relay N is de-energized in this interval.

The waveform $V_{sm}$ of Fig. 3 may now be discussed in more detail. It is the potential on the grid of the triode $V_8$ and the trigger levels $Vt_i$ and $Vt_{i+1}$ are potentials on the grid of the triode $V_7$.

When the potential $V_{sm}$ has risen to the level $Vt_i$ at time $t_3$, the Schmitt trigger circuit changes state and the relay M is energized. The length of time $\Delta t_i$ taken for this to occur (measured from the instant when the relay N is energized and the set of relay N is energized and the set of relay contacts N1 closed, at which instant the waveform $V_{sm}$ begins to rise from the level $V_a$) depends both on $Vt_1$ and the rate of increase of $V_{sm}$ which depends on $\theta$.

When the relay M is energized, an input pulse is applied to the Kipp relay and the relay N is de-energized for a fixed interval $u$ beginning at time $t_3$ and ending at time $t_4$. The set of relay contacts $N_1$ is closed during this interval and the capacitor $C_3$ is discharged causing the potential on the cathode of the triode $V_6$ to fall. The relay M is thus rapidly de-energized again.

Referring to Fig. 12 the uniselector control $UC_1$ is shown, comprising a uniselector coil 49 connected in series with a set of relay contacts N2 between the +25 volt line and the −25 volt line. When the relay N is de-energized, that is during the interval $u$ the contract N2 is closed and the coil 49 is energized drawing back the ratchet (not shown) of the uniselector. When the relay N is again energized the coil 49 is de-energized and the ratchet released to step the uniselector on to the next position.

Referring to Fig. 13 which shows the voltage reader $VR_1$ an input terminal 50 is connected to the movable contact of the switch $SW_2$ (Fig. 2) and this either, through the uniselector bank $U_5$, to the storage matrix $ST_1$ or, through the selector $SE_3$, to the storage matrix $ST_2$, and to an output terminal 51 of the access controller $AC_1$ (Fig. 15).

The voltage reader $VR_1$ comprises a triode $V_{11}$ acting as a cathode follower, its grid being connected through a resistor $R_{44}$ to the terminal 50, its anode direct to the +350 volt line and its cathode to earth through a resistor $R_{45}$ and to the −150 volt line through a resistor $R_{46}$. The cathode of the triode $V_{11}$ is connected to the terminal 47 already referred to through a resistor $R_{47}$. The capacitors of the storage matrix $ST_1$ or $ST_2$ are negatively charged, holding a relatively large negative charge when they are associated with a lamp or position in response to which there has been a high previous degree of success. The larger the negative charge, the lower the potential of the terminal 47, and hence of the terminal 45 of the waveform generator (Fig. 11), the potential on which terminal is the trigger level of the Schmitt trigger circuit.

The storage matrix $ST_1$ has already been described in detail. The storage matrix $ST_2$ is shown in Fig. 14. The wiper of the uniselector bank $U_5$ is connected to one terminal of the switch $SW_2$ as previously described. The twelve output terminals 48 of the uniselector are numbered $p_1$ to $p_{12}$ corresponding to the twelve positions of the sequence and are connected to one terminal of the twelve capacitors $f_1$ to $f_{12}$ respectively, the other terminals of which are connected to earth.

The charges on the capacitors of whichever storage matrix is in use are determined by the potentials on the terminals 40, 41, 42 and 43 of the marking computer (Fig. 10) and a set of resistors $R_{53}$, $R_{54}$, $R_{55}$ and $R_{56}$ and sets of relay contacts G5 and H5 of the access controller $AC_1$ (Fig. 15). The resistors $R_{53}$ to $R_{56}$ are connected between four terminals 53 to 56 and the sets of relay contacts as shown and the terminal 51 is connected to the resistor $R_{56}$. The terminals 53 to 56 are connected to the terminals 40 to 43 respectively. Thus the terminal 51 is permanently connected through the resistor $R_{56}$ to the junction of the resistors $R_{11}$ and $R_{12}$ of Fig. 10. In intervals when no response has been made and in intervals $\delta t_1$ following an incorrect response the terminal 51 is also connected through the sets of contacts H5 and the resistor $R_{54}$ to the junction of the resistors $R_{18}$ and $R_{19}$, and in intervals $\delta t_1$ following an incorrect response also through the set of contacts G5 and the resistor $R_{53}$ to the movable contact on the resistor $R_4$. In periods $\delta t_1$ following a correct response in addition to the aforesaid permanent connection the terminal 51 is connected through the set of contacts H5 and the resistor $R_{55}$ to the movable contact on the resistor $R_{10}$. The values of the resistors $R_{53}$ to $R_{56}$ and the potentials of the points to which the terminals 40 to 43 are connected are so chosen that the capacitor connected to the terminal 51 normally loses negative charge at a relatively slow rate (through the resistors $R_{54}$ and $R_{56}$), loses negative charge at a relatively fast rate in intervals $\delta t_1$ following an incorrect response and gains negative charge at a relatively fast rate in intervals $\delta t_1$ following a correct response. The movable contacts on the resistors $R_4$ and $R_{10}$ enable the effects which an incorrect and a correct response respectively have on the charge on a capacitor of the storage matrix $ST_1$ or $ST_2$ to be varied.

In Fig. 16 there is shown the corrective information computer $CI_1$ which has an input terminal 57 connected to the output terminal 47 of the voltage reader $VR_1$ (Fig. 13) and an input terminal 58 connected to the terminal 46 of the waveform generator $WG_1$ (Fig. 11). The potentials on these two input terminals 57 and 58 are combined in an adding network of resistors $R_{57}$, $R_{58}$ and $R_{59}$ and applied to the grid of a triode $V_{12}$. The triode $V_{12}$ acts as a cathode follower and has its anode connected to the +350 volt line and its cathode connected to the −150 volt line through a resistor $R_{60}$. An output terminal 59 is connected to the cathode of the triode $V_{12}$ through a resistor $R_{61}$. The potential on the terminal 57 is the trigger level $Vt_1$ and the potential on the terminal 58 is the rising potential on the cathode of the triode $V_6$ (Fig. 11). Thus the output at the terminal 59 in each interval $\Delta t_1$ is a potential rising at a rate determined by $\theta$ from a level determined by the voltage reader $VR_1$ as previously described.

The output terminal 59 is connected to an input terminal 60 of the modulator $MD_1$ (Fig. 17). The input terminal 60 is connected to the grid of a triode $V_{13}$ having its cathode connected to earth and its anode connected through a resistor $R_{62}$, the primary winding of an output transformer $T_2$ and the secondary winding of a mains transformer $T_3$ to earth. An output terminal 61 is connected through the secondary winding of the transformer $T_2$ to earth. Thus the current flowing through the terminal 61 is an alternating current modulated by the rising output at the terminal 59 of the corrective information computer $CI_1$ (Fig. 16). The terminal 61 is connected to the input terminal 26 of the selector $SE_2$ and to one fixed contact of the switch $SW_1$.

In a modification (not shown) of the coordinator both the storage matrices $ST_1$ and $ST_2$ are used together and the voltage reader $VR_1$ determines a trigger level dependent on the added effects of a storing means of the storage matrix $ST_1$ and a storing means of the storage matrix $ST_2$. Thus, for example, in the position $p_1$ the input to the voltage reader $VR_1$ and thus the trigger level $Vt_1$ is determined by the quantities stored on the storing means $f_1$ and the storing means $e_3$.

It will be appreciated that an exact description of the way in which the system comprising the operator and the coordinator reaches a state of dynamic equilibrium is not possible. However, to conclude this description of the Type I coordinator the complete sequence of operations in the positions $p_i$ will be described, assuming here that $p_i = p_5$.

Thus referring to Fig. 3, at time $t_1$ the relay N is energized. The set of contacts N2 open and the uniselector control $UC_1$ moves on the uniselector banks $U_1$ to $U_5$ from the position $p_4$ to the position $p_5$. The set of contacts N1 open and the waveform $V_{sm}$ starts to rise from the level $V_a$ at a rate dependent on the value of $\theta$ then obtaining. At the same time the sets of contacts N3 and N4 close and allow the relays of the response board $RB_1$ to function.

The lamp $k_1$ slowly lights up (the switch $SW_1$ being assumed to be in the setting shown in Fig. 2) and the lamp $m_7$ also slowly lights up, indicating directly that the switch $s_7$ is the correct switch to be pressed. At time $t_2$ the operator presses the correct switch, namely $s_7$ and the relays E and F are energized. The set of contacts E1 changes over and subsequently the set of contacts F1 close. Accordingly the relay H is energized. The sets of contacts H1, H2 and H3 close, holding on the relay H, energizing the relay L and lighting up the lamp 38 respectively. The relay L opens the set of contacts L1 and the relays E and F cannot again be energized until H has been de-energized.

The set of contacts H4 changes over and the value of $\theta$ is caused to increase at a relatively rapid rate. Furthermore the set of contacts H5 changes over and negative charge is added to the capacitor $e_1$ of the storage matrix $ST_1$ or the capacitor $f_5$ of the storage matrix $ST_2$, depending on the setting of the switch $SW_2$. The trigger level $Vt_5$ is determined by the potential across either the capacitor $e_1$ or the capacitor $f_5$ as the case may be and when the waveform $V_{sm}$ reaches this level, at time $t_3$, the relay M is energized.

This terminates the position $p_5$, the relay N being de-energized. The set of contacts N1 closes, causing the waveform $V_{sm}$ to fly back to the level $V_a$. The set of contacts N2 sets the uniselector control, ready to move on the banks $U_1$ to $U_5$ to the position $p_6$ after the interval $u$, at time $t_4$. The sets of contacts N3 and N4 open and the marking relays, including the relay H, are all de-energized.

The sequence of events is similar, mutatis mutandis, in the position $p_6$ in which an incorrect response is made at time $t_5$.

Fig. 18 shows the connections between the various terminals shown in Figs. 4 to 17.

Turning now to the example of a Type II coordinator, Fig. 19 shows diagrammatically the lamps displayed to the operator and the press button switches to be pressed by the operator. In this embodiment the coordinator operates in a sequence of twelve positions, which will again be referred to as $p_1$ to $p_{12}$, and in each position $p_i$ a general lamp $h_u$ of twelve lamps $h_1$ to $h_{12}$ lights up. These lamps constitute a display $DS_3$. At the end of each position $p_i$ there is again a short fixed moving on interval of duration $u$ before the start of the next position $p_{i+1}$.

As previously explained, in a Type II coordinator the form in which responses have to be made differs from that in which signals are given. The responses are made by pressing one of three row switches, $sr_1$, $sr_2$ and $sr_3$ and (not necessarily simultaneously) one of four column switches $sc_1$, $sc_2$, $sc_3$ and $sc_4$. A full response is made only when one row and one column switch has been pressed. The row and column switches together constitute a response board $RB_2$. Each combination of one row switch and one column switch defines one of an array of twelve translucent screens $n_1$ to $n_{12}$. These bear distinguishing symbols, which are not however shown, in order not to confuse the figure. By way of example, the switches $sr_2$ and $sc_1$ define the screen $n_5$. A one-to-one correspondence is set up between the twelve lamps $h_1$ to $h_{12}$ and the twelve screens $n_1$ to $n_{12}$. Thus as in the description of the Type I coordinator an example of the way in which the coordinator may be set up is given in Table I and the Type II coordinator will be described as set up in this way.

Corrective information is supplied to the operator by three row lamps $mr_1$, $mr_2$ and $mr_3$ and four column lamps $mc_1$, $mc_2$, $mc_3$ and $mc_4$ constituting a second display $DS_4$. A lamp 100 lights up when a correct response is made and lamp 101 when an incorrect response is made. A response is deemed incorrect when either an incorrect row or column switch is pressed or when both switches pressed are wrong.

In addition the coordinator has a third display $DS_5$ comprising twelve lamps $mm_1$ to $mm_{12}$, the lamp $mm_1$ being under the screen $n_1$, the lamp $mm_2$ under screen $n_2$ and so on.

In the interval $u$ following the end of a position $p_i$ the lamp of the display $DS_5$ under the screen which should have been defined by a row and a column switch for a correct response lights up. Thus the operator, in cases where he makes an incorrect response or no response, is supplied with information as to the response he should have made. This information is of course different from the corrective information supplied by the display $DS_4$ as it is never supplied early enough to help the operator make a correct response in the position in which the coordinator then is.

The operation of the coordinator will now be contrasted with the operation of the Type I coordinator, with reference to Fig. 20.

Again a marking variable $\theta$ normally decreases slowly, decreases relatively rapidly when an incorrect response is made (whether it be a row or a column response) until the end of the position in which the incorrect response is made and increases relatively rapidly when a completely correct response is made until the end of the position in which the completely correct response is made. Thus two consecutive positions $p_i$ and $p_{i+1}$ are again shown, starting at $t_{10}$ and $t_{16}$ respectively and ending at $t_{13}$ and $t_{19}$ respectively. In the position $p_i$ a correct row response is assumed to be made at time $t_{14}$ and a correct column response at time $t_{15}$. $\theta$ accordingly increases from $t_{15}$ to $t_{13}$. In the position $p_{i+1}$ an incorrect row response is assumed to be made at time $t_{20}$ and a correct column response at time $t_{21}$. $\theta$ accordingly decreases relatively rapidly from $t_{20}$ to $t_{19}$.

Again the duration of the positions $p_i$ is determined by a waveform $V_{sm}$ which rises at a rate dependent on $\theta$ to a trigger level $V_t$, which is, however, fixed in the Type II coordinator. Thus the increase in the rate of operation of the coordinator is a general increase as $\theta$ increases, and not a "patterned" increase as in the case with the Type I coordinator.

Because in the Type II coordinator there are two marking categories, that is a row category and a column category (the operator may make a correct or incorrect response in either category), it is not satisfactory to measure intervals of time corresponding to the intervals of time $\delta t_1$ (Fig. 3) from the instant at which a response is made to the end of the position in which the response is made. Accordingly in each position $p_i$ two further instants of time are defined by two subsidiary trigger levels $Vt_{r(i)}$ and $Vt_{c(i)}$ and will be called the row limit time and the column limit time respectively. These two times are at $t_{11}$ and $t_{12}$ in the position $p_i$ and at $t_{17}$ and $t_{18}$ in the position $p_{i+1}$.

These two trigger levels are determined by two storage matrices $ST_r$ and $ST_c$ respectively, each comprising, as will be described, twelve capacitors storing negative charges whose magnitude is a measure of the previous degree of success averaged over a number of sequences in making a row response or a column response as the case may be, in each position $p_i$. Apart from the slow leakage of charge occurring from the capacitors, the charge on a row capacitor is only altered in an interval between a row response (e.g. $t_{14}$) and the row limit time (e.g. $t_{11}$), and

*Table 1*

| Position in sequence | $p_1$ | $p_2$ | $p_3$ | $p_4$ | $p_5$ | $p_6$ | $p_7$ | $p_8$ | $p_9$ | $p_{10}$ | $p_{11}$ | $p_{12}$ |
|---|---|---|---|---|---|---|---|---|---|---|---|---|
| Lamp of display $DS_3$ alight | $h_{12}$ | $h_{10}$ | $h_8$ | $h_{11}$ | $h_2$ | $h_9$ | $h_7$ | $h_4$ | $h_1$ | $h_7$ | $h_5$ | $h_6$ |
| Corresponding location | $n_5$ | $n_{12}$ | $n_1$ | $n_9$ | $n_{10}$ | $n_{11}$ | $n_4$ | $n_6$ | $n_2$ | $n_7$ | $n_3$ | $n_8$ |
| Row switch to be pressed | $sr_2$ | $sr_3$ | $sr_1$ | $sr_3$ | $sr_3$ | $sr_3$ | $sr_1$ | $sr_2$ | $sr_1$ | $sr_2$ | $sr_1$ | $sr_2$ |
| Column switch to be pressed | $sc_1$ | $sc_4$ | $sc_1$ | $sc_1$ | $sc_2$ | $sc_3$ | $sc_4$ | $sc_2$ | $sc_2$ | $sc_3$ | $sc_3$ | $sc_4$ | then only if the row response is made before the said time. When an alteration in the negative charge is made, it is increased in magnitude if the response is correct and decreased in magnitude if the response is incorrect. Similar remarks, mutatis mutandis, apply to column responses.

Thus referring again to Fig. 20, in the position $p_i$ no alteration is made in the charge of the row capacitor because although a correct row response is made (at time $t_{14}$) it is not made before the time $t_{11}$. The magnitude of charge on the column capacitor is increased in an interval $\delta t_{c(i)}$ beginning at time $t_{15}$ at which a correct column response is made and ending at the column limit time $t_{12}$. In the position $p_{i+1}$ the magnitude of the charge on the row capacitor is decreased in an interval $\delta t_{r(i+1)}$ following the incorrect row response at time $t_{20}$ and the magnitude of the charge on the column capacitor is increased in an interval $\delta t_{c(i+1)}$ following the correct column response at time $t_{21}$.

Thus trigger levels $Vt_{r(i)}$ and $Vt_{c(i)}$ are determined by the charge on the row and column capacitors, respectively, associated with the position $p_i$, the levels being relatively low when the charge is of relatively great magnitude.

Furthermore the corrective information given to the operator by the display $DS_5$ is withdrawn in a "patterned" manner dependent on the charges on the capacitors of the two storage matrices in a manner essentially the same as that in the Type I coordinator.

Referring now to the block circuit diagram Fig. 21, the twelve positions of the coordinator are determined by an eight bank, twelve position uniselector having banks $U_6$ to $U_{13}$ controlled by a uniselector control $UC_2$.

The first bank $U_6$ feeds the display $DS_3$ through a terminal block $TB_4$ and determines which lamp of the display $DS_3$ lights up in each position. The intensity with which the lamp lights up and the intensity of a background illumination of all the lamps, which causes ambiguity in the instructions to the operator, are determined by an "ambiguity modulator" $AM_1$. When $\theta$ is high the intensity of the background illumination is made high and vice versa. The intensity of the selected lamp is arranged to increase from a level proportional to the average value of $Vt_{r(i)}$ and $Vt_{c(i)}$ in the position $p_i$. Thus as the operator progresses the coordinator gives him instructions in an increasingly ambiguous fashion. Moreover this increase in ambiguity is "patterned" in the sense used above.

The uniselector bank $U_7$ feeds the display $DS_5$ through a terminal block $TB_5$ and determines which lamp of this display lights up. The selected lamp lights up in the interval $u$ after a position $p_i$ since the wiper of the uniselector bank is connected to a source of potential through a set of relay contacts $Na5$ of a relay $Na$ (Fig. 24) which is closed in the intervals $u$, as will be described hereinafter.

The uniselector banks $U_8$ and $U_9$ feed the response board $RB_2$ (constituted by the switches $sr_1$ to $sr_3$ and $sc_1$ to $sc_4$) through two terminal blocks $TB_6$ and $TB_7$ respectively. The output from the response board $RB_2$ is fed to a set of marking relays $MR_2$ which controls the state of a marking computer $MC_2$, which is in essence the same as that described for the Type I coordinator, and which computes the variable $\theta$ from its state.

One output from the marking computer goes to a waveform generator $WG_2$ generating the waveform $V_{sm}$ (Fig. 20) and controls the rate of rise of the waveform $V_{sm}$ in each position $p_i$. The waveform generator controls the uniselector control $UC_2$ in the same way as the generator $WG_1$ controls $UC_1$ in the Type I coordinator.

Another output from the marking computer is fed through an access controller $AC_r$ and the uniselector bank $U_{10}$ to the storage matrix $ST_r$ and through an access controller $AC_c$ and the uniselector bank $U_{11}$ to the storage matrix $ST_c$. The access controllers $AC_r$ and $AC_c$ are in essence the same as the access controller $AC_1$ of the Type I coordinator, but the state of the access controller $AC_r$ is determined by two relays of the marking relays $MR_2$ one of which, as will hereinafter be described, is energized in any interval $\delta t_{r(i)}$ in the position $p_i$, which of the relays is energized depending on whether the interval $\delta t_{r(i)}$ is initiated by a correct or an incorrect response. Likewise the state of the access controller $AC_c$ is determined by two relays of the marking relays $MR_2$, one of which, as will hereinafter be described, is energized in any interval $\delta t_{c(i)}$ in the position $p_i$.

Two voltage readers $VR_r$ and $VR_c$ are in essence the same as the voltage reader $VR_1$ of the Type I coordinator and have their inputs connected to the storage matrices $ST_r$ and $ST_c$ respectively through the uniselector banks $U_{12}$ and $U_{13}$ respectively. The outputs from the voltage readers $VR_r$ and $VR_c$ are the trigger levels $Vt_{r(i)}$ and $Vt_{c(i)}$ respectively and are fed to the waveform generator $WG_2$, to the ambiguity modulator $AM_1$ and to a corrective information computer $CI_r$ and a corrective information computer $CI_c$ respectively.

The corrective information computers $CI_r$ and $CI_c$ are in essence the same as the corrective information computer $CI_1$ of the Type I coordinator and add the trigger levels $Vt_{r(i)}$ and $Vt_{c(i)}$ respectively (obtained from the voltage readers $VR_r$ and $VR_c$ respectively) to the waveform $V_{sm}$ obtained from the wavefore generator $WG_2$. The outputs from the corrective information computers $CI_r$ and $CI_c$ are fed to a modulator $MD_r$ and a modulator $MD_c$ respectively. The modulators $MD_r$ and $MD_c$ are in essence the same as the modulator $MD_1$ of the Type I coordinator and their outputs are fed to the display $DS_4$ through the uniselector banks $U_{12}$ and $U_{13}$ respectively and terminal boards $TB_8$ and $TB_9$ respectively.

The display $DS_4$ is also controlled by two relays of the waveform generator $WG_2$ which allow the row lamps $mr_1$ to $mr_3$ to light up only after the row limit time and the column lamps $mc_1$ to $mc_4$ to light up only after the column limit time.

The ambiguity modulator $AM_1$ is connected to the outputs of the voltage readers $VR_c$ and $VR_r$ and to outputs of the marking computer $MC_2$ and the waveform generator $WG_2$, and controls the lamps of the display $DS_3$ in the manner hereinbefore described, in response to the input signals thus obtained.

Considering now the detailed construction of the coordinator and referring first to Fig. 22, twelve output terminals 102 of the uniselector bank $U_6$ are connected respectively to twelve input terminals 103 of the terminal block $TB_4$. The twelve lamps $h_1$ to $h_{12}$ of the display $DS_3$ are connected in series with twelve resistors $R_{70}$ to $R_{81}$ respectively between earth and a terminal 104. Twelve output terminals 105 of the terminal block $TB_4$ are connected to the junctions respectively of the lamps $h_1$ to $h_{12}$ and the resistors $R_{70}$ to $R_{81}$.

When a potential is applied to the terminal 104 from the ambiguity modulator $AM_1$—Fig. 28), all the lamps $h_1$ to $h_{12}$ light up with a background illumination. A suitable potential applied to the wiper of the bank $U_6$ (from the ambiguity modulator $AM_1$) causes one lamp to light up with a greater intensity than the others, this lamp indicating the response which is to be made. As will be seen, the connections in the terminal block $TB_4$ are such that in each position $p_i$ the lamp $h_u$ which lights up with a greater brightness is that shown in Table I. In the position shown, namely $p_5$, this lamp is $h_2$.

Referring to Fig. 23, the wiper of the uniselector bank $U_7$ is connected through the set of relay contacts $Na5$ to the +25 volt line. The twelve output terminals 106 of the bank $U_7$ are connected to twelve input terminals 107 respectively of the terminal block $TB_5$, twelve output terminals 108 of which are connected to one terminal of the twelve lamps $mm_1$ to $mm_{12}$ respectively of the display $DS_5$. The other terminals of these lamps are connected to earth.

It will be seen that for the duration of an interval $u$ following a position $p_i$, whilst the set of relay contacts $Na5$ is closed, the lamp of the display $DS_5$ which is under the screen $n_u$ corresponding to the position $p_i$ lights up (Table I). Thus following the position $p_5$ the lamp $mm_{10}$ lights up. In this connection it will be appreciated that, as in the Type I coordinator the uniselector steps on from a position $p_i$ to a position $p_{i+1}$ at the beginning of the position $p_{i+1}$.

Referring now to Fig. 24 the same principle is used to energize the switches of the response board $RB_2$ as is used in the Type I coordinator, although a "permutator," a set of "control relays" and a "selector" are not used, the upper half of each of the row switches $sr_1$ to $sr_3$ being connected to the +25 volt line through the uniselector bank $U_8$ and the terminal block $TB_6$ and the upper half of each of the column switches $sc_1$ to $sc_4$ being connected to the +25 volt line through the uniselector bank $U_9$ and the terminal block $TB_7$. The response board $RB_2$ has four output terminals 109, 110, 111 and 112. As will be seen from the diagram these terminals are energized under the following conditions: terminal 109 when any row switch is pressed, terminal 110, when a correct row switch is pressed, through the uniselector $U_8$, terminal 111, when any column switch is pressed, and terminal 112, when a correct column switch is pressed, through the uniselector $U_9$.

The terminals 109, 110, 111 and 112 are connected to four input terminals 113, 114, 115 and 116 respectively of the marking relays $MR_2$ shown in Fig. 25. As will be seen from this figure a set of row relays Er, Fr, Gr, Hr and Lr and a set of column relays Ec, Fc, Gc, Hc and Lc both in essence duplicate and function in like manner to the set of relays E, F, G, H and L of the Type I coordinator (Fig. 9). Thus the relay Gr is energized through the sets of contacts Na2, Fr1 and Lr1 in an interval beginning with an incorrect row response in the position $p_i$ and ending with the end of the position $p_i$. Likewise the relay Hr is energized through the same sets of contacts Na2, Fr1 and Er1 in an interval beginning with a correct row response in the position $p_i$ and ending with the end of the position $p_i$. However the lamp 100 indicating a correct response (corresponding to the lamp 37 in Fig. 9) is connected in series with sets of relay contacts Hr4 and Hc4 and is alight only in an interval beginning with the later response of both a correct row response and a correct column response and ending with the end of the position in which the responses are made. A relay J in parallel with the lamp 100 is energized in such an interval and operates a set of changeover contacts in the marking computer $MC_2$ as will be described hereinafter. Furthermore the lamp 101 indicating an incorrect response (corresponding to the lamp 38 in Fig. 9) is connected in series with sets of relay contacts Gr4 and Gc4 in parallel and is alight in an interval beginning with either an incorrect row response or an incorrect column response and ending with the end of the position in which the response is made. A relay K in parallel with the lamp 101 is energized in such an interval and operates a set of changeover contacts in the marking computer $MC_2$ to be described hereinafter.

Two further row relays are provided, namely a relay Pr having its winding connected in series with two sets of relay contacts Gr3 and Sr1 and a relay Qr having its winding connected in series with a set of relay contacts Hr3 and the set of relay contacts Sr1. The set of relay contacts Sr1 are of a relay Sr of the waveform generator shown in Fig. 26 and are closed at the beginning of a position $p_i$ and remain closed until the row limit time is reached as will be hereinafter described. Accordingly in a position $p_i$ the relay Pr is energized for the duration of an interval beginning with an incorrect row response made before the row limit time is reached and ending with the row limit time and the relay Qr is energized for an interval beginning with a correct row response made before the row limit time is reached and ending with the row limit time.

Two relays Qc and Pc and sets of relay contacts Sc1, Gc3 and Hc3 act for column responses in the same way as the relays Qr and Pc and the sets of contacts Sr1, Gr3 and Hr3 act for row responses. The sets of contacts Sc1 are of a relay Sc, again in the waveform generator $WG_2$. The relays Pr and Qr control the state of the access controller $AC_r$ and the relays Pc and Qc control the state of the access controller $AC_c$.

The circuit diagram of the marking computer $MC_2$ is not drawn separately as it is the same as Fig. 10 except that the set of relay contacts G4 are now a set of relay contacts of the relay K shown in Fig. 25, and will be referred to as K1 and the set of relay contacts H4 are now a set of relay contacts of the relay J, and will be referred to as J1. The variable $\theta$ (Fig. 20) is again the potential on the cathode of the triode V3 (Fig. 10). The output terminal 39 is connected to an input terminal 117 of the waveform generator $WG_2$ (Fig. 26) corresponding to the input terminal 44 of the generator $WG_1$ of Fig. 11.

In the waveform generator $WG_2$ triodes $V_{14}$, $V_{15}$, $V_{16}$, $V_{17}$, $V_{18}$ and $V_{19}$, relays Ma and Na, sets of relay contacts Ma1 and Na1 and associated resistors $R_{82}$ to $R_{103}$, capacitors $C_7$ to $C_{10}$ and rectifier X2 correspond respectively to the triodes $V_5$, $V_6$, $V_7$, $V_8$, $V_9$ and $V_{10}$, the relays M and N, the sets of relay contacts M1 and N1 and the associated resistors, capacitors and rectifier of the waveform generator $WG_1$, with the one difference (apart from any in component values) that the terminal 45 (Fig. 11) is now connected to the +350 volt line. Thus the trigger level of the Schmitt trigger circuit comprising triodes $V_{16}$ and $V_{17}$ is fixed and is the trigger level $V_t$ shown in Fig. 20. The waveform $V_{sm}$ in Fig. 20 is the potential on the grid of the triode $V_{17}$. The relay Na is, like the relay N, energized during the intervals $u$. An output terminal 118 for connection to the corrective information computers $Cl_r$ and $Cl_c$ is connected to the cathode of the triode $V_{15}$.

The waveform generator $WG_2$ also comprises two further Schmitt trigger circuits similar to that comprising the triodes $V_7$ and $V_8$ in Fig. 11. The first of these comprises triodes $V_{20}$ and $V_{21}$, resistors $R_{104}$, $R_{105}$ and $R_{106}$ and the relay Sr connected together as shown. The control grid of the triode $V_{20}$ is connected to the −150 volt line through a resistor $R_{107}$ and to a terminal 119 through a resistor $R_{108}$. The control grid of the triode $V_{21}$ is connected to the cathode of the triode $V_{15}$ through a resistor $R_{109}$ and to the junction of two resistors $R_{110}$ and $R_{111}$ connected between earth and the −150 volt line through a resistor $R_{112}$.

Thus the relay Sr is energized in a position $p_i$ when the waveform $V_{sm}$ reaches the potential on the grid of the triode $V_{20}$, which is arranged, as will be hereinafter described, to be the trigger level $Vt_{r(1)}$, and remains energized until very shortly after the end of the position $p_i$, when owing to the closing of the set of contacts Na1, and the consequent discharge of the capacitor $C_7$ which leads to the fall in the potential on the cathode of the triode $V_{15}$, the relay is de-energized.

The second of the further Schmitt trigger circuits comprises triodes $V_{22}$ and $V_{23}$, resistors $R_{113}$ to $R_{121}$, the relay Sc and a terminal 120 which components correspond exactly to the triodes $V_{20}$ and $V_{21}$, resistors $R_{104}$ to $R_{112}$, the relay Sr and the terminal 119. The relay Sc is energized in a position $p_i$ when the waveform $V_{sm}$ reaches the potential on the grid of the triode $V_{22}$, which is arranged, as will be hereinafter be described, to be the trigger level $Vt_{c(1)}$ and remains energized until very shortly after the end of the position $p_i$. The uniselector control $UC_2$ is the same as the uniselector control $UC_1$ (Fig.

12) except that the set of relay contacts N2 is now a set of the relay Na and is named Na2.

The trigger levels $Vt_{r(1)}$ and $Vt_{c(1)}$ are determined by the potentials on the terminals 119 and 120 respectively which potentials are provided by the voltage readers $VR_r$ and $VR_c$ respectively. Each of these is the same as the voltage reader $VR_1$ shown in Fig. 13, but for convenience the terminals 47 and 50 will be given subscripts $r$ and $c$ according to whether they belong to the reader $VR_r$ or the reader $VR_c$. This same convention will be adopted for the access controllers $AC_r$ and $AC_c$, the corrective information computers $CI_r$ and $CI_c$ and the modulators $MD_r$ and $MD_c$ all of which are in essence the same as the access controller $AC_1$ of Fig. 15, the corrective information computer $CI_1$ of Fig. 16 or the modulator $MD_1$ of Fig. 17 as the case may be.

The storage matrices $ST_r$ and $ST_c$ are in essence the same as the storage matrix $ST_2$ of Fig. 14. The terminals 40, 41, 42 and 43 of the marking computer $MC_2$ of Fig. 10 are connected to the four terminals $53_r$, $54_r$, $55_r$ and $56_r$ respectively of the access controller $AC_r$ of Fig. 15 and to the four terminals $53_c$, $54_c$, $55_c$ and $56_c$ respectively of the access controller $AC_c$ of Fig. 15.

In the access controller $AC_r$ the sets of relay contacts $G_5$ and $H_5$ in Fig. 15 become sets of relay contacts $Pr1$ and $Qr1$ respectively, and in the access controller $AC_c$ the sets of contacts G5 and H5 become sets of contacts $Pc1$ and $Qc1$ respectively.

The terminals $51_r$ and $51_c$ of the access controllers $AC_r$ and $AC_c$ respectively are connected to the wipers of the uniselector banks $U_{10}$ and $U_{11}$ respectively and to the terminals $50_r$ and $50_c$ of the voltage readers $VR_r$ and $VR_c$ respectively.

The terminal 118 of the waveform generator $WG_2$ is connected to the terminals $58_r$ and $58_c$ of the corrective information computers $CI_r$ and $CI_c$ respectively (Fig. 16) and to a terminal 23 of the ambiguity modulator $AM_1$ (Fig. 28). The terminals $47_r$ and $47_c$ of the voltage readers $VR_r$ and $VR_c$ of Fig. 13 are further connected to the terminals $57_r$ and $57_c$ of the two corrective information computers respectively and to two input terminals 121 and 122 respectively of the ambiguity modulator $AM_1$ (Fig. 28). The output terminals of $59_r$ and $59_c$ of the corrective information computers are connected to the input terminals $60_r$ and $60_c$ respectively of the modulators $MD_r$ and $MD_c$ respectively of Fig. 17, the output terminals $61_r$ and $61_c$ respectively of which are connected to the wipers of the uniselector banks $U_{12}$ and $U_{13}$ respectively, which are shown in Fig. 27.

In Fig. 27, the output terminals of the bank $U_{12}$ are connected through the terminal block $TB_8$ (which has the same connections as the terminal block $TB_6$ of Fig. 24) to one terminal of each of the three lamps $mr_1$ to $mr_3$ respectively, of the display $DS_4$, the other terminals of which are connected to earth through a set of relay contacts $Sr2$ which are closed in a position $p_i$ only after the row limit time for that position has been reached. Similarly the outputs of the bank $U_{13}$ are connected through the terminal block $TB_9$ to one terminal of each of the lamps $mc_1$ to $mc_4$ respectively, the other terminals of which are connected to earth through a set of relay contacts $Sc2$.

It will be appreciated that the inputs to the two groups of lamps of the display $DS_4$ increase from levels dependent on variable trigger levels ($Vt_{r(1)}$ or $Vt_{c(1)}$) at a rate dependent on $\theta$ in the same way as the inputs to the lamps of the display $DS_2$ of the Type I coordinator increase from a level dependent on the variable trigger level $Vt_1$ (Fig. 3) at a rate dependent on $\theta$. However on account of the sets of contacts $Sr2$ and $Sc2$ the corrective information in the two categories (row and column) is never presented in time for responses to be made which vary the charges on the capacitors of the stores $ST_r$ and $ST_c$, although of course row and column responses made after the row limit times and the column limit times respectively alter the marking variable $\theta$.

Turning now to the ambiguity modulator $AM_1$ shown in Fig. 28, this comprises two stages, each of which is basically similar to a corrective information computer (Fig. 16) feeding a modulator (Fig. 17). Thus the first stage comprises a network of adding resistors $R_{122}$, $R_{123}$, $R_{124}$ and $R_{125}$ from which a potential which is the sum of potentials proportional to the trigger levels $Vt_{r(1)}$ and $Vt_{c(1)}$ and the waveform $V_{sm}$ (Fig. 20) is applied to the control grid of a triode $V_{24}$ acting as a cathode follower. The triode $V_{24}$ has its anode connected to the +350 volt line and its cathode connected to the −150 volt line through a resistor $R_{126}$ and to the control grid of a triode $V_{25}$ through a resistor $R_{127}$.

The triode $V_{25}$ together with a resistor $R_{128}$ and two transformers $T_4$ and $T_5$ constitute a modulator, the secondary winding of the transformer $T_5$ being split to provide a modulated 50 c.p.s. output potential to a terminal 124 and a similar output potential to the cathode of a rectifier X3. The terminal 124 is connected to the wiper of the uniselector bank $U_6$, a modulated potential of increasing amplitude thus being applied to the lamp of the display $DS_3$ selected by the bank $U_6$.

The anode of the rectifier X3 is connected to earth through a resistor $R_{129}$ and a capacitor $C_{11}$ in parallel. Accordingly a negative rectified potential is integrated across the capacitor $C_{11}$ and this potential is applied to one end of a resistor $R_{130}$. A further input terminal 125 is connected to the terminal 126 of the marking computer of Fig. 10, which terminal is at the potential $\theta$, and accordingly the potential $\theta$, is applied to the terminal 125. This terminal is connected to one end of a resistor $R_{131}$ and the other ends of this resistor and the resistor $R_{130}$ are connected to earth through a resistor $R_{132}$ and to the control grid of a triode $V_{26}$. Accordingly the potential on the grid of the triode $V_{26}$ is the algebraic sum of a negative potential of amplitude proportional to the amplitude of the envelope of the output at terminal 124 and a positive potential proportional to $\theta$. The triode $V_{26}$ with a cathode load resistor $R_{133}$ acts as a cathode follower feeding a modulator comprising a triode $V_{27}$, two resistors $R_{134}$ and $R_{135}$, two transformers $T_6$ and $T_7$ and an output terminal 127.

It will be seen that the amplitude of the modulated output at the terminal 127 is increased when $\theta$ increases but decreased when the amplitude of the modulated output at the terminal 124 is high. Furthermore the 50 c.p.s. carriers at the terminals 124 and 127 are arranged to be in phase. The terminal 127 is connected to the terminal 104 of the display $DS_3$ in Fig. 20. Thus all the lamps of the display $DS_3$ are lit with a brightness which is relatively high when $\theta$ is high unless the trigger levels $Vt_{r(1)}$ and $Vt_{c(1)}$ are high for the position $p_i$ in which the co-ordinator is at any instant, but this brightness decreases throughout the duration of the position $p_i$, whilst the lamp selected by the uniselector bank $U_6$ is lit with a brightness which is relatively high when the trigger levels $Vt_{r(1)}$ and $Vt_{c(1)}$ are high and which increases throughout the duration of the position $p_i$.

Fig. 29 shows the connections between the various terminals of the elements of the Type II co-ordinator.

Turning now to the Type III coordinator, this will be described in detail in conjunction with a brief description of a radar training apparatus employing the co-ordinator. Fig. 30 is a block diagram of the complete apparatus, one of the blocks representing the operator OP. The apparatus comprises a P.P.I. display unit DI with a cathode ray tube screen 200 on which a target aircraft is represented by a double spot of light 201 and a pursuing aircraft by a single spot of light 202. The positions of these spots of light are controlled by a radar simulator RS, that of the single spot 202 in response to adjustment of controls of the simulator by the operator and that of the double spot 201 in response to an input to the simulator from the Type III coordinator CO. Both the operator and the coordinator receive information from the P.P.I. display unit, the operator visually and the coordinator electrically.

The operator, by manipulation of the controls of the radar simulator attempts to bring the single spot 202 into coincidence with the double spot 201. The coordinator determines an "escape strategy" for the spot 201, adapting this strategy to the operator's ability. It will be appreciated that this strategy cannot be a purely evasive strategy in which the spot 201 always moves directly away from the spot 202, as the operator would always then know what the spot 201 would do at any instant. Accordingly the system adopted in this apparatus is to define two pairs of "pure target strategies," namely:

(1) Move up, represented by SI or Move down, represented by SII.
(2) Move left, represented by SIII or Move right, represented by SIV.

These four strategies may be regarded as the axes of a four-dimensional message space and the output of the coordinator as a vector in this space, having components $\alpha$(SI), $\beta$(SII), $\gamma$(SIII) and $\delta$(SIV), where $\alpha$, $\beta$, $\gamma$ and $\delta$ are weighting functions. Thus the coordinator determines a mixed strategy by determining the magnitudes of $\alpha$, $\beta$, $\gamma$ and $\delta$, representing them as four potentials applied by the coordinator to the simulator. A further output from the coordinator to the simulator may be another potential representing the magnitude of a marking variable $\theta$ (analogous to the marking variables $\theta$ described in connection with the Type I and the Type II coordinators). This potential may be used to control the speed or other characteristic of the target aircraft, or the sensitivity of the actuation of the knobs controlled by the operator.

The radar simulator derives from these five potentials the signals which are fed to the P.P.I. display to control the rate and direction of movement of the spot 201. In one embodiment these five potentials are applied to servo-mechanisms which control the rate of turn and velocity of the target aircraft, also receiving signals enabling them to take account of the prevailing rate of turn and velocity at each instant. However the means provided in the simulator for deriving the said signals do not form part of this invention and are accordingly not described; they are made such that the motion of the spot 201 is realistic, that is, it does not do anything which a spot of light representing a real aircraft cannot do.

The input to the coordinator may similarly be regarded as a vector in a four-dimensional message space although the actual input vector employed, as will be hereinafter described, is a vector having components $\alpha'$(MI), $\beta'$(MII), $\gamma'$(MIII) and $\delta$(MIV), where MI to MIV represent four marking categories, determined by the four quadrants of a set of Cartesian coordinates with their origin at the spot of light 202, representing the pursuing aircraft. Thus, for example, the category MI corresponds to the spot of light 201 being in the upper right quadrant. The other correspondences are listed in Table II below.

However each marking category in actual fact corresponds to a pure strategy, since for example, when the category MI obtains it implies that the operator has been employing that strategy which brings the spot 202 into the relationship with the spot 201 defined by this category.

Of the weighting functions $\alpha'$, $\beta'$, $\gamma'$ and $\delta'$ at any instant a selected one is made proportional to the marking variable $\theta$ and the others are made zero.

Before proceeding with the description of Fig. 31 and the detailed description of the parts of the coordinator, a general description of the nature and mode of operation of the trainable assemblage employed therein will be given. The assemblage is of very wide applicability in training coordinators wherein a strategy has to be determined.

The assemblage comprises a storage matrix with sixteen capacitors acting as storing means. The capacitors are charged negatively by a negative potential which increases in magnitude with an increasing degree of success of the operator.

Each capacitor is connected in series with a thermistor, which controls the access of charge to the capacitor.

Each thermistor is indirectly heated by a resistor. The potential applied to each resistor is determined by two "access controllers." Thus the sixteen capacitors are arranged in four columns and four rows, each row and column having four capacitors therein. One access controller controls the access of charge to the four columns and the other to the four rows of capacitors.

The four columns correspond to the four marking categories MI to MIV and the four rows to the four strategies SI to SIV. The two access controllers each provide four output potentials, which are the potentials applied to the heating resistors. Thus the first output potential provided by the column access controller and the first output potential provided by the row access controller are combined in an adding network to provide the potential to the heating resistor associated with the capacitor in the first column and the first row. Whilst a simple adding network is employed to derive the potential applied to the heating resistor and at any instant the two potentials from the access controllers are added, the term "combined" has been used in preference to "added." This is because over a period of time the effect of the adding network is not in general to produce an effect which is the sum of the separate effects of the separate potentials, but rather an effect which is between additive and multiplicative. This is so because the heating resistor is a leaky heat-sink. If a high potential has been applied to the adding network from the column access controller the heating resistor is made hot and the heat only slowly leaks away. Therefore for some time thereafter the access of charge to the associated capacitor is relatively high. The heating resistor, thermistor and capacitor form a link in a feedback loop to and from the row access controller and whilst the access of charge to the capacitor is high, the loop gain of this loop is high. If therefore a high potential is provided from the row access controller whilst the loop gain is high the effect of this potential is multiplied with the effect of the potential from the column access controller which caused the loop gain to be high.

Feedback circuits are provided in each access controller the effect of which is to cause different output potentials to become high in succession. In the absence of forcing inputs, hereinafter described, all possible states of the output vector from each access controller (the vector whose components are the output potentials from the controller) occur at some instant, and over a very long period of time with the same frequency. Thus in the absence of forcing inputs the access controllers behave in a random manner.

The four potentials provided by the row access controller are employed as the output of the coordinator, as well as for controlling the access of charge to the rows of capacitors. Thus the four potentials are of magnitude $\alpha$, $\beta$, $\gamma$ and $\delta$ and are applied to control the spot 201 (the target aircraft) in the manner already indicated.

As so far described the coordinator determines a random sequence of strategies and in the absence of any input the behaviour of the output from the column access controller is similar. The coordinator behaves in this manner in order to find a pattern of behaviour of the operator, that is to say some change in the values of the input variables which correlate in any manner, which is possibly a very complicated and time-dependent manner, with the strategies it has adopted and the changes which give rise to them. In order to maintain this search process it is necessary to make the coordinator pass through all possible states. Thus, in the absence of an input, apart from changing its output vector, the machine must change through all possible states of receptiveness, since, being in ignorance of what strategy the operator will adopt, it must pass through states which render it sensitive to receiving any of the strategies. Further these states of receptiveness must be conditional upon each possible strategy that is determined by the coordinator and each possible time relationship between all of the changes mentioned.

A pattern is imposed on the strategies by providing forcing inputs to the two access controllers. The forcing input to the column access controller is such as to tend to make high the output potential corresponding to the marking category determined at any time (in a manner to be described hereinafter). The forcing input to the row access controller tends to prevent any output potential becoming high when any capacitor in the row of capacitors, the access of charge to which is partially determined by that potential, has a large quantity of charge on it. This latter forcing input is derived as a feedback from the rows of capacitors.

Thus if the coordinator has followed a strategy in which the operator has done well, $\theta$ will be high, and since when a particular strategy is emphasised the access to the corresponding row of capacitors is made high, one or more of the capacitors of this row will charge up relatively rapidly. This in turn will provide a forcing input to the row access controller and the coordinator will tend to change the strategy.

It may be of assistance to point out that there is an analogy between the coordinator and the mathematical process of solving a vector (the input vector to the storage matrix) in terms of a matrix (the matrix of the magnitudes of the charges on the capacitors of the storage matrix) to give a resultant vector (the output vector). The analogy is only partial, mainly on account of the way the different variables involved are dependent on the previous history of the coordinator.

Now referring to Fig. 31, which is a block diagram of the Type III coordinator CO, four input terminals 203, 204, 205 and 206 are provided, to which are applied, from the display DI of Fig. 30, four potentials representative of X, the x-coordinate of the spot 201; X', the x-coordinate of the spot 202; Y, the y-coordinate of the spot 201; and Y', the y-coordinate of the spot 202, respectively, measured on a set of Cartesian coordinates in the plane of the screen 200. The potentials may, for example, be derived from potentiometers, the positions of whose movable contacts represent coordinates of the spots of light.

Two subtracting amplifiers $AA_1$ and $AA_2$ (which may be of any suitable known form) are connected to the terminals 203 and 204 and the terms 205 and 206 respectively and provide output potentials to amplitude $p(X-X')$ and $p(Y-Y')$ respectively, where $p$ is a constant. These potentials are fed firstly to an adding amplifier $AA_3$ which (using any suitable known circuitry) provides an output potential $\phi = q(|X-X'|+|Y-Y'|)$, where $q$ is a constant. Thus the potential $\phi$ is a measure of the deviation of the spot 202 from the spot 201. Alternatively the adding amplifier $AA_3$ may provide an output potential $\phi = q'[(X-X')^2+(Y-Y')^2]$, which is then a better measure of the deviation. The potential $\phi$ is fed as one input to a marking computer $MC_3$. The potentials $p(X-X')$ and $p(Y-Y')$ are fed secondly to a "selector" $SE_4$ and set the state of two relays DD and LL therein (shown in Fig. 32 to be described hereinafter). The relay DD is energized only when $p(Y-Y')$ is negative and the relay LL is energized only when $p(X-X')$ is negative.

The relays DD and LL together may assume four states, each of which defines one of the four relationships between the spots 201 and 202 previously referred to, namely which quadrant of a set of Cartesian coordinates with their origin at the spot 202 the spot 201 is in. These states and the relationships they define are listed below in Table II, together with the symbols MI to MIV used to denote these four different relationships, each of which defines a marking category, and is in direct correspondence with a previously adopted pure strategy as previously described.

*Table II*

| State of relays | Quadrant of spot 201 | Marking Category |
| --- | --- | --- |
| DD de-energized<br>LL de-energized | Upper, right | MI |
| DD energized<br>LL de-energized | Lower, right | MII |
| DD de-energized<br>LL energized | Upper, left | MIII |
| DD energized<br>LL energized | Lower, left | MIV |

The marking computer $MC_3$ also receives an input from two access controllers $AC_2$ and $AC_3$ to be described later with reference to Fig. 33, from which it computes a variable $\phi$, again represented as a potential, representative of the expected deviation of the spot 201 from the spot 22. A marking variable $\theta$, varying between 0 and a fixed limit is computed, and is a measure of the difference between $\phi$ and $\phi'$, that is between the measured and the expected deviation of the spot 201 from the spot 202. $\theta$ is made small when the difference between $\phi$ and $\phi'$ is large, and large when the difference is small. Thus when $\theta$ is large the operator is achieving a high degree of success and conversely. The marking computer provides two outputs, one a positive potential and the other a negative potential, both representative in magnitude of the magnitude of $\theta$. The negative potential is fed to a matrix of storing means or storage matrix $ST_5$ and the positive potential is fed to the selector $SE_4$ and to an output terminal 207.

The storage matrix $ST_5$ comprises sixteen storing means capacitors, as will be described with reference to Fig. 34, arranged in four columns corresponding to the marking categories MI to MIV and four rows corresponding to the four pure strategies SI to SIV. It follows that the sixteen categories corresponding to the sixteen storing means or capacitors are the categories corresponding to all possible combinations of one marking category and one strategy category.

The negative potential representative of $\theta$ acts as a charging potential for the capacitors. The access of charge to the capacitors is controlled, however, by the two access controllers $AC_2$ and $AC_3$. In physical terms this means that the resistances through which the capacitors are charged are varied by the access controllers.

The access controller $AC_2$ is a column access controller and, as will be explained in the description relating to Fig. 33, comprises four control devices controlling the access of charge to the capacitors of the four columns respectively. Each of the four control devices is controlled firstly by a feedback from the other three devices and secondly by a forcing input which is the positive potential proportional to $\theta$, fed from the marking computer $MC_3$, through the selector $SE_4$ to one of the control devices. At any instant the positive potential is fed to the control device corresponding to the marking category defined at that instant by the relays DD and LL. In the absence of this forcing input the devices, on account of the feedbacks, go through a succession of states in which the access of charge to capacitors in different columns is made relatively high. In physical terms, when the access to any capacitor is high, the resistance through which it charges is relatively low. The forcing input favours making the access to the appropriate column relatively high to an extent proportional to the magnitude of $\theta$.

The access controller $AC_3$ is a row access controller, identical with the access controller $AC_2$ and comprising four control devices controlling the access of charge to the capacitors of the four rows respectively. Again each control device receives a feedback input from each of the other three devices and a forcing input. The forcing input to the four devices are negative potentials fed from the store $ST_5$ to the access controller $AC_3$ and proportional to the sum of the potentials across the capacitors of the four rows of capacitors respectively.

The output circuits of the control devices of the controller $AC_3$ are connected to the storage matrix $ST_5$ to control the access of charge to the rows of capacitors thereof and are also connected to a set of output relays $OR_1$. The set $OR_1$, hereinafter described with reference to Fig. 35, comprises four relays associated with the four devices of the row access controller $AC_3$ respectively. Each relay is energized when the output potential from the corresponding device is above a certain level and de-energized when the output potential is below that level. The output from the coordinator is taken from four terminals 208, 209, 210 and 211 also connected to the output circuits of the four control devices respectively of the controller $AC_3$, and also from the terminal 207.

The potentials on the terminals 208 to 211 are the values of $\alpha$, $\beta$, $\gamma$ and $\delta$ respectively.

In the absence of any forcing inputs, both of the access controllers will pass through a succession of states and thus the output vector, that is the vector whose four components are represented by the four output potentials respectively, from the row access controller $AC_3$, will vary in a random manner as previously indicated. However the forcing inputs to this access controller will impose some order on its behaviour, since any row of capacitors across which a relatively large total negative potential is stored will provide a large negative forcing input to the associated device in the row access controller. The output from this device is then suppressed and thereby the pure strategy corresponding to this device is suppressed. Furthermore the access of charge to the row of capacitors across which the relatively large total negative potential is stored is reduced, the charge tending to be added preferentially to other capacitors of the storage matrix. That is to say charge is acquired preferentially by capacitors in rows other than the row of capacitors across which the relatively large total negative potential is stored.

Thus the coordinator determines a sequence of mixed strategies. The average rate at which the strategies change is indirectly controlled by a "variance computer" $VC_1$ which computes a quantity which is analogous to the variance of the magnitudes of the negative charges of the sixteen capacitors of the storage matrix $ST_5$, and will be referred to as the "variance." Quotation marks are used since it is not a true variance as usually defined, that is as the mean square deviation of quantites about their mean. When the "variance" is high, that is when the magnitudes of the charges on the capacitors are distributed over a large range, in each of the access controllers $AC_2$ and $AC_3$ the resistance of a triode forming part of a common cathode load of the four devices in the access controller is made low.

When the resistance is low the effect of any sudden variation in the potential applied to the input of any device is greater than that of less suddenly varying inputs. Thus the access controllers tend to seize upon any well defined characteristic in the forcing inputs to them very readily when the "variance" is high, but not to do so when the variance is low.

The variance computer $VC_1$ is a Kipp relay circuit of conventional form which is triggered each time any of the relays DD, LL and four relays RR, SS, TT and UU shown in Fig. 36 (and being the four relays of the output relays $OR_1$ previously referred to) is deenergized. Each time the Kipp relay is triggered it provides an output pulse of constant width and amplitude, and these pulses are integrated in both the row and column access controllers to give the "variance."

The input to the marking computer $MC_3$, referred to above, from which it computes the variable $\phi$, is taken from the two access controllers $AC_2$ and $AC_3$. Two potentials, from the access controllers respectively, each substantially proportional in magnitude to the "variance" are added together and the resulting potential is used in the manner described above to compute $\theta$.

There now follows a detailed description of the coordinator, omitting however the amplifiers $AA_1$, $AA_2$ and $AA_3$ which may be of any suitable known type as previously stated.

Fig. 32 shows the selector $SE_4$, comprising two Schmitt trigger circuits of conventional form. The first circuit comprises triodes $V_{28}$ and $V_{29}$, resistors $R_{150}$ to $R_{154}$ and the winding of the relay DD, serving as the anode load of the triode $V_{29}$. The second circuit comprises triodes $V_{30}$ and $V_{31}$, resistors $R_{155}$ to $R_{159}$ and the winding of the relay LL, serving as the anode load of the triode $V_{31}$. The circuits have input terminals 212 and 213 respectively connected to the output circuits of the amplifiers $AA_1$ and $AA_2$ and both circuits are so biased that their relay windings are energized when the potential on their respective input terminals is below earth potential.

The selector further comprises an input terminal 214 connected to an output terminal 266 of the marking computer $MC_3$ shown in Fig. 37. The terminal 214 is connected through a resistor $R_{160}$ and sets of relay contacts DD1, LL1 and LL2 to one of four output terminals, 215, 216, 217 and 218 as shown in Table III below:

*Table III*

| State of relays | | Marking category | Terminal to which terminal 214 is connected |
|---|---|---|---|
| DD | LL | | |
| de-energized | de-energized | MI | 215 |
| energized | de-energized | MII | 216 |
| de-energized | energized | MIII | 217 |
| energized | energized | MIV | 218 |

The output terminals 215, 216, 217 and 218 are connected to four input terminals 219, 220, 221 and 222 respectively of the column access controller $AC_2$ which will now be described with reference to Fig. 33. The controller comprises four identical control devices each having a pair of triodes, $V_{32}$ and $V_{33}$, $V_{34}$ and $V_{35}$, $V_{36}$ and $V_{37}$, and $V_{38}$ and $V_{39}$ respectively. The four triodes $V_{32}$, $V_{34}$, $V_{36}$ and $V_{38}$ have their cathodes connected to a −150 volt line, their grids connected through capacitors $C_{12}$, $C_{13}$, $C_{14}$ and $C_{15}$ respectively, in parallel with four grid-leak resistors $R_{220}$, $R_{221}$, $R_{222}$ and $R_{223}$ respectively, to earth and through resistors $R_{161}$, $R_{162}$, $R_{163}$ and $R_{164}$ respectively to the four input terminals 219, 220, 221 and 222 respectively, and their anodes connected to the grids of the four triodes $V_{33}$, $V_{35}$, $V_{37}$ and $V_{39}$ respectively and through resistors $R_{165}$, $R_{166}$, $R_{167}$ and $R_{168}$ respectively to the +350 volt line.

The four triodes $V_{33}$, $V_{35}$, $V_{37}$ and $V_{39}$ have their anodes connected to four output terminals 223, 224, 225 and 226 respectively, and through resistors $R_{169}$, $R_{170}$, $R_{171}$ and $R_{172}$ respectively to the +350 volt line. Their cathodes are connected through a small resistor $R_{173}$ to a terminal 227 and the anode of a triode $V_{40}$ which has its cathode connected to earth and its grid connected through an integrating network comprising a capacitor $C_{16}$ and two resistors, $R_{173}$ and $R_{174}$ to an input terminal 228.

Feedback is provided from the control device comprising the triodes $V_{32}$ and $V_{33}$ to the other three control devices by the three resistors, $R_{175}$, $R_{176}$ and $R_{177}$ connected between the anode of the triode $V_{33}$ and the grids of the three triodes $V_{34}$, $V_{36}$ and $V_{38}$ respectively. Similarly feedback signals are provided from the other control devices by resistors $R_{178}$ to $R_{186}$.

Thus an input is provided to each of the four said control devices by feedback signals from the other devices and by the forcing input applied to one of the input terminals 219, 220, 221 and 222.

The input to the terminal 228 is the pulses provided by the variance computer $VC_1$ and these are integrated on the capacitor $C_{16}$ to give the "variance." When the "variance" is high, the triode $V_{40}$ conducts highly and the devices of the access controller pass through a succession of states in which different control devices provide a high output potential at a high rate. The output potentials of the control devices are provided at the terminals 223, 224, 225 and 226.

The row access controller $AC_3$ is the same as the column access controller $AC_2$ and accordingly is not drawn separately. When occasion arises to refer to elements of the controller $AC_3$ the same reference letters and numerals will be used as were used for the controller $AC_2$, but primed.

The store $ST_5$ is shown in Fig. 34 and comprises four column bus-bars 229, 230, 231 and 232 connected to four input terminals 233, 234, 235 and 236 respectively, these terminals being connected to the four terminals 223, 224, 225 and 226 respectively of the column access controller $AC_2$. The storage matrix has four row bus-bars 237, 238, 239 and 240 connected to four input terminals 241, 242, 243 and 244 respectively, these terminals being connected to the four terminals 223', 224', 225' and 226', respectively of the row access controller $AC_3$. Four row output bus-bars 245, 246, 247 and 248 are connected to four output terminals 249, 250, 251 and 252 respectively, these terminals being connected to the four input terminals 219', 220', 221' and 222' respectively of the row access controller $AC_3$. A further input terminal 253 is connected to a terminal 267 of the marking computer $MC_3$ (Fig. 37), the negative potential representative of $\theta$ being applied from this terminal.

The functional parts of the storage matrix are sixteen identical circuits of which one only will be described, namely the top left hand one in the drawing. A capacitor $C_{17}$ is connected in series with an indirectly heated thermistor $R_{187}$ and a resistor $R_{188}$ between earth and the terminal 253. Thus the capacitor $C_{17}$ is connected to a charging potential through two charging resistors.

The heating resistor of the thermistor $R_{187}$ is shown as $R_{189}$, in a box, and has one end connected to earth and the other end connected through a resistor $R_{190}$ to the column bus-bar 229 and through a resistor $R_{191}$ to the row bus-bar 237.

If the potential on both the bus-bars 229 and 237 is high the resistor $R_{189}$ gets hot and the resistance of the thermistor $R_{187}$ decreases whereby the access to the capacitor $C_{17}$ is increased. When the access to the capacitor $C_{17}$ is high, the potential across it moves relatively rapidly towards the potential representative of $\theta$ on the terminal 253. The access to any capacitor of the storage matrix depends on the potentials of the associated row and column bus-bars.

The junction between the capacitor $C_{17}$ and the thermistor $R_{187}$ is connected through a high resistor $R_{192}$ to the row output bus-bar 245. From this it can be seen that the potential on each of the terminals 249, 250, 251 and 252 is proportional to the sum of the potentials across the four capacitors of the four rows respectively. The potentials on these four terminals are applied as the forcing inputs to the respective control devices of the row access controller $AC_3$.

It should be pointed out here that whilst the use of high resistors in the manner indicated is satisfactory for deriving a potential proportional to the sum of potentials across four capacitors, for larger numbers of capacitors a different method would be necessary, such as a method involving scanning the capacitors, allotting equal intervals of time to each capacitor, and thus producing a varying output potential time-averaged for the capacitors.

The set of output relays $OR_1$ is shown in Fig. 35 and comprises four Schmitt trigger circuits 254, 255, 256 and 257 of conventional type having the windings of four relays RR, SS, TT and UU respectively as one of their anode loads. The four trigger circuits are provided with four input terminals 258, 259, 260 and 261 respectively, and these are connected to the terminals 223', 224', 225' and 226' respectively of the row access controller $AC_3$. Each of the relays RR, SS, TT and UU is energized or de-energized according to whether the potential on the input terminal of its trigger circuit is below or above a level determined by the biasing conditions of the trigger circuit. Each of these relays has a set of contacts which, with a set of contacts of each of the relays DD and LL, is used in the variance computer.

Thus in Fig. 36 one terminal of each of six capacitors $C_{20}$ to $C_{25}$ is connected respectively through one of six sets of changeover relay contacts RR1, SS1, TT1, UU1, DD2 and LL3, either to a $-100$ volt line or through one of six resistors $R_{200}$ to $R_{205}$ respectively to a $+100$ volt line. The other terminals of the capacitors $C_{20}$ to $C_{25}$ are connected together through a resistor $R_{206}$ in series with a resistor $R_{207}$ and a rectifier $X_4$ in parallel to earth.

The junction of the resistors $R_{206}$ and $R_{207}$ is connected to the grid of a triode $V_{41}$, which together with a triode $V_{42}$, resistors $R_{208}$ to $R_{212}$ and a capacitor constitutes a Kipp relay of conventional form. An output terminal 262 connected to the anode of the triode $V_{42}$ is connected to the terminals 228 and 228' of the column and row access controllers, $AC_2$ and $AC_3$, respectively.

Whenever one of the relays RR, SS, TT, UU, DD and LL is operated or released, a positive or negative voltage pulse is applied to the network comprising the resistors $R_{206}$ and $R_{207}$ and the rectifier $X_4$. The rectifier is so poled that only negative pulses are applied to the grid of the triode $V_{41}$ and for each pulse so applied a negative pulse of constant amplitude and duration is provided at the terminal 262. These last-named pulses are integrated in the column and row access controllers, $AC_2$ and $AC_3$ (Fig. 33), respectively by the network comprising the capacitor $C_{16}$ and the resistor $R_{144}$ and the network comprising the capacitor $C_{16}'$ and the resistor $R_{144}'$ respectively. Thus the potentials applied to the grids of the triodes $V_{40}$ and $V_{40}'$ are the "variance" of the charges on the capacitors of the store $ST_5$ and accordingly the potentials at the output terminals 227 and 227' are measures of the "variance."

The terminals 227 and 227' are connected to two input terminals 263 and 264, of the marking computer $MC_3$ shown in Fig. 37. The terminals 263 and 264 are connected through two resistors $R_{213}$ and $R_{214}$ respectively to the grids of two triodes $V_{43}$ and $V_{44}$ respectively, the grids of which are also connected to earth through two capacitors $C_{27}$ and $C_{28}$ respectively. The cathodes of the triodes $V_{43}$ and $V_{44}$ are connected respectively to the junction of two resistors $R_{215}$ and $R_{216}$ connected between earth and the $+350$ volt line and the junction of two resistors $R_{217}$ and $R_{218}$ connected between earth and the $+350$ volt line. The anodes of the triodes are connected together through a common anode load $R_{219}$ to the $+350$ volt line and to the input to a subtracting amplifier $AA_4$. It will be seen that the input to this subtracting amplifier is a potential representative of the "variance" and this potential is used as a measure of the expected deviation $\phi'$ of the pursuing aircraft (spot 202) from the target aircraft (spot 201). Another input to the subtracting amplifier $AA_4$ is provided from the terminal 265 which as previously described is connected to the output of the adding amplifier AA₃ which output is the potential $\phi$ representative of the actual deviation of the pursuing aircraft from the target aircraft. The subtracting amplifier AA₄ provides as its output a positive potential at terminal 226 and a negative potential at terminal 277, both potentials representing $\theta$ in magnitude, varying inversely with the difference ($\phi-\phi'$).

Fig. 38 shows the interconnections of the terminals of the various elements of the Type III co-ordinator.

Whilst the storing means used in the trainable assemblage are conveniently capacitors, as in the embodiments of the invention described, they are not necessarily so. They may be mechanical devices wherein, for example, the displacement of a pointer or the angular position of a wheel represents the stored quantity. Furthermore they may comprise digital storing devices which can store only quantities differing by discrete amounts, rather than continuously variable quantities.

It will be appreciated that the type of storage matrix and access control devices described with reference to the Type I and Type II coordinators can also be adapted to serve in apparatus concerned with continuously variable responses (such as in the case of a "pursuit skill"). Likewise the type of storage matrix and access control devices described with reference to the Type III coordinator may be adapted to serve in apparatus concerned with discrete variables.

Among the many modifications which may be introduced into the apparatus is that of adapting the marking device to take more account of errors of one type than of another type. This is an appropriate modification when, in the skill concerned, certain errors are regarded, for instance on economic grounds, as more important than others. In practice such a modification can be achieved, for instance, by varying the values of appropriate resistors in circuits corresponding to different marking categories.

The term "optimum value of the degree of success of an operator" has not been formally defined as it can never be an absolute quantity. It is a quantity which is, in general, different for different operators and for the same operator at different times. It may be relatively low for an operator having a low intelligence quotient or a slow reaction time, or for an operator for whom it is normally relatively high but who is tired.

In the embodiments of the invention described the only kinds of signals representative of the operator's responses that have been considered have been those which have been derived from actual mechanical responses of the operator. For certain purposes it may be advantageous to derive such signals from a device which measures some physiological variable of the operator, for instance the integrated electro-myogram from the frontalis muscle of the operator. Furthermore the signals may be derived under the control of an observer who estimates the value of some psychological variable of the operator.

Likewise the data supplied to the operator may comprise data supplied by the direct operation upon a physiological variable of the operator. For instance one or more drugs may be injected into or otherwise administered to the operator. Again some data may be supplied to the operator by means of sub-threshold signals which are known to register upon a man's mind even though he does not consciously perceive them.

Use of physiological or psychological variables in one or more of the manners indicated may be of value when it is desired to induce certain states in the operator or to derive information about the operator's suitability to perform a certain job. Such use may be made of apparatus according to the invention for purposes of testing for managerial selection, for instance, or for the purposes of experimental psychology.

Apparatus according to the invention is suitable for testing an operator since as already indicated the trainable assemblage can come to have characteristics related to those of the operator. Thus any test carried out with apparatus according to the invention differs from a normal psychological test in that the apparatus takes account of the individual characteristics of the operator.

Apparatus according to the invention may also be used to set up a situation in which the operator is under stress, for instance for the purposes of treatment of psychological disorders. A stress situation may be readily achieved by providing apparatus which applies a stress-promoting variable, such as noise in a pair of headphones, and makes the value of this variable inversely proportional to a variable representing the operator's degree of success.

In many cases, particularly when apparatus according to the invention is being used for purposes such as managerial selection, experimental psychology and psychological treatment, it will be advantageous to attach a monitoring device to the apparatus and thereby obtain a continuous record of some variable, such as that representing the operator's degree of success.

I claim:

1. Apparatus for assisting an operator in performing a skill, comprising a marking device, at least four output channels coupled to said marking device, each said channel corresponding to a different category, and each said category being determined by at least one characteristic of the skill, said marking device being responsive to input signals representative of the responses of an operator to data supplied to him to generate in said channels output signals representative of the operator's degree of success in responding to the data, a trainable assemblage including at least four storing means coupled to said channels respectively and storing signals in said channels over a period of time, and accordingly having its state determined by said output signals and generating, in dependence upon such state, control signals suitable to control at least one parameter of data-supplying means in such a way as to tend to increase said degree of success to an optimum value, and to maintain said degree of success at this optimum value.

2. Apparatus according to claim 1, wherein said marking device comprises means providing successively in each of said channels a marking potential whose magnitude is representative of said degree of success in all categories over a period of time.

3. Apparatus according to claim 1, wherein said marking device comprises means providing simultaneously in each of said channels a marking potential whose magnitude is representative of said degree of success in all categories over a period of time.

4. Apparatus according to claim 1, wherein each of the storage means comprises at least one capacitor, said marking device comprises means providing a marking potential whose magnitude is representative of said degree of success in all categories over a period of time, and said channels contain variable resistance devices, each said resistance device being provided with resistance-varying means, said marking potential being applied through said channels to said capacitors as a charging potential, the apparatus further comprising access controlling means coupled to said resistance-varying means and varying the resistances of each said resistance device to thereby vary the access of charge to said capacitors.

5. Apparatus according to claim 4, wherein said access controlling means comprise means varying the access of charge to said capacitors in a random manner.

6. Apparatus according to claim 1, comprising data-supplying means for supplying said data to the operator, response means for receiving responses of the operator, means coupling said response means to said marking device to apply said input signals to said marking device and means coupling said trainable assemblage to said data-supplying means and applying said control signals to said data-supplying means.

7. Apparatus according to claim 1, wherein said marking device provides a marking potential whose magnitude is representative of said degree of success, and including means providing corrective information to the operator, and means coupling said marking device to said means providing corrective information, the last said means being responsive to said potential for withdrawing said corrective information as said degree of success increases.

8. Apparatus according to claim 6, wherein said data-supplying means are intermittently operating means providing discrete indications to the operator and said response means are responsive to discrete responses made by the operator and further comprising ambiguity introducing means causing indications other than the correct indication to be provided to the operator with an intensity less than that of said correct indication, said marking device providing a marking potential whose magnitude is representative of said degree of success and means coupling said marking device to said ambiguity introducing means to introduce ambiguity progressively as said degree of success increases.

9. Apparatus according to claim 6, wherein said data-supplying means are intermittently operating means providing discrete indications to the operator and said response means are responsive to discrete responses made by the operator and further comprising warning means warning the operator a short time before data is supplied that data is to be supplied and decreasing the length of time between the warning and the supply of the data as said degree of success increases.

10. Apparatus according to claim 6, comprising sensitivity control means coupled to said marking device and varying the extent of the effect which the operator's responses have upon said response means in dependence on said marking potential.

11. Apparatus according to claim 6, wherein said data supply means are intermittently operating means which supply discrete indications visually to the operator and comprising means causing a brief preview of the data to be formally displayed a short time before it is formally displayed, said means being coupled to said marking device and responsive thereto to decrease said short time as said degree of success increases.

12. Apparatus according to claim 6, wherein said data supplying means comprise a plurality of lamps lighting up to give indications to the operator and wherein means are provided causing the intensity with which the appropriate lamp lights up to decrease as the operator's degree of success increases.

13. Apparatus according to claim 12, wherein means are provided causing all lamps to light up with a background intensity of illumination, whereby ambiguity is introduced into the indications.

14. Apparatus according to claim 6, wherein said data-supplying means are intermittently operating means which provide discrete indications in a recurrent sequence to the operator, and wherein said response means provides to said marking device as said input signals, signals indicating correct and incorrect responses to said indications and said marking device provides output signals including a potential representative of said degree of success, said potential being varied in one sense in response to signals indicating correct responses and in the other sense by signals indicating incorrect responses.

15. Apparatus according to claim 14, wherein said response means comprise a plurality of manually operable members and wherein a like plurality of lamps for supplying corrective information is provided identifying said operable members respectively, said apparatus further comprising modulating means causing a lamp of said lamps identifying an operable member of said operable members to light up when that said member is to be operated in order to make a correct response, and reducing the intensity with which said lamps light up to withdraw the corrective information thereby provided as said degree of success increases.

16. Apparatus according to claim 14, comprising means fixing limit times and for providing signals rendering said marking device unresponsive to any signal representing a correct or an incorrect response after the limit time for that response has passed.

17. Apparatus according to claim 16, wherein said marking device comprises a set of relays, said set of relays being set in a first state by each said signal rendering said marking device unresponsive, being set in a second state by a signal indicating a correct response, and being set in a third state by a signal indicating an incorrect response.

18. Apparatus according to claim 17, wherein said marking device further comprises an integrating amplifier including an input circuit and providing said potential representative of said degree of success, and a set of relay contacts setting said input circuit in first, second and third configurations when said set of relays is in said first, second and third states respectively.

19. Apparatus according to claim 16, wherein said trainable assemblage comprises a plurality of capacitors each said capacitor corresponding to a different one of said indications, said apparatus comprising switching means coupled to said marking device applying said potential representative of said degree of success through one of said channels to one said capacitor for an interval of time starting with a correct response to the indication corresponding to the said capacitor and ending with the limit time for that response.

20. Apparatus according to claim 16, wherein said means adapted successively to fix limit times comprises a trigger circuit and means coupled to said marking device for applying to said trigger circuit a triggering potential rising from a datum level at a rate substantially proportional to the magnitude of said marking potential, and means determining trigger levels, said trigger circuit triggering whenever said triggering potential reaches a trigger level of said levels and thereby defining one of said limit times.

21. Apparatus according to claim 20, comprising an added amplifier having two input terminals and an output terminal and providing at said output terminal a potential substantially equal to the sum of potentials proportional to the potentials applied to said input terminals respectively, one said input terminal being connected to the output circuit of said means for applying a triggering potential, the other said terminal being connected to the output circuit of said means adapted to determine trigger levels, said apparatus further comprising a modulator connected to said adding amplifier to provide an alternating current amplitude-modulated by the output potential of said amplifier, routing means and a plurality of lamps for supplying corrective information, said routing means applying said alternating current successively to different ones of said lamps.

22. Apparatus according to claim 20, wherein said means for applying said triggering potential comprise a capacitor, an electron discharge tube having at least one control electrode, to which said electrode said marking potential is applied, and means for charging said capacitor through the conducting path of said electron discharge tube.

23. Apparatus according to claim 22, wherein said means determining trigger levels comprise a reading amplifier and routing means connecting the input circuit of said reading amplifier successively to different ones of said capacitors, the output circuit of said reading amplifier being connected to said trigger circuit to provide said trigger levels.

24. Apparatus for assisting an operator in performing a skill, comprising data supply means for supplying discrete indications to an operator, response means for receiving discrete responses of the operator, each complete response to one indication consisting of a plurality of individual discrete responses, a marking device, means coupling said marking device to said response means, at least four output channels coupled to said marking device, each channel corresponding to a different category and each category being determined by at least one characteristic of the skill, said marking device being responsive to signals from said response means representative of the responses of the operator to generate in said channels signals representative of the operator's degree of success in responding to the data, a trainable assemblage including at least four storing means coupled to said channels respectively and storing signals in said channels over a period of time and accordingly having its state determined by said output signals and generating, in dependence upon such state, control signals, means applying said control signals to said data supply means to control at least one parameter of said data supply means so as to tend to increase said degree of success to an optimum value and to maintain said degree of success at this optimum value and means fixing successively occurring pluralities of limit times, each said plurality of limit times corresponding to a discrete indication and the limit times in each plurality thereof corresponding to the individual discrete responses to be made to the corresponding indication, said limit times fixing means providing signals rendering said marking device at least partially unresponsive to any signal from said response means representing a correct or incorrect response made after the limit time corresponding to that discrete response.

25. Apparatus according to claim 24, wherein said marking device comprises a plurality of sets of relays, each set corresponding with one marking category and having different states characterized by the combinations in which its relays are energized and de-energized, each said set of relays being set in a first state by each signal provided by said means fixing limit times rendering said marking device at least partially unresponsive to signals representing correct and incorrect responses in the corresponding marking category, being set in a second state by a signal representing a correct response in the corresponding marking category and being set in a third state by a signal representing an incorrect response in the said category.

26. Apparatus according to claim 25, wherein said means fiixing successively occurring pluralities of limit times provides signals fixing a further limit for each indication later than said limit times associated with the responses in the different marking catagories.

27. Apparatus according to claim 26, wherein said marking device comprises a further set of relays having different states characterized by the combinations in which its relays are energized and de-energized, said further set being set in a first state by each said signal fixing a further limit time, being set in a second state by a signal representing the last response of a number of correct responses constituting a complete response to an indication, and being set in a third state by a signal representing an incorrect response.

28. Apparatus according to claim 27, wherein said marking device comprises an integrating amplifier including an input circuit and providing said potential representative of said degree of success, having said input circuit connected in first, second and third configurations when said further set of relays is in said first, second and third states respectively.

29. Apparatus according to claim 28, wherein said trainable assemblage comprises a number of sets of capacitors, a different set corresponding to each marking category, a different capacitor in each set corresponding to each indication, and wherein means are provided applying said potential respresentative of said degree of success to each capacitor through a resistance device for an interval of time starting with a correct response in the marking category corresponding to the capacitor and ending with the limit time determined for that marking category and indication.

30. Apparatus according to claim 26, wherein said means adapted to fix pluralities of limit times comprise a plurality of trigger circuits and means applying to said trigger circuits a triggering potential rising from a datum level at a rate substantially proportional to the magnitude of said potential representing said degree of success, one said trigger circuit triggering when said triggering potential reaches a fixed trigger level and thereby determining said further limit time, the apparatus further comprising means determining a plurality of trigger levels, determined by the previous degree of success in the different marking categories respectively, the other said trigger circuits triggering when said triggering potential reaches said trigger levels respectively and thereby determining the limit times associated with the different marking catagories.

31. Apparatus according to claim 30, wherein said trainable assemblage comprises a number of sets of capacitors, a different set corresponding to each marking category, a different capacitor in each set corresponding to each indication, and wherein means are provided applying said potential representative of said degree of success to each capacitor through a resistance device for an interval of time starting with a correct response in the marking category corresponding to the capacitor and ending with the limit time determined for that marking category and indication, and wherein said means determining a plurality of trigger levels comprise a plurality of reading amplifiers corresponding to said marking categories respectively and routing means connecting the input circuits of said reading amplifiers successively to the capacitors of said assemblage respectively corresponding to successive indications.

32. Apparatus according to claim 30, comprising a plurality of adding amplifiers each having two input terminals and an output terminal and providing at said output terminal a potential substantially equal to the sum of potentials proportional to the potentials applied to said input terminals respectively, one said input terminal of each said adding amplifier being connected to the output circuit of said means for applying a triggering potential, the other said input terminal of each said adding amplifier being connected to said means determining a plurality of trigger levels so that said adding amplifiers provide output potentials substantially equal to the sum of a potential proportional to said triggering potential and potentials proportional to said trigger levels respectively, said apparatus further comprising a plurality of modulators connected to said adding amplifiers respectively to provide alternating currents amplitude-modulated by the output potentials of said adding amplifiers respectively, routing means and a plurality of lamps for supplying corrective information, said routing means applying said alternating currents successively to different sets of said lamps.

33. Apparatus for assisting an operator in performing a skill wherein the operator's degree of success may be represented at least partially by comparing an observed quantity with an expected quantity, comprising a marking device, at least four output channels coupled to said marking device, each said channel corresponding to a different category and each said category being determined by at least one characteristic of the skill, said marking device comprising means responsive to input signals representative of the responses of the operator to data supplied to him to provide a potential representative of said observed quantity, means providing a potential representative of said expected quantity and subtracting means providing a marking potential representing a compensated marking variable, representative of the difference between the expected quantity and the observed quantity, said marking device applying said signals to said channels to generate therein output signals representative of the operator's degree of success in responding to the data, a trainable assemblage including at least four storing means coupled to said channels respectively and storing signals in said channels over a period of time, and accordingly having its state determined by said output signals and generating, in dependence upon such state, control signals suitable to control at least one parameter of data-supplying means in such a way as to tend to increase said degree of success to an optimum value, and to maintain said degree of success at this optimum value.

34. Apparatus according to claim 33, wherein said trainable assemblage comprises a plurality of capacitors, a plurality of variable resistance devices and means applying said marking potential representing a compensated marking variable to said capacitors through said resistance devices respectively.

35. Apparatus according to claim 34, wherein different capacitors correspond to different marking categories and wherein means are provided making the access of charge relatively high to a capacitor or capacitors of said capacitors corresponding to the marking category appropriate at any instant.

36. Apparatus according to claim 34, wherein different capacitors correspond to different strategy categories, and access-control means are provided making the access of charge relatively low to a capacitor or capacitors of said capacitors corresponding to a strategy whose employment has increased the degree of success of the operator.

37. Apparatus according to claim 34, wherein said variable resistance devices through which said marking potential is applied to said capacitors are indirectly heated thermistors, heating resistors for heating said thermistors, and means for applying to each said heating resistor the sum of the output potentials of a different combination of said control devices.

38. Apparatus according to claim 34, comprising at least one access controller controlling the access of charge to said capacitors, each said access controller comprising a plurality of control devices, each control device partially or wholly controlling the access of charge to a group of capacitors of said capacitors and comprising feedback means whereby it is provided with feedback signals from the other said devices so that the access controllers tend to vary the access of charge to different groups of capacitors in a random manner and wherein means are provided feeding forcing inputs to said control devices to favour or inhibit the access of charge to specified groups of capacitors.

39. Apparatus according to claim 38, wherein each said access controller comprises a resistive network and each said control device comprises an amplifier which amplifies voltage signals with substantially no change of phase, said control devices of said access controller being connected to the terminal of a source of operating potential through said resistive network.

40. Apparatus according to claim 39, wherein said resistive network comprises an electron discharge valve having at least one control electrode, means being provided applying to said control electrode a potential controlling the flow of current through said valve and hence the resistance of said resistive network.

41. Apparatus according to claim 40, wherein means are provided applying a variable potential to said control electrode dependent upon the variance of the magnitudes of the charges on said capacitors of said trainable assemblage, said means comprising scanning means scanning said capacitors continuously, differentiating means differentiating the voltage waveform provided by said scanning means and integrating means integrating the pulses produced by said differentiating means.

42. Apparatus according to claim 40, comprising means applying a variable potential to said control electrode coupled to said means providing a potential representative of said expected quantity, said means applying a variable potential providing voltage pulses of substantially constant amplitude and width whenever predeterminde signals in said means providing a potential representative of said expected quantity cross predetermined limits, and means integrating said pulses to provide said variable potential.

References Cited in the file of this patent

UNITED STATES PATENTS

| | | |
|---|---|---|
| 2,084,440 | Heinis | June 22, 1937 |
| 2,402,162 | Holt | June 18, 1946 |
| 2,409,462 | Zworykin | Oct. 15, 1946 |
| 2,425,330 | Kenyon | Aug. 12, 1947 |
| 2,433,681 | Blumlein | Dec. 30, 1947 |
| 2,439,169 | Kittredge | Apr. 6, 1948 |
| 2,453,743 | Cesareo | Nov. 16, 1948 |
| 2,492,356 | Cesareo | Dec. 27, 1949 |
| 2,526,693 | Rust | Oct. 24, 1950 |
| 2,604,705 | Hisserich | July 29, 1952 |
| 2,617,982 | Holschuh | Nov. 11, 1952 |
| 2,691,226 | Gaertner | Oct. 12, 1954 |
| 2,693,647 | Bolster | Nov. 9, 1954 |
| 2,701,922 | Dehmel | Feb. 15, 1955 |
| 2,731,737 | Stern | Jan. 24, 1956 |
| 2,804,264 | Stern | Aug. 27, 1957 |
| 2,804,698 | Grandmont | Sept. 3, 1957 |
| 2,826,828 | Hamilton | Mar. 18, 1958 |
| 2,835,052 | Raich et al. | May 20, 1958 |
| 2,877,568 | Besnard | Mar. 17, 1959 |

FOREIGN PATENTS

| | | |
|---|---|---|
| 762,367 | Great Britain | Nov. 28, 1956 |